(12) United States Patent
Suzuki et al.

(10) Patent No.: US 8,598,052 B2
(45) Date of Patent: Dec. 3, 2013

(54) HIGHLY AIR-PERMEABLE AND WATER-RESISTANCE SHEET, A HIGHLY AIR-PERMEABLE AND WATER-RESISTANCE SHEET COMPOSITE AND AN ABSORBENT ARTICLE, AND A METHOD FOR MANUFACTURING A HIGHLY AIR-PERMEABLE AND WATER-RESISTANCE SHEET AND A METHOD FOR MANUFACTURING A HIGHLY AIR-PERMEABLE AND WATER-RESISTANCE SHEET COMPOSITE

(75) Inventors: Migaku Suzuki, Tokyo (JP); Akira Kawase, Tokyo (JP)

(73) Assignee: Daio Paper Corporation, Ehime (JP)

( * ) Notice: Subject to any disclaimer, the term of this patent is extended or adjusted under 35 U.S.C. 154(b) by 1492 days.

(21) Appl. No.: 12/281,419

(22) PCT Filed: Mar. 1, 2007

(86) PCT No.: PCT/JP2007/053914
§ 371 (c)(1),
(2), (4) Date: Sep. 2, 2008

(87) PCT Pub. No.: WO2007/100040
PCT Pub. Date: Sep. 7, 2007

(65) Prior Publication Data
US 2009/0042468 A1 Feb. 12, 2009

(30) Foreign Application Priority Data

Mar. 2, 2006 (JP) .................. 2006-056507
Sep. 28, 2006 (JP) .................. 2006-265880
Nov. 28, 2006 (JP) .................. 2006-320884

(51) Int. Cl.
*B32B 5/02* (2006.01)
*B32B 27/12* (2006.01)
*B32B 5/06* (2006.01)
*D04H 1/56* (2006.01)

(52) U.S. Cl.
USPC ............ 442/79; 442/382; 442/394; 442/400; 442/401; 442/414; 442/389; 442/390; 442/85

(58) Field of Classification Search
USPC ................ 442/85, 79, 400–401, 414, 382, 442/389–390, 394
See application file for complete search history.

(56) References Cited

U.S. PATENT DOCUMENTS

| 6,258,196 B1 * | 7/2001 | Suzuki et al. | 156/176 |
| 2004/0102124 A1 * | 5/2004 | Suzuki | 442/382 |
| 2007/0204444 A1 * | 9/2007 | Wang et al. | 26/28 |

FOREIGN PATENT DOCUMENTS

| JP | 1-82223 U | 6/1989 |
| JP | 06-099533 A | 4/1994 |

(Continued)

OTHER PUBLICATIONS

*Japan Tappi Journal*, May 1999: Suzuki, Migaku et al., "Study on the Composite Structure of SAP and Microfibrillated Cellulose (Part II) Study on the Dispersion Stability of the MFC or the BC in a Solvent Mixture of Water and Organic Solvent", in Japanese but includes English translation of Abstract, pp. 639-652.

(Continued)

*Primary Examiner* — Lynda Salvatore

(74) *Attorney, Agent, or Firm* — Frommer Lawrence & Haug LLP; Ronald R. Santucci

(57) ABSTRACT

A highly air-permeable and water-resistance sheet according to the present invention includes a hydrophobic non-woven fabric layer having 100 mm H$_2$O or more of water pressure resistance and a fine cellulose fiber layer layered on the hydrophobic non-woven fabric layer, and a water repellent layer is layered on either surface of the highly air-permeable and water-resistance sheet. A highly air-permeable and water-resistance sheet composite according to the present invention includes the highly air-permeable and water resistance sheet and another non-woven fabric layered onto the water-repellant layer.

22 Claims, 33 Drawing Sheets

(56) References Cited

FOREIGN PATENT DOCUMENTS

| | | |
|---|---|---|
| JP | 08-284090 A | 10/1996 |
| JP | 09-209254 A | 8/1997 |
| JP | 10-168230 A | 6/1998 |
| JP | 10-248872 A | 9/1998 |
| JP | 2000-201975 A | 7/2000 |
| JP | 2002-325799 A | 11/2002 |
| JP | 2006-051649 | 2/2006 |
| WO | WO 02/090106 A | 11/2002 |
| WO | WO 2004/009902 A | 1/2004 |

OTHER PUBLICATIONS

*Japan Tappi Journal 6*, vol. 50, No. 6 1992, in Japanese.

* cited by examiner

Thickness (H): 0.4 mm
Number of aperture: 210/cm²
Rate of opening: 25%

HIGHLY AIR-PERMEABLE AND WATER-RESISTANCE SHEET, A HIGHLY AIR-PERMEABLE AND WATER-RESISTANCE SHEET COMPOSITE AND AN ABSORBENT ARTICLE, AND A METHOD FOR MANUFACTURING A HIGHLY AIR-PERMEABLE AND WATER-RESISTANCE SHEET AND A METHOD FOR MANUFACTURING A HIGHLY AIR-PERMEABLE AND WATER-RESISTANCE SHEET COMPOSITE

This application is a 371 of PCT/JP2007/053914 filed on Mar. 1, 2007, published on Sep. 7, 2007 under publication number WO 2007/100040 A which claims priority benefits from Japanese Patent Application No. 2006-056507 filed Mar. 2, 2006 and Japanese Patent Application No. 2006-265880 filed Sep. 28, 2006 and Japanese Patent Application No. 2006-320884 filed Nov. 28, 2006, the disclosures of which are hereby incorporated by reference.

TECHNICAL ART

The present invention relates to a highly air-permeable and water-resistance sheet and a highly air-permeable and water-resistance sheet composite, and absorbent article comprising thereof, and a method for manufacturing a highly air-permeable and water-resistance sheet and a method for manufacturing a highly air-permeable and water-resistance sheet composite. In particular, the present invention relates to a highly air-permeable and water-resistance sheet and a highly air-permeable and water-resistance sheet composite having both of highly air permeability and water resistance, and a method for manufacturing thereof, and an absorbent article comprising thereof.

BACKGROUND ART

The air permeable sheet material in the art is provided to have a micro porous structure by forming a hydrophobic film comprising the phase separated layer containing the filler such as $BaSO_4$ and $CaCO_3$ and heterogeneous polymer, by micro-dispersing the easily extractable component and extracting the component, or by forming micro continuous foamed structure.

Such films having micro porous structure has been used for the backsheet of hygiene products such as disposable diaper and sanitary napkin, or has been in heavy usage for waterproof material for rainwear and sports wear by laminating it to nonwoven fabric, woven fabric knitted fabric.

In addition, the sheet member having a selective permeability is widely used for the hygiene products such as the absorbent product including diaper, and mask shutting off the microscopic particles such as dust, microorganism and pollen. Such a member includes a material supporting activated carbon in the powder form, activated carbon fiber and zeolite.

Generally, these sheet members require a profile in dependent on its application. Such a profile includes, for example in the absorbent products, air permeability and water resistance along with retaining water absorbability in dependence on the constituent element of the products. In addition, such a profile, in the hygiene products such as mask, includes to have a profile inhibiting the passage of the above-mentioned microscopic particle, along with air permeability. In order to obtain such a profile, the securement of water resistance and impermeability can be attained to reduce the pore size of the sheet member. However, the reduction of the pore side leads to the limitation of the air permeability thereby hard to obtain the necessary profile for the applications.

There is the so-called breathable backsheet as the sheet member having air permeability. Many proposals for manufacturing this backsheet have been made including the layered products of microfiber web and the method utilizing the gel blocking. However, one and only effective mean as commercially adapted is to use the air permeable PE film as the backsheet. However, the ventilation rate of the normal air permeable film is in the range of about 3.0 to 5.0 kg/24 hr·m² of MVTR (Moisture Vapor Transfer Ratio), in accordance with ASTM E96-63F or E96-80B. Accordingly, it has to say to provide not enough profile on the practical use.

That is, according to several researched for the stuffy of underwear and the others, 2 mm or more of gap between the underwear surface and the skin surface will be necessary for generating the surface airflow due to the bellows effect to inhibit to being stuffy, along with high air permeability. In case of the normal underwear, 1.0 sec/100 mL of air permeability of the underwear expressed as Gurley method (JIS P8117) is possessed. In comparison with the air permeable film, the normal underwear has 1 kg/min·m² or more of ventilation rate expressed in accordance with ASTM D-737, the thin-type underwear has 10 kg/min·m² or more of ventilation rate, and the wetted underwear has at least 0.5 kg/min·m² or more of moisture vapor transfer ratio. These ventilation rates correspond to about 300 times of a ventilation rate of the above-mentioned conventional air permeable film. Therefore, the conventional air permeable film is not enough for inhibiting the generation of being stuffy and rash.

The present inventors considers that a necessary air permeability for an absorbent product such as diaper is at least 100 sec/100 mL of air permeability as expressed in accordance with the Gurley method, preferably tens seconds/100 mL or lower of air permeability. In addition, there is little gap for providing the bellows effect in the current absorbent product such as diaper, since the absorbent product is defined to closely contact with the body as possible without any gaps. Accordingly, there is little surface airflow of the product. Furthermore, a small air permeability of the air permeable film is no help in the product after the body fluid has adsorbed in the absorbent, since the absorbent comprises itself a thick layer of pulp/SAP. It is naturally that, in case of wearing the absorbent product being in such state, the humidity and temperature within the product will be increased and the product will be stuffy and rash will be occurred.

In addition, there are several proposals that any ventilation holes are provided in the side, front, rear and end of the product although a risk of occurring any leakages from the product is recognized. However, there is occurred a new problem that excretions and smells originated from the excretions are leaked through the ventilation hole.

That is, in order to be capable of manufacturing an absorbent product which has highly air permeability and that there is less chance to occur stuffy and rash, it is necessary to improve air permeability of the backsheet, and further to provide stable air permeable structure in the absorbent.

Patent-related Document 1
Japanese Patent Application Publication No. 248872/1998
Patent-related Document 2
WO2002/090106
Patent-related Document 3
Japanese Patent Application Publication No. 284090/1996
Patent-related Document 4
WO2004/009902
Patent-related Document 5
Japanese Patent Application Publication No. 168230/1998

Patent-related Document 6
Japanese Patent Application Publication No. 2000-201975
Non-Patent-related Document 1
Bioscience and Industry, vol. 50, No. 6, p. 534 (1992)
Non-Patent-related Document 2
JAPAN TAPPI Journal, vol. 53, No. 5, p. 91 (1999)

DISCLOSURE OF INVENTION

Problem to be Solved

The present invention is aimed to make in consideration of the above-mentioned problem. That is, the present invention is to provide highly air-permeable and water-resistance sheet and a highly air-permeable and water-resistance sheet having both of highly air permeability and water resistance, and an absorbent article comprising thereof. In addition, the present invention is to provide a highly air-permeable and water-resistance sheet and method for manufacturing a highly air-permeable and water-resistance sheet composite wherein the sheet and composite have such a property.

Means for Solving the Problem

The highly air-permeable and water-resistance sheet according to the present invention is characterized as follows:

A highly air-permeable and water-resistance sheet comprising a hydrophobic non-woven fabric layer having 100 mmH$_2$O or more of water pressure resistance; and a fine cellulose fiber layer layered on said hydrophobic non-woven fabric layer, wherein a water repellant layer is layered on either surface of said highly air-permeable and water-resistance sheet. Thereby, both of air permeability and water resistance is obtained, and an applicably useful highly air-permeable and water-resistance sheet is obtained.

In the highly air-permeable and water-resistance sheet according to the present invention, highly air-permeable and water-resistance sheet, said non-woven fabric is spun melt non-woven fabric made of polyolefins. Thereby, in addition to advantageously ensuring the hydrophobicity, the cost is advantage, since the spun melt made of polyolefins is inexpensive and easily available with large amount.

In the highly air-permeable and water-resistance sheet according to the present invention, said non-woven fabric is melt blown non-woven fabric. Thereby, the hydrophobicity is advantageously ensured, due to utilizing the nature of the micro fiber originated from the melt blown non-woven fabric.

In the highly air-permeable and water-resistance sheet according to the present invention, said non-woven fabric is composite non-woven fabric of spun bond and melt blown non-woven fabric. Thereby, the sheet can have a dense porous tissue and can maintain the stable water resistance property by means of the structure combined the filament tissue of the spun bond non-woven fabric with the micro tissue of the melt blown.

In the highly air-permeable and water-resistance sheet according to the present invention, said fine cellulose fiber constituting said fine cellulose fiber layer has 0.3 mm or less of average fiber length and has 15 mL/g or more of hydration capacity. Thereby, in addition to obtaining the fill-up effect to incorporate the cellulose fiber into the porous portion of the fiber of the hydrophobic non-woven fabric, the layer delamination between the fine cellulose fiber layer and the hydrophobic non-woven fabric layer can be prevented.

In the highly air-permeable and water-resistance sheet according to the present invention, weight of said fine cellulose fiber layer is in the range of 2 to 20 g/m$^2$. Thereby, in addition to securing the flexibility, the crack of the fine cellulose fiber layer can be prevented.

In the highly air-permeable and water-resistance sheet according to the present invention, said water repellant layer is layered on both surfaces of said highly air-permeable and water-resistance sheet. Thereby, the stable water resistance can be enhanced.

In the highly air-permeable and water-resistance sheet according to the present invention, said water repellant layer comprises an olefinic water repellent, a synthetic resin binder and a cross linker. Thereby, effects of each component constituting the water repellant layer can be continuously sustained.

In the highly air-permeable and water-resistance sheet according to the present invention, said synthetic resin binder is stylene butadiene resin. Thereby, the water resistance due to the film forming and the compatibility to the water repellant can be improved, and the above-mentioned effects can be remarkably obtained.

In the highly air-permeable and water-resistance sheet according to the present invention, said cross linker is ammonia zirconium carbonate. Thereby, the water resistance and the sustained effect of the water repellant can be obtained, and it is possible to prevent the water leakage for long time.

In the highly air-permeable and water-resistance sheet according to the present invention, said water repellant layer further comprises a deodorizer. Thereby, in addition to maintaining the water resistance and the water repellency, it is possible to obtain the deodorant effect.

In the highly air-permeable and water-resistance sheet according to the present invention, said deodorizer is zeolite originated from natural resources. Thereby, the appearance is superior, and the deodorant effect can be obtained, along with the reduction of the cost.

In the highly air-permeable and water-resistance sheet according to the present invention, said highly air-permeable and water-resistance sheet is subjected to heat press treatment. Thereby, in addition to increasing the mechanical strength, the highly air-permeable and water-resistance sheet having high smoothness can be obtained.

In the highly air-permeable and water-resistance sheet according to the present invention, said highly air-permeable and water-resistance sheet is of heat treated so as to melt at least part of compositions of said hydrophobic non-woven fabric layer. Thereby, the fine cellulose fiber layer and the hydrophobic non-woven fabric layer can be more integrated and can be smaller and lighter.

In addition, the highly air-permeable and water-resistance sheet composite according to the present invention is characterized as follows:

A highly air-permeable and water-resistance sheet composite comprising a hydrophobic non-woven fabric layer and having 100 mmH$_2$O or more of water pressure resistance; a fine cellulose fiber layer layered on said hydrophobic non-woven fabric layer; and a water repellant layer layered on said fine cellulose fiber layer, wherein said highly air-permeable and water-resistance sheet composite comprises another non-woven fabric layered onto said water repellant layer. Thereby, in addition to improving the air permeability, the water resistant and the surface abrasion-resistant, the applicably useful highly air-permeable and water-resistance sheet composite can be obtained wherein the dust created from the surface can be prevented, and the passage of the fine component such as microorganism and the dust can be prevented.

In the highly air-permeable and water-resistance sheet composite according to the present invention, it comprises another fine cellulose fiber layer between said water repellant layer and said another non-woven fabric. Thereby, the composite body having two efficiencies of the water repellency and the moisture absorbability can be obtained.

In addition, the absorbent article according to the present invention is characterized as follows: An absorbent article comprising a highly air-permeable and water-resistance sheet as claimed in any one of Claims 1 to 14, and an absorbent body layered on said highly air-permeable and water-resistance sheet. In addition, the absorbent article according to the present invention is characterized as follows:

An absorbent article comprising a highly air-permeable and water-resistance sheet composite as claimed in Claim 15 or 16, and an absorbent body layered on said highly air-permeable and water-resistance sheet composite. Thereby, the absorbent article can be obtained wherein it does not occur any leakage and be stuffy along with having the absorbability of the liquid such as body fluid.

In the absorbent article according to the present invention, said absorbent body has regions containing SAP and not containing SAP. Thereby, it is possible to ensure the good air permeability even after the liquid such as the body liquid has absorbed.

In the absorbent article according to the present invention, said absorbent body contains 50% or more of said SAP relative to the weight of said absorbent body. Thereby, the cost is superior, and enough air permeability can be obtained along with ensuring the enough absorbability.

In the absorbent article according to the present invention, it further comprises a buffer sheet between said highly air-permeable and water-resistance sheet and said absorbent body. Thereby, it is possible to ensure the stable water resistant for long time even under the load.

In the absorbent article according to the present invention, said buffer sheet is an apertured film. Thereby, the effect of the buffer sheet can be obtained along with maintaining the high air permeability.

In the absorbent article according to the present invention, a ratio of the surface area of said buffer sheet is assigned as "P" and the surface area of said is highly air-permeable and water-resistance sheet is assigned as "Q", a ratio of P/Q×100 is in the range of 10% to 50%. Thereby, the cost is superior, and it is possible to maintain enough air permeability and water resistant.

On the other hand, the method for manufacturing a highly air-permeable and water-resistance sheet according to the present invention is characterized as follows:

A method for manufacturing a highly air-permeable and water-resistance sheet comprising the steps of:

degassing a hydrophobic non-woven fabric layer having 100 mmH$_2$O or more of water pressure resistance using a degassing medium containing water;

layering a fine cellulose fiber layer to said degassed hydrophobic non-woven fabric layer; and layering a water repellant layer to said fine cellulose fiber layer. Thereby, the highly air-permeable and water-resistance sheet can be obtained with the convenient method by hydrophobizing the fine cellulose fiber layer.

In the method for manufacturing a highly air-permeable and water-resistance sheet according to the present invention, said degassing medium contains a hydrophilic organic solvent or a surface-activating agent. Thereby, it is possible to uniformly layer the hydrophilic fine cellulose fiber layer on the hydrophobic non-woven fabric layer.

In the method for manufacturing a highly air-permeable and water-resistance sheet according to the present invention, said hydrophilic organic solvent is ethanol. Thereby, independent of the nature of the material such as hydrophilicity and hydrophobicity, it is possible to uniformly layer the fine cellulose fiber layer.

In the method for manufacturing a highly air-permeable and water-resistance sheet according to the present invention, said surface-activating agent is selected from the group consisting of an adduct of nonylphenol ethylene oxide and a dodecylbenzene sulfonic acid and a mixture thereof. Thereby, it is possible to uniformly layer the fine cellulose fiber layer on the surface of the hydrophobic non-woven fabric layer.

In the method for manufacturing a highly air-permeable and water-resistance sheet according to the present invention, said step of layering a fine cellulose fiber layer is performed using a slurry of the fine cellulose fiber in water. Thereby, it is possible to conveniently provide the function of the fine cellulose fiber layer, without any facilities such as for recovering the waste containing the solvent.

In the method for manufacturing a highly air-permeable and water-resistance sheet according to the present invention, said slurry contains a surface-activating agent. Thereby, it is possible to uniformly layer the fine cellulose fiber layer on the surface of the hydrophobic non-woven fabric.

In addition, the method for manufacturing a highly air-permeable and water-resistance sheet composite according to the present invention is characterized as follows:

A method for manufacturing a highly air-permeable and water-resistance sheet composite comprising the steps of degassing a hydrophobic non-woven fabric layer having 100 mmH$_2$O or more of water pressure resistance using a degassing medium containing water;

layering a fine cellulose fiber layer to said degassed hydrophobic non-woven fabric layer;

layering a water repellant layer to said fine cellulose fiber layer; and layering another non-woven fabric layer onto said water repellant layer. Thereby, the surface abrasion-resistance can be enhanced, the desorption of the fine cellulose fiber from the surface can be prevented, the dust created from the surface of the highly air-permeable and water-resistance sheet composite can be prevented.

In the method for manufacturing a highly air-permeable and water-resistance sheet composite according to the present invention, it comprises another step of layering a fine cellulose fiber layer on said water repellant layer between said step of layering a water repellant layer and said step of layering another non-woven fabric layer. Thereby, it is possible to easily manufacture the highly air-permeable and water-resistance sheet composite which has different properties of water resistant and the hydrophilicity.

In the method for manufacturing a highly air-permeable and water-resistance sheet composite according to the present invention, said step of layering another non-woven fabric layer is a step of layering said fine cellulose fiber layer layered on said non-woven fabric such that said fine cellulose fiber layer is in contact with said water repellant layer. Thereby, the composite body has both natures of water resistant and the hydrophilicity, and the surface abrasion-resistance can be enhanced by covering the surface of the fine cellulose fiber layer with the non-woven fabric.

In the method for manufacturing a highly air-permeable and water-resistance sheet composite according to the present invention, said layer having a non-woven fabric is degassed using the degassing medium. Thereby, it is possible to prevent to create the uneven portion such as blistering phenomenon with partially containing the air, and to continuously perform the uniform coating.

Effect of Invention

According to the present invention, both of water resistance and air permeability can be obtained. In addition, it is possible to prevent a passage of fine components such as microorganisms and dust, in addition to water resistance and air permeability. Further, it is possible to obtain properties originated from several members by positioning materials having different properties at predetermined position, without loss of the original characteristics of highly air permeability and water resistance.

Figure 1A:
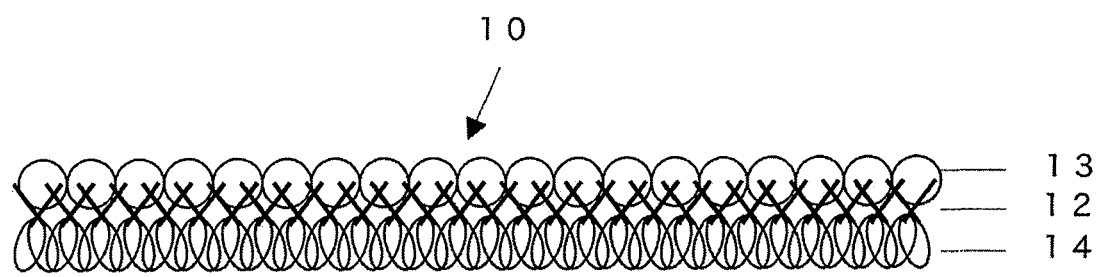
FIG. 1a is a schematic cross-section view of the highly air-permeable and water-resistance sheet according to the present invention.

| Explanation of Notation | |
|---|---|
| 10 | highly air-permeable and water-resistance sheet |
| 12 | fine cellulose fiber layer |
| 13 | water repellant layer |
| 14 | hydrophobic non-woven fabric layer |
| 15 | non-woven fabric layer |
| 16 | absorbent body |
| 18 | apertured film |
| 20 | highly air-permeable and water-resistance sheet composite |
| 22 | fine cellulose fiber layer |
| 23 | water repellant layer |
| 24 | hydrophobic non-woven fabric layer |
| 100 | absorbent article |
| 110 | leakage preventing material |
| 112 | first leakage preventing body |
| 114 | second leakage preventing body |
| 116 | absorbent body |
| 122 | top sheet |
| 124 | bridge member |
| 126 | urine-feces stopper |
| 128 | leg gather |
| 130 | leg gather |
| 132 | connecting part |
| 134 | slit |
| 136 | projecting part |
| 142 | connecting part |
| 144 | connected part |
| 200 | sheet |
| 202 | coating slurry |
| 204 | saturation medium |

-continued

| | Explanation of Notation |
|---|---|
| 206 | saturation medium layer |
| 210 | net conveyer |
| 212 | head box |
| 214 | saturation medium supplier |
| 220 | coating roller |
| 222 | roller |
| 224 | supporting roller |
| 232 | unreeler |
| 234 | vacuum unit |
| 236 | plate |
| 238 | tray |
| 242 | coating region |
| 244 | water stream |
| 301 | jack |
| 302 | glass plate |
| 303 | filter paper |
| 304 | sample |
| 305 | tissue paper |
| 306 | acrylic pipe |
| 307 | acrylic mounter |
| 308 | packing |
| 309 | stand |
| 310 | clamp |
| 312 | funnel |
| 313 | mirror |
| A | A surface |
| B | B surface |
| LH | leg hole |
| P | urine receiving part |
| Q | feces receiving part |
| W | waist hole |
| X | direction |
| Y | direction |

BEST MODE FOR CARRYING OUT THE PRESENT INVENTION

Hereinafter, preferred embodiments of the present invention are explained.

<The Highly Air-Permeable and Water-Resistance Sheet According to the Present Invention>

With reference to the Drawing, the highly air-permeable and water-resistance sheet according to the present invention is explained. It should be noted that the similar notation number adds for the similar member, and that a member added same notation number refers to the similar member, as long as specifically not notifying.

Figure 1B:
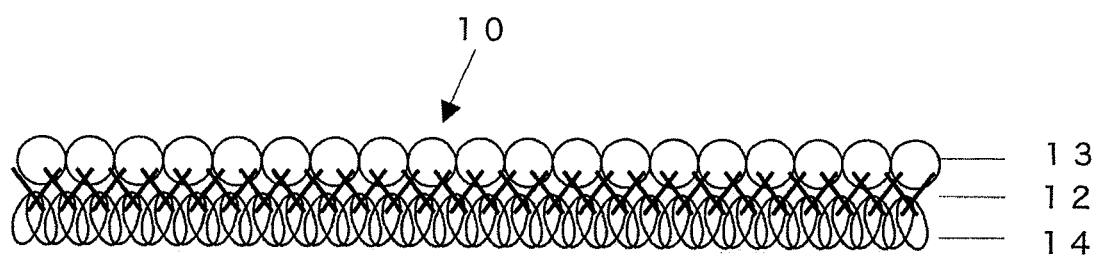
FIG. 1b is a schematic cross-section view of the highly air-permeable and water-resistance sheet according to the present invention.

The FIGS. 1a and 1b show a schematic cross-section view of the highly air-permeable and water-resistance sheet according to the present invention. According to FIGS. 1a and 1b, the highly air-permeable and water-resistance sheet according to the present invention comprises a hydrophobic non-woven fabric layer 14 consisting of a non-woven fabric and having 100 mmH$_2$O or more of water pressure resistance and a fine cellulose fiber layer 12 layered on the hydrophobic non-woven fabric layer 14 (hereinafter, a member comprising the fine cellulose fiber layer 12 and the hydrophobic non-woven fabric layer 14 also refers to as "composite sheet"). In the highly air-permeable and water-resistance sheet according to the present invention, a water repellant layer 13 is layered on either or both of the surface of the composite sheet (hereinafter, the layering the water repellant layer also refers to as "water repellant treatment"). It should be noted that although FIGS. 1a and 1b show the highly air-permeable and water-resistance sheet comprising the water repellant layer 13 layered on the fine cellulose fiber layer 12, in the highly air-permeable and water-resistance sheet according to the present invention, the water repellant layer 13 may be layered such that it is only contact with the hydrophobic non-woven fabric layer 14 (on the lower side surface of the Figure), or may be layered on both surfaces thereof.

In both of the highly air-permeable and water-resistance sheet as shown in FIGS. 1a and 1b, the fine cellulose fiber layer and the hydrophobic non-woven fabric layer are layered each other. The difference between FIGS. 1a and 1b is that the fine cellulose fiber layer 12 is merely layered on the hydrophobic non-woven fabric layer 14 in the highly air-permeable and water-resistance sheet as shown FIG. 1a, while the fine cellulose fiber layer 12 is positioned within the hydrophobic non-woven fabric layer 14 to fill up the void of the hydrophobic non-woven fabric layer with the fine cellulose fiber layer. In consideration of the lamination between the layers, the highly air-permeable and water-resistance sheet according to the present invention is preferable an aspect of showing FIG. 1b. It should be noted that the water repellant layer acts such that it is not covered on the surface of the fine cellulose fiber layer to form the film of the water repellant layer, and such that most of the water repellant layer is penetrated into the fine cellulose fiber layer to cover each surface of the fine cellulose fiber, thereby imparting hydrophobicity by repelling effect to hydrophilicity.

The highly air-permeable and water-resistance sheet according to the present invention mainly comprises three components of the hydrophobic non-woven fabric layer, the fine cellulose fiber layer consisting of e.g. micro fibrillated cellulose (MFC), and the water repellant layer. In order to manufacture the highly air-permeable and water-resistance sheet comprising these three components, it is necessary to firstly constitute a hydrophobic non-woven fabric layer/fine cellulose fiber layer wherein the second component of the fine cellulose fiber layer (e.g. MFC) is layered on the first component of the hydrophobic non-woven fabric layer (hereinafter, also referred to as "substrate") to constitute the hydrophobic non-woven fabric layer/fine cellulose fiber layer. Further, the surface of the hydrophobic non-woven fabric layer/fine cellulose fiber layer is subjected to water repellent treatment with the third component of the water repellant layer to obtain the highly air-permeable and water-resistance sheet according to the present invention. It should be noted that any additives such as synthetic resin for reinforcement, color pigment and deodorant may be contained in the water repellent treatment agent, and that the surface of the sheet may be treated with printing materials. First, the hydrophobic non-woven fabric layer and the fine cellulose fiber layer will be explained.

(The Hydrophobic Non-Woven Fabric Layer)

In the highly air-permeable and water-resistance sheet according to the present invention, the material and constitution of the hydrophobic non-woven fabric layer is not limited so far as it consists of the non-woven fabric and has 100 mmH$_2$O or more of water pressure resistance. The non-woven fabric used in the present invention may be manufactured from several materials including natural fibers such as wool and cotton, chemical fibers such as rayon and acetate, synthetic fibers, and inorganic fibers such as glass fibers and carbon fibers. In particular, the non-woven fabric is desirable that it is porous, has less wettability and a predetermined resistance of permeability to water and has thin and uniformity as possible. For example, the hydrophobic non-woven fabric layer includes non-woven fabric consisting of so-called chemical synthetic fibers including resins like as PE, PP, PET, nylon, PVA, acetate and polyurethane. For example, it includes PE fiber, PP fiber, PET fiber, nylon fiber, PVA fiber, acetate fiber, PE/PP composite fiber, PE/PET composite fiber, and PET derivatives/PET composite fiber. In addition, it may include the spun bonded non-woven fabric and the melt blown non-woven fabric wherein the spun bonded non-woven fabric and the melt blown non-woven fabric are of being directly non-woven in accordance with the spun melt method, respectively. In addition, the non-woven fabric may be a non-woven fabric formed from the fibrillated fibers by the spray spinning, and a non-woven sheet pressed with continuous highly foamed body. Among them, spun melt non-woven fabric made of polyolefins is preferable.

The spun melt non-woven fabric may be manufactured from a non-woven fabric made by the spun bonded (S), and a non-woven fabric made by the melt blown (M) to form SMS (spun bond/melt blown/spun bond) non-woven fabric, SMMS (spun bond/melt blown/melt blown/spun bond) non-woven fabric and SMSM non-woven fabric.

In the non-woven fabric made from the spun bonded (S) and the melt blown (M), the M/S ratio of the non-woven fabric made from spun bonded (S) and the melt blown (M) may be appropriately selected in accordance with dense property to be needed including pore size and water pressure resistance of the non-woven fabric. For example, the weight ratio of spun bond non-woven fabric (S) and melt blown non-woven fabric (M/S×100(%)) may be in the range of 20% to 200%. In case of less than 50%, the gaps between the fibers become larger thereby hard to maintain the water resistance. In case of more than 200%, tension strength of the non-woven fabric decreases thereby getting brittle. In addition, the water pressure resistance of the hydrophobic non-woven fabric layer is in the range of more than 100 mmH$_2$O or more, and preferably in the range of 150 mmH$_2$O or more.

In case of using these non-woven fabric made from the spun bond non-woven fabric (S) and melt blown non-woven fabric (M) as the non-woven fabric constituting the hydrophobic non-woven fabric layer, the apparent fineness of the filament constituting the layer of the spun bond non-woven fabric is preferably in the range of 3.0 denier or less. In case of more than 3.0 denier, it becomes rough and gets feeling bad.

The weight of the non-woven fabric is preferably in the range of 10 to 50 g/m$^2$. In case of less than 10 g/m$^2$, the strength becomes lower, and in case of more than 50 g/m$^2$, the stiffness becomes larger, and the costs increase. Both cases are adverse.

(The Fine Cellulose Fiber Layer)

In the highly air-permeable and water-resistance sheet according to the present invention, the fine cellulose fiber layer is a layer comprising a cellulose in the form of micro fine fiber (hereinafter, also referred to as "fine cellulose fiber") wherein the cellulose fiber of cellulose or cellulose derivative is mechanically and/or chemically treated to form the fine cellulose fiber.

The fine cellulose fiber in the present invention includes a material that a slurry of pulp made from the cellulose or cellulose derivative is mechanically fibrillated. In addition, it includes bacterial cellulose made from bacterium such as acetobacter. In particular, it includes hydrous microfibrillated cellulose fiber (MFC; Micro Fibrillated Cellulose). Here, the hydrous microfibrillated cellulose fiber will be explained in more detail.

MFC is an abbreviation of Micro Fibrillated Cellulose and is called as fine fibrillated cellulose in the art. Among them, it is called biocellulose (BC) which is originated from microorganism. These celluloses are disclosed in, for example, Patent-related Document 3 and the biocellulose is disclosed in Non-Patent-related Document 1.

The weight of the non-woven fabric used in the present invention is preferably in the range of 10 to 50 g/m$^2$, more preferably in the range of 12.0 to 20 g/m$^2$. In case of less than 10 g/m$^2$ of the weight, it is not preferable, since the strength is shortened, and the water resistance becomes lower thereby easily leakage of urine when it is used in the absorbent article. In addition, In case of more than 50 g/m$^2$ of the weight, it is not preferable, since the thickness of the sheet becomes thin and the stiffness is high and the cost thereof is high. In addition, the weight of the fine cellulose fiber layer is preferably in the range of 2.0 to 20.0 g/m$^2$, more preferably in the range of 4.0 to 10.0 g/m$^2$. In case of less than 2.0 g/m$^2$ of the weight, it is not preferable, since the water resistance becomes lower thereby easily leakage of urine when it is used in the absorbent article. On the other hand, in case of more than 20.0 g/m$^2$ of the weight, it is not preferable, since the fine cellulose fiber layer and the hydrophobic non-woven fabric layer cannot be integrated, the delamination becomes occur, and the costs thereof becomes high.

In the highly air-permeable and water-resistance sheet according to the present invention, the average length of the fine cellulose fiber constituting the fine cellulose fiber layer is preferably 0.3 mm or less. In case of more than 0.3 mm, the fibers are easily entangled each other, the sheet formability becomes less and the penetration into the hydrophobic non-woven fabric layer becomes difficult. Further, the hydration capacity of the fine cellulose fiber is preferably in the range of 15 mL/g or more. In case of less than 15 mL/g, it is hard to obtain a slurry having stable dispersibility.

It should be noted that the above-mentioned hydration capacity may be measured in the following method. That is, the fine cellulose fiber (0.5 g) is weighed in the centrifugiable test tube (30 mm×100 mm, volume 50 mL) and introduced into water to obtain 50 mL of a water dispersion liquid. Then, it is centrifuged at 2000×g (3300 rpm) for 10 minutes and examine the volume of the precipitate. The obtained values are substituted in the following equation to obtain the hydration capacity.

$$\text{Hydration capacity (mL/g)} = \text{Volume of the precipitate (mL)/weight of the fine cellulose fiber (g)}$$

(The Water Repellant Layer)

The highly air-permeable and water-resistance sheet according to the present invention comprises the water repellant layer on either or both of the surfaces of the composite sheet comprising the above-mentioned hydrophobic non-woven fabric layer and the fine cellulose fiber layer. Thereby, the highly air-permeable and water-resistance sheet according to the present invention can provide an effect originated from the component constituting the water repellant layer. Materials as used in the water repellant layer include several materials having water repellency such as silicones, Teflon (Trade mark), paraffin waxes as well-known in the art. Among them, the preferred water repellant includes an emulsion which is emulsified and dispersed in the form of oil in water (O/W). Thereby, it is possible to be appropriately subject to water repellant treatment to the water repellant layer even in the case that the component of the composite sheet consisted of the hydrophobic non-woven fabric layer and the fine cellulose fiber layer has different physical interaction due to the difference of the melting concentration and the type. In particular, in view of the cost and air permeability after the water repellant treatment, olefinic water repellent is preferable. The olefinic water repellent includes a matter mainly containing natural wax, synthetic wax and fatty acid derivatives. The type of the olefinic water repellent is not limited, but includes in the form of emulsion. The solid concentration of these olefinic water repellents is preferably in the range of 30 to 50 weight %. In case of less than 30 weight %, it is easily flowed to become unevenness. In case of more that 50 weight % it becomes viscosity to hard to handle it.

In the highly air-permeable and water-resistance sheet according to the present invention, the water repellant layer may contain resins in addition to the above-mentioned water repellant to improve water resistance. The resins include stylene resins, acrylate resins, polyester resins, ethylene resins, urea resins, melamine resins, ethylene-urea resins, glyoxal resins, or copolymer thereof. Among them, the synthetic resin binder is preferable, including stylene-butadiene resins, acrylate resins, polyester resins, ethylene-vinyl acetate copolymer. In particular, stylene-butadiene resin (SBR) is more preferable as the resins, in view of improvement of the water resistance due to formation of film state, and compatibility to the olefinic water repellent.

In addition, in the highly air-permeable and water-resistance sheet according to the present invention, in addition to the above-mentioned materials, the water repellant layer may contain the cross linker in order to stably provide the effect originated from the components of the water repellant layer. The cross linker includes polyamide epichlorohydrin resins, polyamine epichlorohydrin resins, melamine resins, urea resins, ketone resins, glyoxal, ammonia zirconium carbonate. In particular, ammonia zirconium carbonate is preferable, since it is to provide sustained effect of the water resistance and water repellent by means of directly crosslinking carboxyl group and hydroxy group of ammonia zirconium carbonate with the above-mentioned resins and water repellent.

In the highly air-permeable and water-resistance sheet according to the present invention, the relative ratio of the olefinic water repellent and the synthetic resin binder is preferably in the range of 40/60 to 70/30, more preferably in the range of 45/55 to 60/40. In addition, the content of the cross linker added as the components of the water repellant layer (especially, zirconium cross linker) is in the range of 2 to 4 parts relative to 100 parts of total content of the olefinic water repellent and the synthetic resin binder. In case of more than 4 parts, pot life of the coating composition is shortened, and in case of less than 2 parts, enough effect of the water resistance and water repellency cannot be obtained.

The water repellant treatment method to the composite of the hydrophobic non-woven fabric layer/fine cellulose fiber layer (composite sheet) with water repellant layer may use in accordance with the general coating method. For example, it includes air knife method, mayerbar coating method, gravure method, offset gravure method, micro gravure method, flexographic method, reverse roll method, blade method, curtain method, dye method. The amount of the coating is preferably in the range of 1.0 to 10.0 $g/m^2$, more preferably in the range of 1.5 to 3.0 $g/m^2$. In case of less than 1.0 $g/m^2$, enough property of water resistance and water repellency cannot be obtained, in case of more than 10.0 $g/m^2$, the water resistance property becomes almost saturated state, and the cost becomes high.

Further, in the highly air-permeable and water-resistance sheet according to the present invention, the water repellant layer may contain a deodorizer in addition to the above-mentioned components. Several materials as well-known in the art can be used as the deodorizer so far as the deodorizer can adsorb the gas molecule such as volatile composition. For example, it includes zeolite originated from natural resources, synthetic zeolite, synthetic clay, sepiolite, white clay, activated carbon, $CaCO_3$, titanium dioxide, cupper carboxymethyl cellulose (Cupper CMC), trivalent ferric ion, silver compounds (zeolite supporting silver), metal oxides, catechin. Among them, the zeolite originated from natural resources is most preferable in overall consideration of deodorization performance, cost and appearance.

The content of the deodorizer contained in the water repellant layer may be appropriately selected in accordance with type of deodorizer and desired effect. For example, the content of the deodorizer in the water repellant layer is preferably in the range of 0.5 to 10.0 $g/m^2$, more preferably in the range of 1.5~6.0 $g/m^2$. In case of less than 0.5 $g/m^2$, enough deodorization performance may not be sometimes obtained, and in case of more than 10.0 $g/m^2$, the deodorization performance is almost saturated, and it is disadvantage in view of the cost.

<The Highly Air-Permeable and Water-Resistance Sheet Composite According to the Present Invention>

Figure 2A:
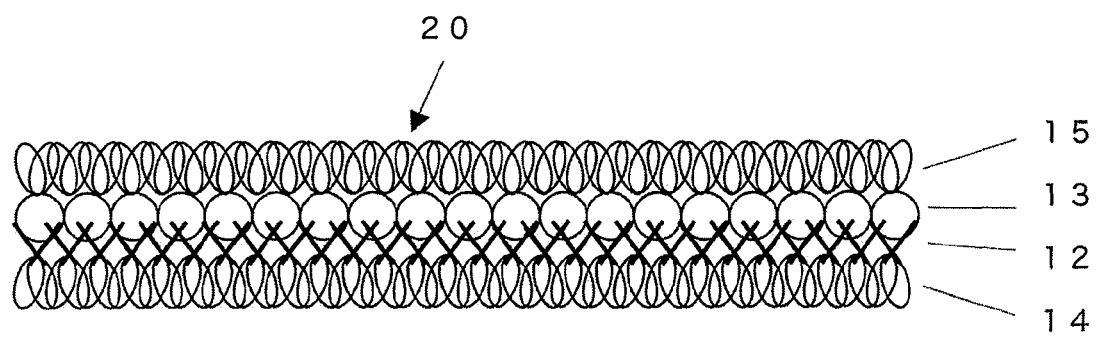
FIG. 2a is a schematic cross-section view of the highly air-permeable and water-resistance sheet according to the present invention.
Figure 2B:
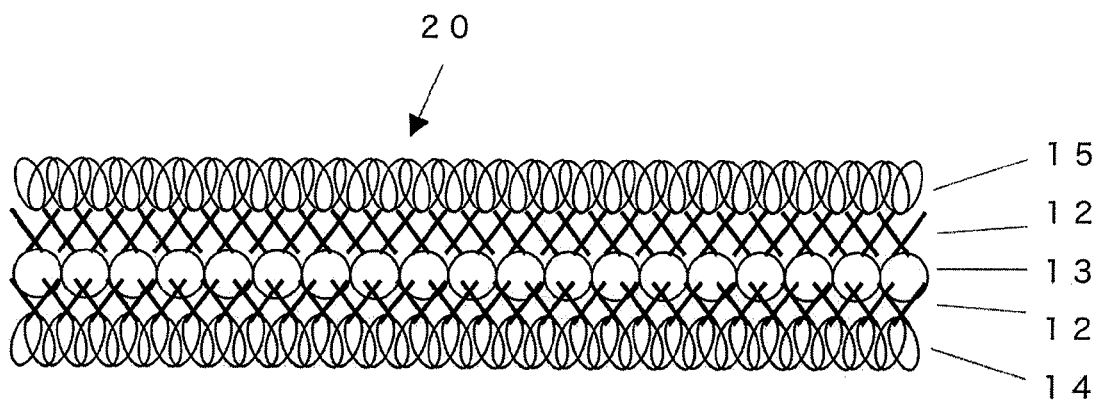
FIG. 2b is a schematic cross-section view of the highly air-permeable and water-resistance sheet according to the present invention.

As shown in FIGS. 2a and 2b, a highly air-permeable and water-resistance sheet composite 20 according to the present invention has a structure that a non-woven fabric layer 15 is layered on the water repellant layer of the above-mentioned highly air-permeable and water-resistance sheet according to the present invention. That is, the highly air-permeable and water-resistance sheet composite according to the present invention is characterized in that it comprises the hydrophobic non-woven fabric layer 14, the fine cellulose fiber layer 12 layered on the hydrophobic non-woven fabric layer 14, the water repellant layer 13 layered on the fine cellulose fiber layer, and the non-woven fabric layer 15 layered onto the water repellant layer 13. The highly air-permeable and water-resistance sheet composite according to the present invention may comprise the fine cellulose fiber layer 12 between the water repellant layer 13 and the non-woven fabric layer 15 as shown in FIG. 2b. In addition, the highly air-permeable and water-resistance sheet composite according to the present invention may comprise the water repellant layer 13 further layered on the non-woven fabric layer 15, not shown in the Drawing. It should be noted that the non-woven fabric layer 15 may be the same as the hydrophobic non-woven fabric layer 14.

In highly air-permeable and water-resistance sheet composite according to the present invention, the fine cellulose fiber layer 12, the water repellant layer 13 and the hydrophobic non-woven fabric layer 14 may used as the same as those of the highly air-permeable and water-resistance sheet according to the present invention as mentioned above. In particular, the non-woven fabric layer 15 layered onto the water repellant layer 13 may be the above-mentioned hydrophobic non-woven fabric layer. However, in case that a water resistance is not so much desired, it is convenient to use several types of non-woven fabrics.

The highly air-permeable and water-resistance sheet composite according to the present invention comprises the non-woven fabric layer 15 onto the water repellant layer 13. Accordingly, the water repellant layer 13 covering the fine cellulose fiber constituting the fine cellulose fiber layer layered on the hydrophobic non-woven fabric layer 14 will be physically isolated from the surface of the highly air-permeable and water-resistance sheet composite. Therefore, the fine cellulose fiber layer covered with the component constituting the water repellant layer will be protected from the physical forces such as ablation, thereby improving the durability. In addition, the highly air-permeable and water-resistance sheet composite according to the present invention is the combination of the hydrophobic non-woven fabric layer, the fine cellulose fiber layer and the water repellant layer. Accordingly, it is possible to prevent the passage of microorganism and fine particles. Further, the highly air-permeable and water-resistance sheet composite according to the present invention is constituted such that it maintains its air permeability. Accordingly, the provision of the function from the functional component contained in the water repellant layer and the others such as the deodorizer is not affected, although it has a multilayered structure. Therefore, the highly air-permeable and water-resistance sheet composite according to the present invention is practically useful.

<Method for Manufacturing the Highly Air-Permeable and Water-Resistance Sheet According to the Present Invention>

Next, the method for manufacturing the highly air-permeable and water-resistance sheet according to the present invention will be explained. The method for manufacturing a highly air-permeable and water-resistance sheet according to the present invention comprises the steps of degassing the hydrophobic non-woven fabric layer using a degassing medium containing water, of layering a fine cellulose fiber layer on so degassed hydrophobic non-woven fabric layer, and of layering a water repellant layer on said fine cellulose fiber layer. Hereinafter, each of steps is also referred to as a degassing step, a fine cellulose fiber layer layering step and a water repellant layer layering step. Here, each step will be explained in below.

(The Degassing Step)

In the method for manufacturing a highly air-permeable and water-resistance sheet according to the present invention, the hydrophobic non-woven fabric layer consisting of the non-woven fabric is preliminarily degassed using the degassing medium containing water in order to uniformly layer the fine cellulose fiber layer. By this degassing step, gasses such as air contained in the hydrophobic non-woven fabric layer will be removed from the hydrophobic non-woven fabric layer and replaced with the degassing medium. The so degassed hydrophobic non-woven fabric layer will be filled up and saturated with the degassing medium. Therefore, in the present invention, the degassing medium is also referred to as a saturation medium. It should be noted that the degassing step is repeated with several times using same or different degassing medium.

Water, especially deionized water is generally used as the degassing medium. However, the degassing medium is not limited so far as it contains water. The degassing medium may contain a hydrophilic organic solvent and a surface-activating agent in order to enhance the uniform coating of the slurry such as MFC slurry used for layering fine cellulose fiber layer to the hydrophobic non-woven fabric layer when the fine cellulose fiber layer is layered as the following step.

The hydrophilic organic solvent contained in the degassing medium in addition to water includes alcohols such as methanol, ethanol and propanol. In particular, the hydrophilic organic solvent is preferably ethanol. The content of the hydrophilic organic solvent is desirably in the range of 50% or more relative to the volume of the degassing medium in view of the cost and handling thereof.

In case of using water only as the degassing medium, it is necessary to contain small amount of the surface-activating agent in water in order to well maintain the wettability of the surface of the hydrophobic non-woven fabric layer. Cationic, anionic or nonionic agent of the mixture thereof can be used as the surface-activating agent. Representatives include nonionic agent or anionic agent which has good permeability, or mixture thereof. Nonionic agent includes an adduct of nonylphenol ethylene oxide such as polyoxyethylene (10) nonylphenylether (NPEO). Anionic agent includes for example dodecylbenzene sulfonic acid (LAS). Mixture of NPEO and LAS is one of the preferable surface-activating agents. Although the detergents as commercially available may be used, single component of the agent is preferably used in consideration of the recovering or drainage treatment.

The content of the surface-activating agent in the degassing medium is determined in accordance with CMC (Critical Micelle Concentration), and is preferably in the range of 100 to 1000 ppm. If the surface-activating agent is remained in the sheet, the water resistant property is affected. So, the content is preferably lower as possible. For this purpose, for example, the following method is selected. That is, the hydrophobic non-woven fabric layer is subjected to the surface treatment with a small amount liquid containing the relative high concentration of the surface-activating agent to preliminarily adsorb the surface-activating agent on the surface of the hydrophobic non-woven fabric layer. After that, the sheet is saturated with large amount of water. For example, in case of using NPEO, 300 to 500 ppm of the activated agent in aqueous solution is sprayed on the hydrophobic non-woven fabric layer at 100% of the weight thereof (if the weight of the non-woven fabric is 15 g/m$^2$, the sprayed solution is 15 g/m$^2$). After that, the hydrophobic non-woven fabric layer is sufficiently filled up and saturated with 20 times of the deionized water.

(The Fine Cellulose Fiber Layer Layering Step)

In the method for manufacturing a highly air-permeable and water-resistance sheet according to the present invention, the composite sheet comprising the hydrophobic non-woven fabric layer and the fine cellulose fiber layer layered on the hydrophobic non-woven fabric layer is manufactured by layering the hydrophobic non-woven fabric layer and the fine cellulose fiber layer in the fine cellulose fiber layer layering step in accordance with several layering technique. For example, the technique includes the wet forming method in which the following dispersion liquid containing the component constituent the fine cellulose fiber layer is spread on the hydrophobic non-woven fabric layer using papermaking machine and others to form a layered product of hydrophobic non-woven fabric layer/fine cellulose fiber layer, and a method in which high viscous slurry is coated on the carrier sheet to form a thin layer of fine cellulose fiber, the thin layer is delaminated from the carrier sheet, and is bonded to the hydrophobic non-woven fabric to form the layered product of hydrophobic non-woven fabric layer/hydrophobic non-woven fabric layer.

In particular, in the present invention, in case of layering the fine cellulose fiber layer on the hydrophobic non-woven fabric layer, the following coating method using slurry of the fine cellulose fiber containing water is to have an advantage, in consideration of the hydrophobicity of the hydrophobic non-woven fabric layer and the hydrophilicity of the fine cellulose fiber layer.

That is:

(1) means for directly coating with a water dispersion slurry in which, after the substrate is treated to be hydrophilic with the surface-activating agent, the water dispersion slurry containing the component of the fine cellulose fiber layer such as MFC is directly coated to the obtained substrate;

(2) means for directly coating the substrate with a water dispersion slurry in which the surface-activating agent is added to the above-mentioned slurry, and a penetration ability is provided; and (3) means for directly coating the substrate with a dispersion slurry using a mixed solvent of water and an organic solvent as a dispersion medium for preparing a dispersion slurry containing the component of the fine cellulose fiber layer, wherein the organic solvent has a penetration ability to the substrate and can stably disperse the fine cellulose fiber such as MFC.

In particular, the above-mentioned means (1) is a preferable method in view of enhancing the uniformity. In addition, the above-mentioned means (3) is a preferable method in view of enhancing the water pressure resistance.

In case of directly coating method, the high viscous slurry of MFC dispersion liquid is directly coated on the hydrophobic non-woven fabric layer, and then the liquid is removed, and dried. Thereby, the layered product comprising extremely thin layer of the fine cellulose fiber layer having 0.5 to 5 g/m² which cannot be achieved in the prior art. The fine cellulose fiber layer has dense structure like parchment paper, and also has s porous structure having a plurality of pores. In the dry state, since the normal microorganisms cannot be passed thorough the pore, it can be applied as a layer having a barrier against bacteria.

In addition, in consideration of the binding state of the hydrophobic non-woven fabric layer and the fine cellulose fiber layer, the obtained product after the above-mentioned layering may be subjected to heat press treatment. In addition, binding agent such as E.V.A. emulsion is added to the dispersion liquid, and after the desolvation of the slurry is performed, it may be subjected to heat treatment. By these treatments, it is possible to obtain the composite sheet in stable combined state.

The water mixable solvent in the preparation of the dispersion liquid containing the component constituting the fine cellulose fiber layer is not limited so far as it has compatible to water. Example of such a solvent includes methyl alcohol, ethyl alcohol, isopropyl alcohol, ethylene glycol, propylene glycol, dioxane, aetone, tetrahydro furan, glycerine, neopentylglycol, pentaerythritol and dimethyl sulfoxide. In particular, ethyl alcohol is preferably used as the solvent.

The dispersion liquid (hereinafter, also referred to as "slurry") used for layering the fine cellulose fiber layer may be manufactured in which the component constituting the fine cellulose fiber layer such as MFC is added to the above-mentioned liquid medium or to a mixed medium of water and the solvent, and it is applied with an appropriate shear force/agitation force to prepare the uniform dispersion liquid.

In case of using, for example, MFC as the component of the fine cellulose fiber layer in the preparation of the dispersion liquid, a stable dispersion liquid of MFC and the following additive particle (if it is) is formed due to the viscosity of the MFC in the liquid medium. It should be noted that it is preferable to use the method based on Patent-related Document 4 as proposed by the present inventors in order to efficiently manufacturing the water dispersion liquid used in the present invention.

The MFC concentration in the MFC slurry is preferable in the range of 3% or less, since the slurry has high viscosity. It is more preferable that the concentration is in the range of 0.5 to 2.0 weight % in view of the coating performance.

MFC is obtained as partly swelled MFC paste in the hydrated state by continuously beating and grinding under high pressure the wood pulp solution having 2 to 5 weight % of dispersion concentration in the water medium for long time. In case of BC, BC paste in the hydrated state having 0.1 to 2.0 weight % of the concentration is obtained by which the fine cellulose fiber is created from the acetobacter by culturing the acetobacter in the aqueous solution medium, and the created fine cellulose fiber is purified, aggregated and concentrated.

The MFC and BC pastes is difficult to handle as fluid, since these have extremely high viscosity themselves. Accordingly, it is preferable to prepare it as dispersion liquid which is easily handled by diluting it to 2 weight % or lower of the concentration. Water and an organic solvent such as ethanol are generally used as the diluent. It should be noted that polyvalent alcohol such as polyethylene glycol, propylene glycol and glycerin may be added in the diluent as plasticizer in order to prevent the creation of the shrinked ruck and/or cruck along with overdry of MFC in following drying process.

(The Water Repellant Layer Layering Step)

In the method for manufacturing the highly air-permeable and water-resistance sheet according to the present invention, a method for carrying out the water repellant layer layering step is not limited so far as the water repellant layer is layered on either or both of surfaces of the composite sheet comprising the hydrophobic non-woven fabric layer and the fine cellulose fiber layer which are layered as mentioned above. The water repellant treatment includes the well-known method such as spray coating with spraying the water repellant, roll coater and brush coater.

In the method for manufacturing the highly air-permeable and water-resistance sheet according to the present invention, the water repellant treatment may be subjected to one side or both sides of the layered product of the hydrophobic non-woven fabric layer/fine cellulose fiber layer. In case of treating one side of the layered product of the hydrophobic non-woven fabric layer/fine cellulose fiber layer, it is preferably treated on the side of the fine cellulose fiber layer. Thereby, the hydrophilicity and the water penetrating property of the cellulose is blocked, and the stable water proof and water repellency can be maintained with the combined effect of the hydrophobic non-woven fabric layer.

FIGS. 3A to 3E show the schematic view of example of these methods for manufacturing the highly air-permeable and water-resistance sheet according to the present invention. These figures are a flowchart showing a method for manufacturing the highly air-permeable and water-resistance sheet according to the present invention. As referred to FIGS. 3A to 3E, the substrate constituting the hydrophobic non-woven fabric layer is supplied from roller in the wound form into the system by an action such as an unreel (substrate unreel). The substrate is filled up and saturated with the degassing medium such as water and solvent constituting the above-mentioned dispersion liquid in order to degas the air contained in the substrate (pretreatment of the substrate). After that, the dispersion liquid such as MFC slurry which is previously prepared is coated on the substrate, as shown in FIGS. 3A to 3E. After the solid component constituting the dispersion liquid is brought into a predetermined shape on the substrate, the medium of the dispersion liquid is removed using vacuum pump (vacuum suction treatment).

Figure 3A:
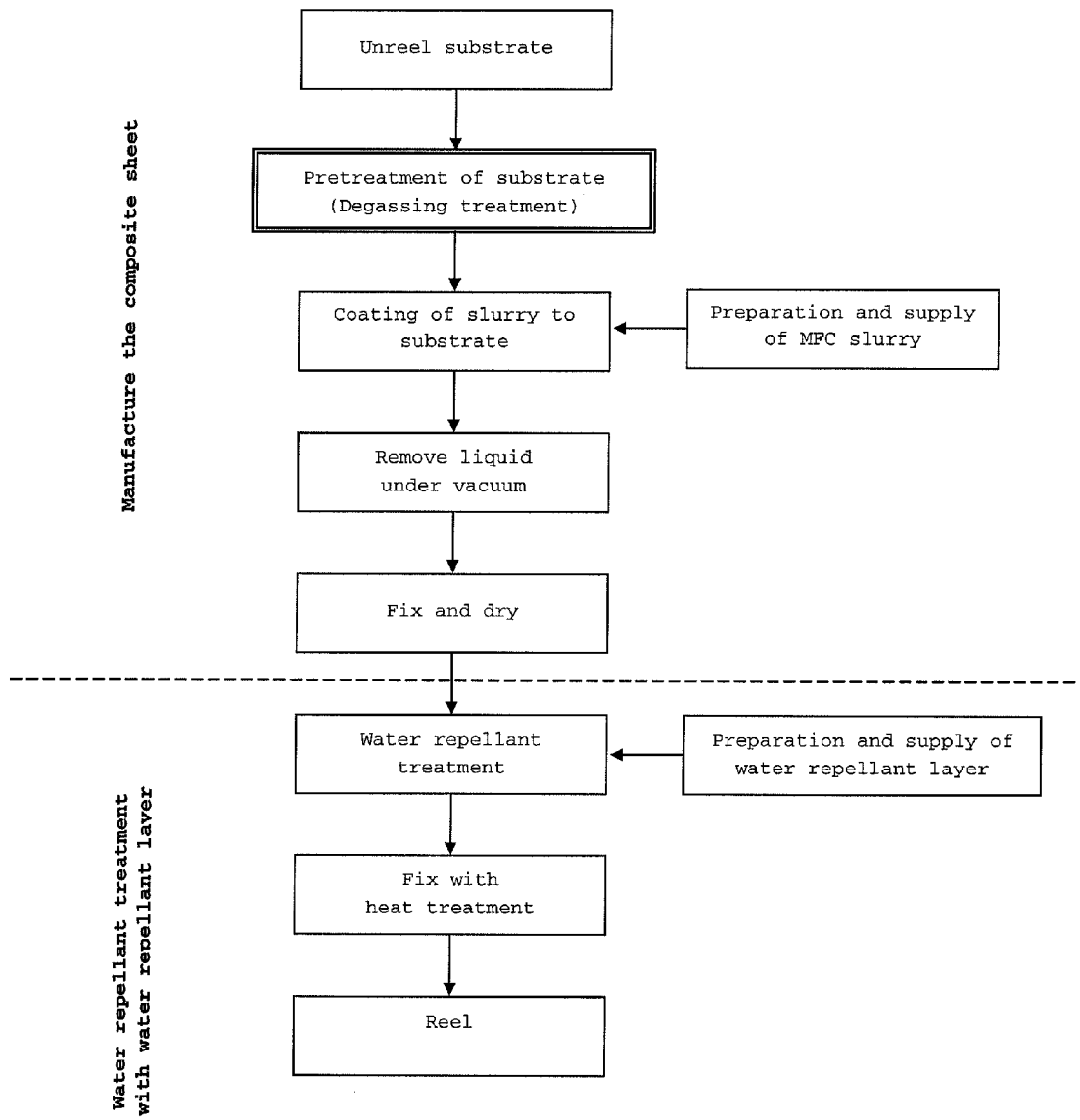
FIG. 3A is a flowchart showing a method for manufacturing the highly air-permeable and water-resistance sheet according to the present invention.
Figure 3B:
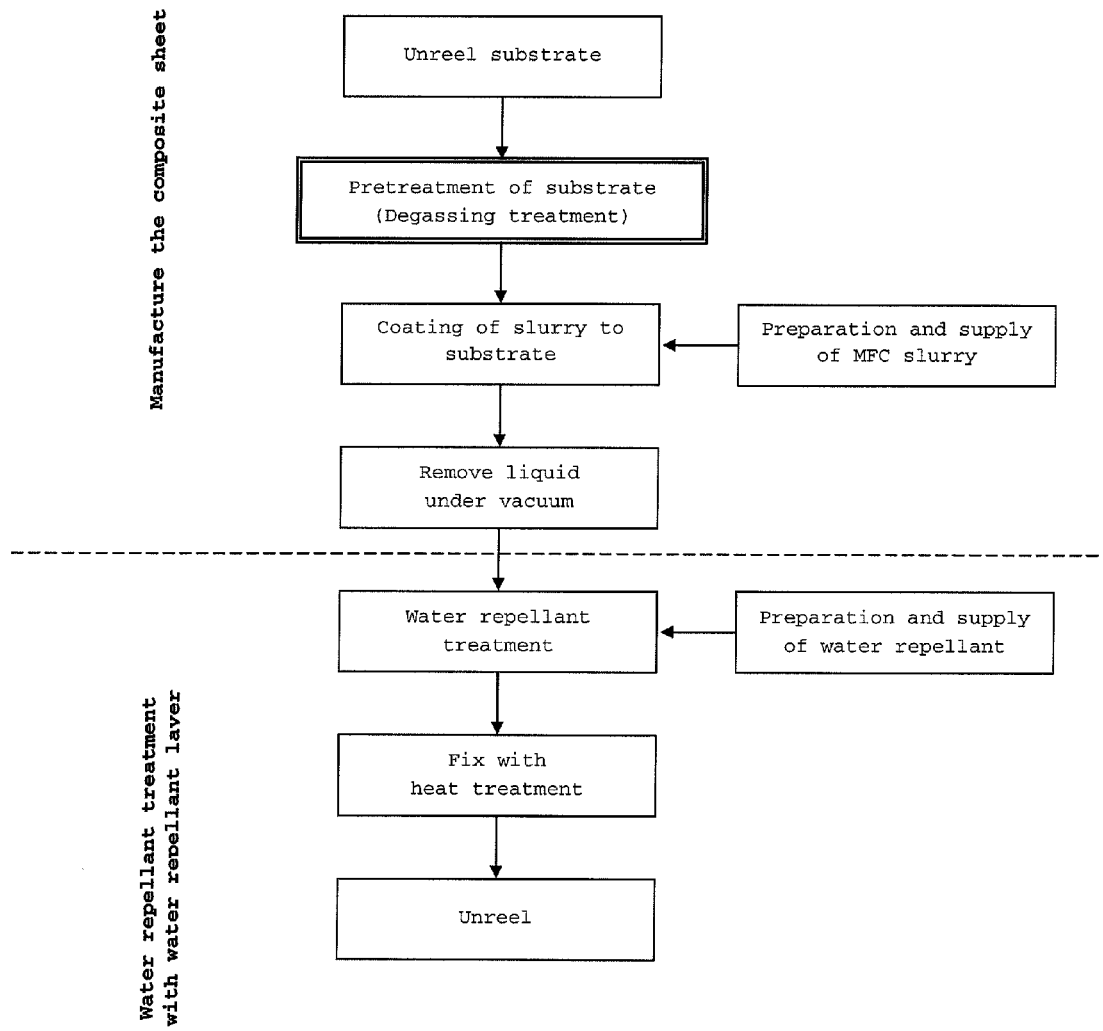
FIG. 3B is a flowchart showing a method for manufacturing the highly air-permeable and water-resistance sheet according to the present invention.
Figure 3C:
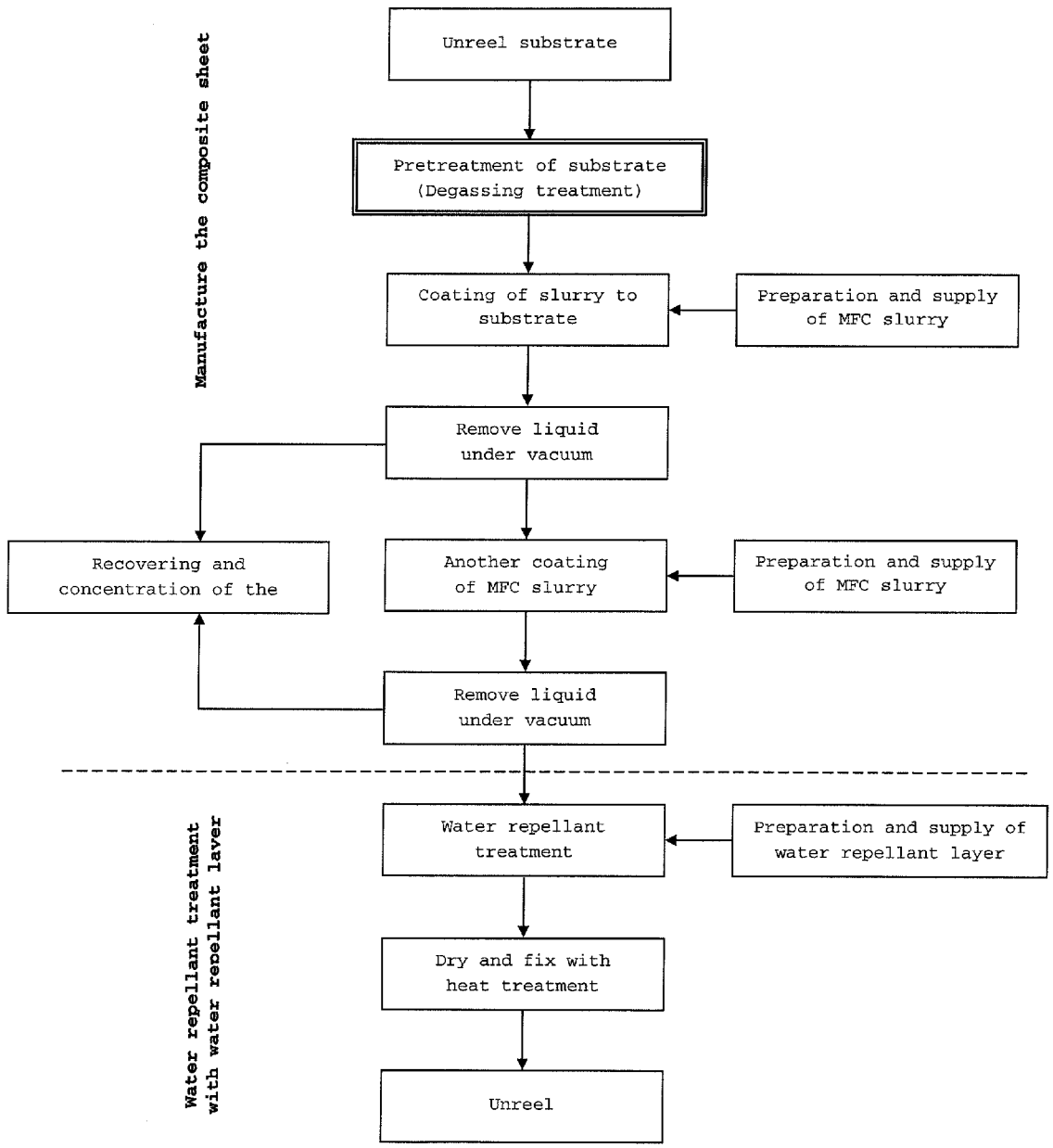
FIG. 3C is a flowchart showing a method for manufacturing the highly air-permeable and water-resistance sheet according to the present invention.

The vacuum treated composite sheet (the layered product of hydrophobic non-woven fabric layer/fine cellulose fiber layer) may be then dried and fixed (see FIG. 3A). In addition, the vacuum treated layered product of hydrophobic non-woven fabric layer/fine cellulose fiber layer may be re-coated with the dispersion liquid (after coat; see FIG. 3C). In addition, the vacuum treated layered product of hydrophobic non-woven fabric layer/fine cellulose fiber layer may be water squeezed by the press apparatus thorough the felt (squeezing by the press; see FIGS. 3D and 3E). As not shown in Figures, the layered product of the hydrophobic non-woven fabric layer/fine cellulose fiber layer may be dried and fixed.

On the other hand, the layered product of the hydrophobic non-woven fabric layer/fine cellulose fiber layer which is vacuum treated or dried and fixed is subjected to the water repellant treatment (Water repellant treatment; FIGS. 3A to 3E). The method for preparing the water repellant layer is not limited so far as the above-mentioned water repellant such as the olefinic water repellent, resins such as the synthetic resin binder, and the cross linker such as ammonia zirconium carbonate are uniformly mixed at the predetermine ratio and the timing of mixing. For example, after a main agent comprising the water repellant such as the olefinic water repellent and resins such as the synthetic resin binder are prepared by mixing at the predetermined ratio under stirring, the cross linker may be added at the last minute of the coating to the composite sheet under stirring along with the addition of water to prepare the coating composition having the predetermined concentration and viscosity.

Figure 3D:
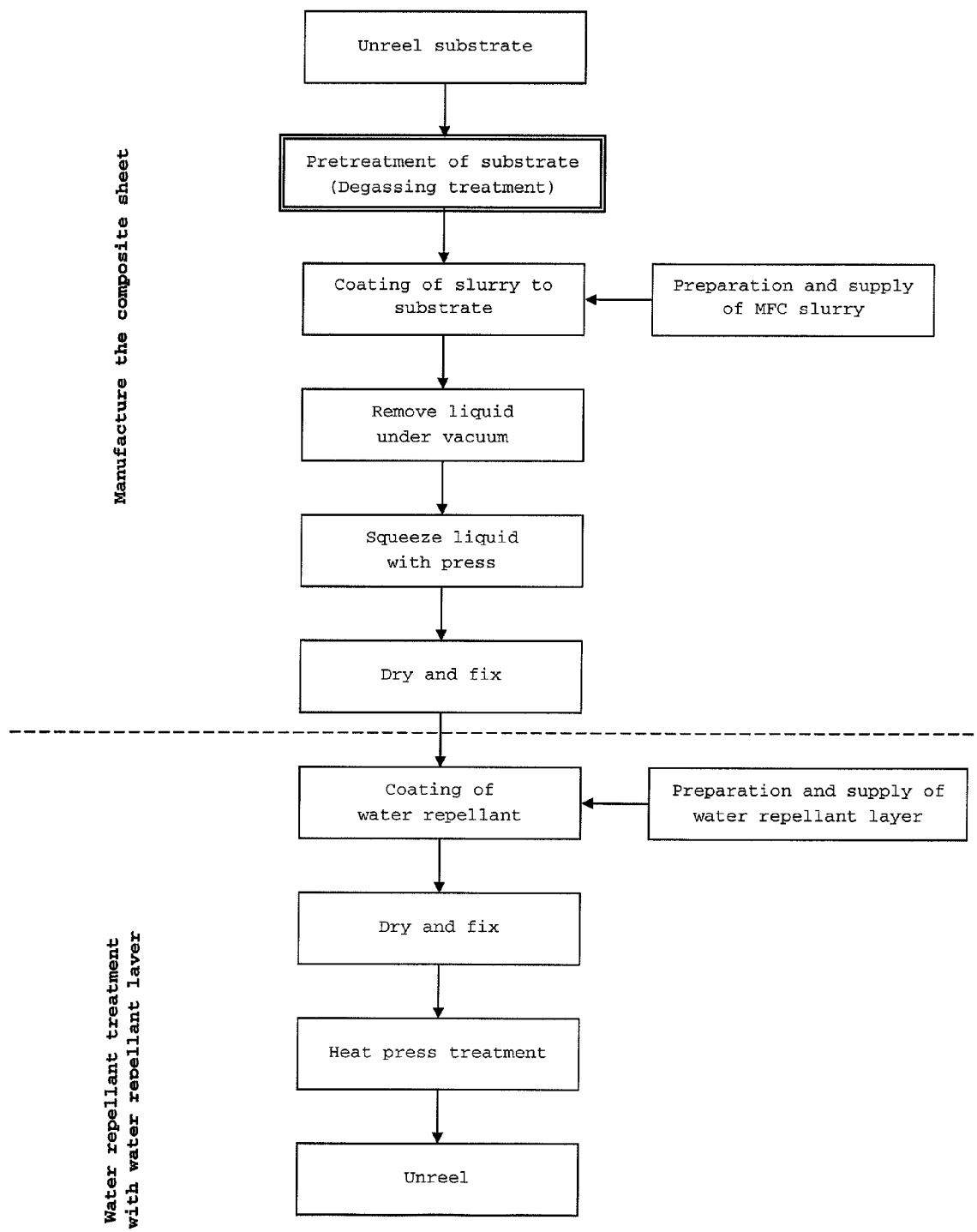
FIG. 3D is a flowchart showing a method for manufacturing the highly air-permeable and water-resistance sheet according to the present invention.
Figure 3E:
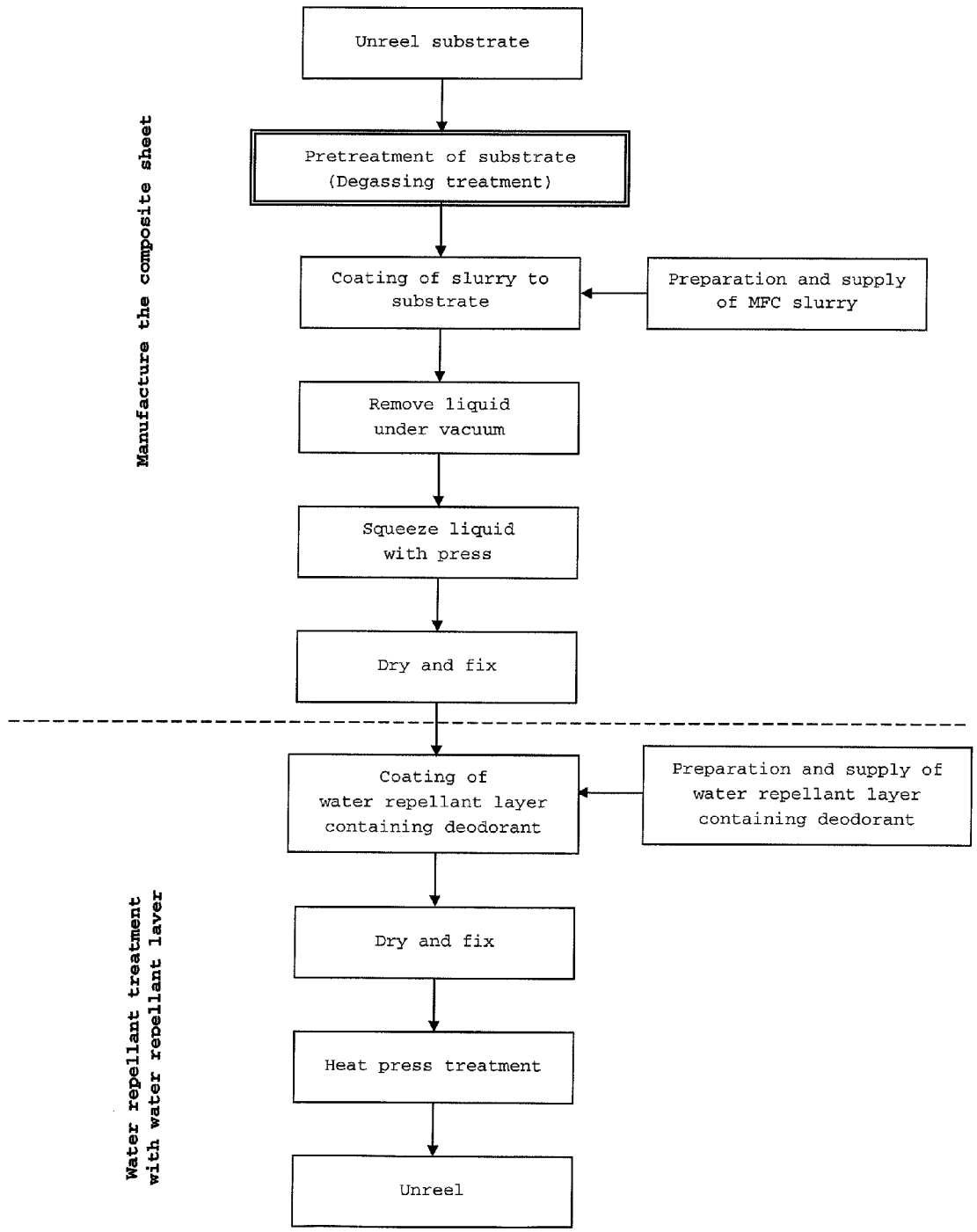
FIG. 3E is a flowchart showing a method for manufacturing the highly air-permeable and water-resistance sheet according to the present invention.

After the water repellant treatment, the layered product of the hydrophobic non-woven fabric layer/fine cellulose fiber layer may be heat treated and fixed. At this heat treatment and fixation, it may be simultaneously dried. In addition, the heated layered product of the hydrophobic non-woven fabric layer/fine cellulose fiber layer may be subjected to the calendaring treatment (see calendaring treatment; FIGS. 3D and 3E). In addition, in the present invention, it may be further heat treated in order to improve the water resistance after the calendaring treatment. The fine cellulose fiber layer constituting the composite sheet has high resistance to high temperature and hard to be easily fused. On the other hand, the hydrophobic non-woven fabric layer is relatively thermally fused. When the thermal treatment equipment is combined with the heat roller and cooling roller, the side of the fine cellulose fiber layer is in contact with the heat roller, the side of the hydrophobic non-woven fabric layer is in contact with the cooling roller and the heat press treatment is performed, the surface of the hydrophobic non-woven fabric layer is partially fused, the fused part is penetrated and adhered to the fine cellulose fiber layer, the integration of the fine cellulose fiber layer with the hydrophobic non-woven fabric layer, the thickness thereof becomes lower and the water resistance can be improved. In case of, as hydrophobic non-woven fabric layer, the using spun melt non-woven fabric of sheath/core type composite fiber such like as PE/PET spun bond and PE/PP spun bond comprising an easily fusible component as sheath and relatively-hard-to-fuse component as core, it is possible to easily and conveniently perform the heat treatment. It should be noted that although the manufacturing step of the composite sheet and the layering step of the water repellant layer are shown as continuous steps in FIGS. 3A to 3E, the highly air-permeable and water-resistance sheet may be manufactured by the steps as separated each other.

<Apparatus for Manufacturing the Highly Air-Permeable and Water-Resistance Sheet According to the Present Invention>

Next, an example of the apparatus for manufacturing the highly air-permeable and water-resistance sheet according to the present invention will be explained with reference to FIGS. 4A to 6.

Figure 4A:
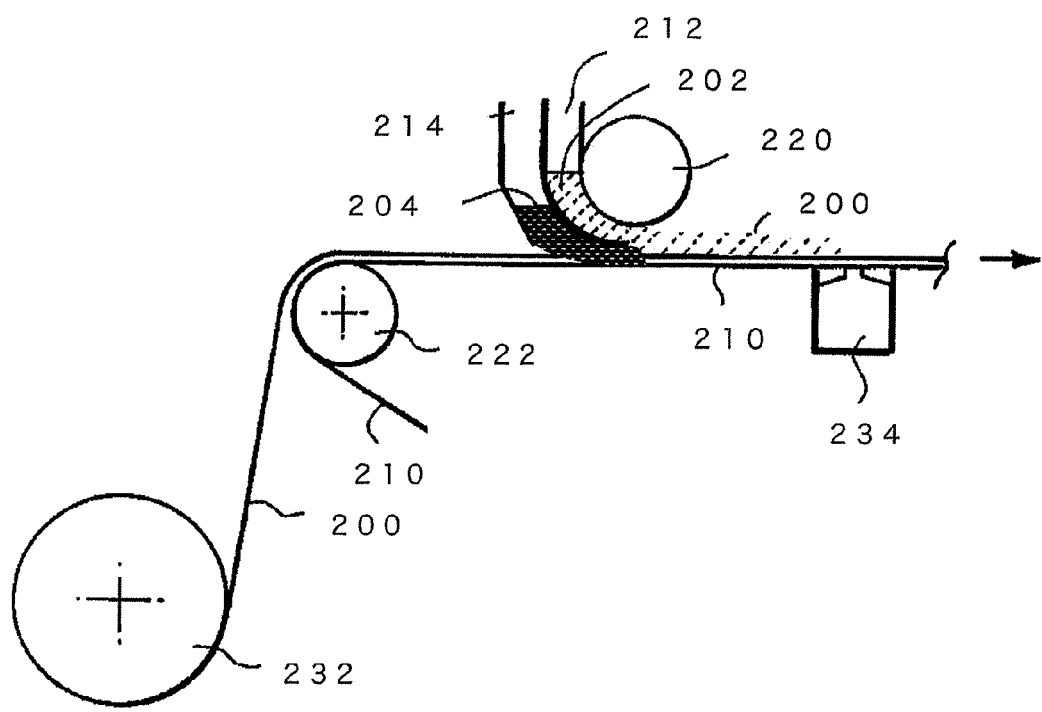
FIG. 4A is a schematic view of the coating unit in the apparatus for manufacturing the highly air-permeable and water-resistance sheet according to the present invention.

FIG. 4A is a schematic view of the coating unit in the apparatus for manufacturing the highly air-permeable and water-resistance sheet according to the present invention. A sheet (substrate) 200 constituting the hydrophobic non-woven fabric layer unreeled from an unreeler 232 is positioned on a net conveyer 210 carried with a roller 222. A coating slurry 202 and a saturation medium 204 are supplied on the surface of the sheet 200 from a head box 212 and a saturation medium supplier 214 in synchronization with the movement of the sheet 200. After that, the sheet 200 is moved and passed through between the coating roller 220 and the net conveyer 210, and removed liquid with a vacuum unit 234 connected with the vacuum pump (not shown in Figures) and progressed in the further steps.

A unreel apparatus for manufacturing paper and the normal non-woven fabric may be sued as the unreeler 232. Although the unreeled substrate may be carried in the coating unit by the roller, the substrate is generally carried on the net conveyer 210 as supporting body as shown in FIG. 4A.

Next, the pretreatment of the substrate and the slurry coating to the substrate will be explained in detail with reference to FIGS. 4B, 5A to 5C, and 6.

Figure 4B:
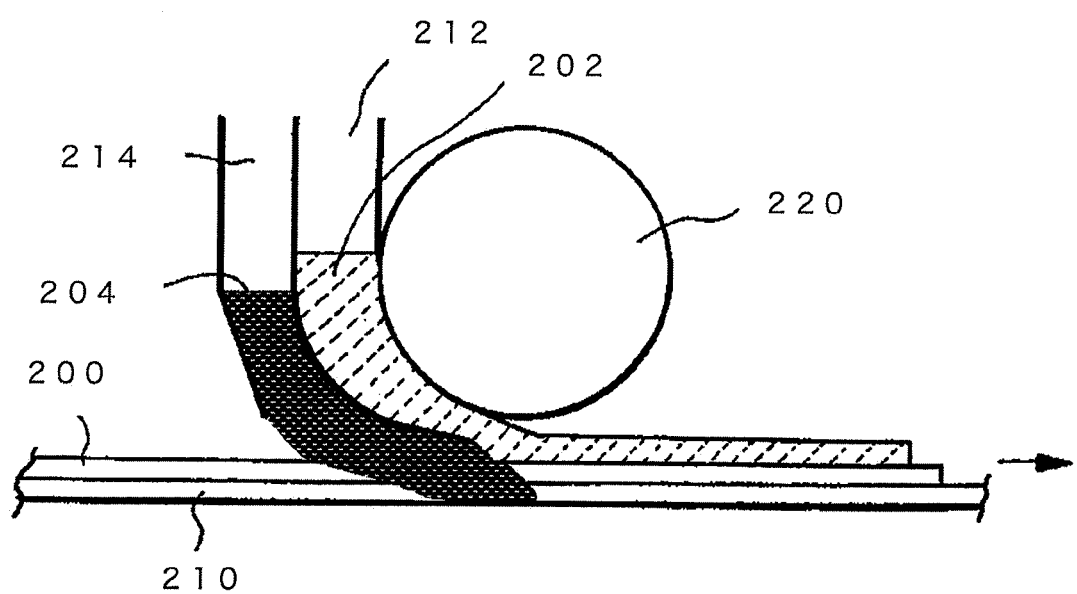
FIG. 4B is an enlarged view of FIG. 4A.

FIG. 4B is an enlarged view of FIG. 4A, indicating the proximity of the coating roller 220. The saturation medium 204 is supplied from the saturation medium supplier 214 on the moving sheet 200. After that, the coating slurry 202 supplied from the head box 212 is supplied on the sheet 200, and the coating slurry 202 is positioned by the rotation of the coating roller 220 on the sheet 200 in synchronization with the movement of the sheet 200 moving on the net conveyer 210.

Figure 5A:
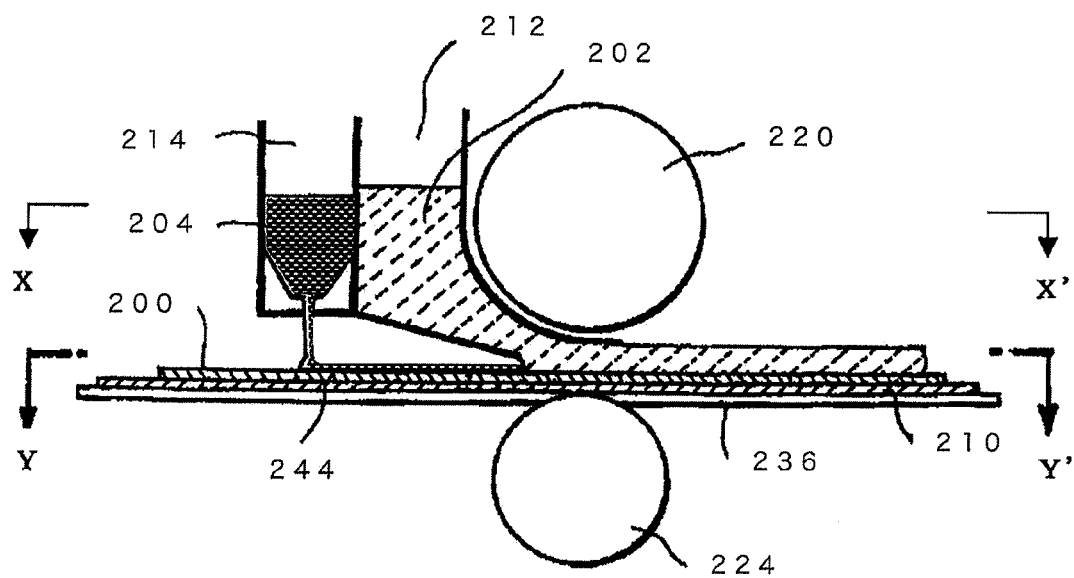
FIG. 5A is one of aspects of the apparatus for manufacturing the highly air-permeable and water-resistance sheet according to the present invention.
Figure 5B:
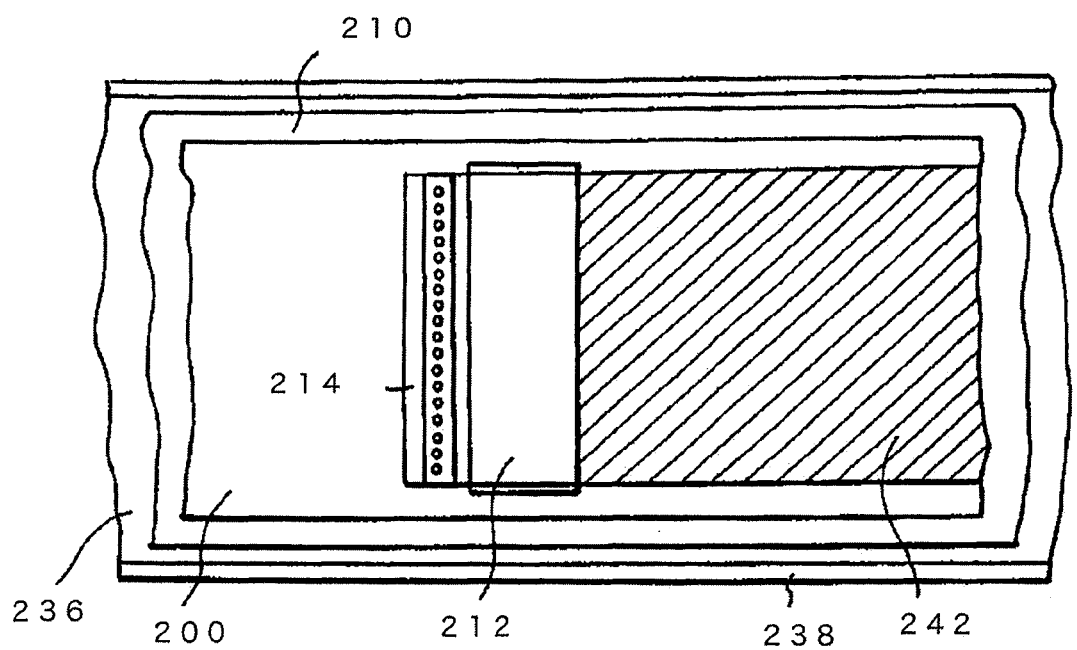
FIG. 5B is a plan view of FIG. 5A taken in the direction X-X'.
Figure 5C:
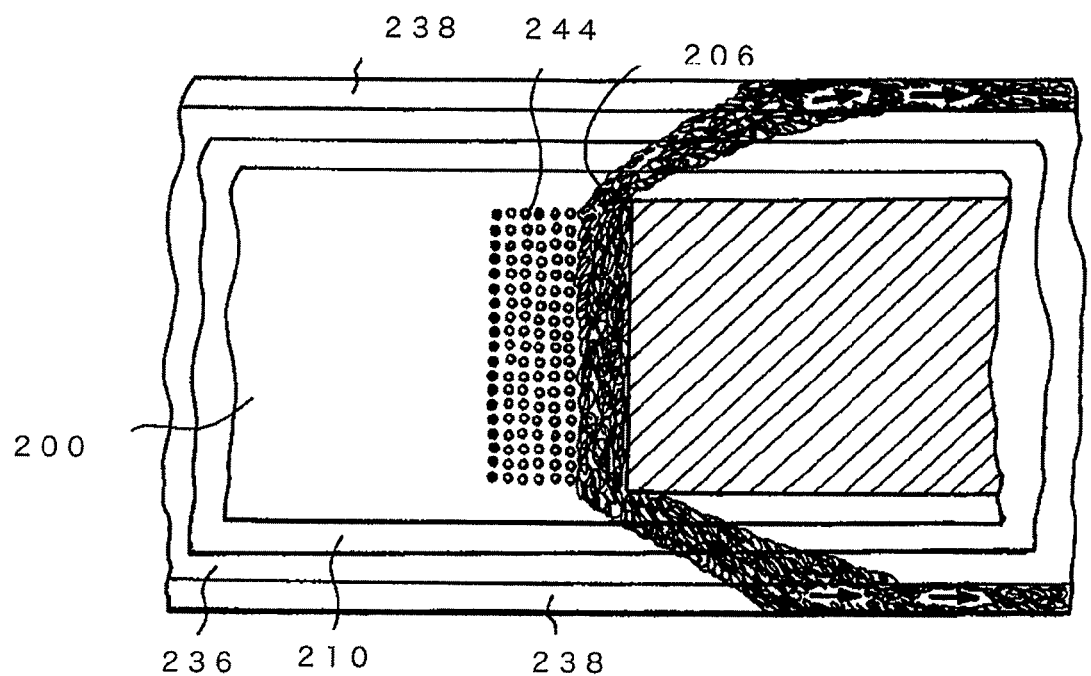
FIG. 5C is a plan view of FIG. 5A taken in the direction Y-Y'.
Figure 6:
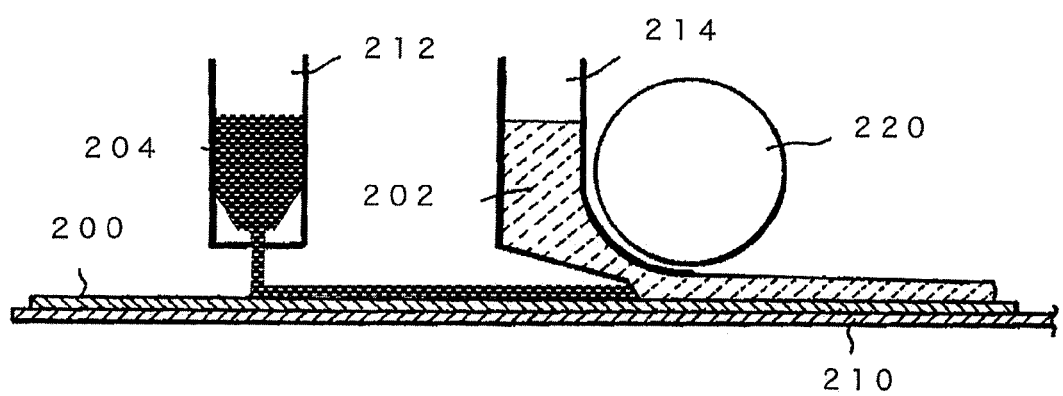
FIG. 6 is one of aspects of the apparatus for manufacturing the highly air-permeable and water-resistance sheet according to the present invention.

The saturation medium 204 may be supplied on the upstream position at which the coating slurry 202 is supplied as shown in FIGS. 4B and 5A. The saturation medium 204 may be supplied in accordance with the method for spreading state as shown in FIG. 4B, or may be supplied on the sheet in the droplet form as shown in FIG. 5A. A water stream 244 which is supplied and formed as mentioned above is only left for the removal of extra water at the narrow portion of coater header in accordance with the movement of the net conveyer 210 and water stream is transferred through the hydrophobic non-woven fabric layer to the conveyer. Thereby, the medium in the sheet will block the air collectively flow into the mechanical gap during the coating operation, it is mixed finally with the coating slurry to penetrate into the substrate, thereby forming the fine cellulose fiber layer (coating layer) on the sheet. On the other hand, the saturation medium may be supplied on the sheet in the shower form as shown in FIG. 6. It should be noted that the saturation medium 204 is not limited so far as it is filled up with the void of the sheet 200 and the sheet is degassed with such a liquid (degassing medium). For example, such a liquid is preferably water, or mixed solvent of water and an organic solvent, constituting the above-mentioned dispersion liquid.

<The Method for Manufacturing a Highly Air-Permeable and Water-Resistance Sheet Composite According to the Present Invention and an Apparatus for Manufacturing Thereof>

The method for manufacturing a highly air-permeable and water-resistance sheet composite according to the present invention comprises the degassing step, the fine cellulose fiber layer layering step and the water repellant layer layering step as mentioned in the method for manufacturing a highly air-permeable and water-resistance sheet, and further comprises a step of further layering a layer having a non-woven fabric onto the water repellant layer. Hereinafter, the step is also referred to as a non-woven fabric layering step, and explained.

In the method for manufacturing a highly air-permeable and water-resistance sheet composite according to the present invention, the non-woven fabric layering step is not limited so far as it is a method for layering the above-mentioned non-woven fabric layer on to the water repellant layer.

In the non-woven fabric layering step, what is layered onto the water repellant layer may be the non-woven fabric layer. In the non-woven fabric layering step, in case of using the non-woven fabric layer, the highly air-permeable and water-resistance sheet composite as shown in FIG. 2a will be obtained.

In addition, in the non-woven fabric layering step, what is layered onto the water repellant layer may be as the composite sheet comprising the non-woven fabric layer and the fine cellulose fiber layer layered on the non-woven fabric layer. The non-woven fabric layering step is performed such that, in case of using the composite sheet, the fine cellulose fiber layer of the composite sheet is in contact with the water repellant layer. Thereby, the highly air-permeable and water-resistance sheet composite as shown in FIG. 2b will be obtained.

In addition, the method for manufacturing a highly air-permeable and water-resistance sheet composite according to the present invention may further comprises a step of further layering the fine cellulose fiber layer on the water repellant layer between the water repellant layer layering step and the non-woven fabric layering step wherein the a step of further layering the fine cellulose fiber layer is also referred to as a fine cellulose fiber layer layering second step. The fine cellulose fiber layer layering second step may be performed as the same method mentioned in the fine cellulose fiber layer layering step.

It should be noted that the non-woven fabric layer used in these non-woven fabric layering step and fine cellulose fiber layer layering second step may be of degassing it using the degassing medium in accordance with the above-mentioned degassing step.

<The Absorbent Article According to the Present Invention>

Figure 7:
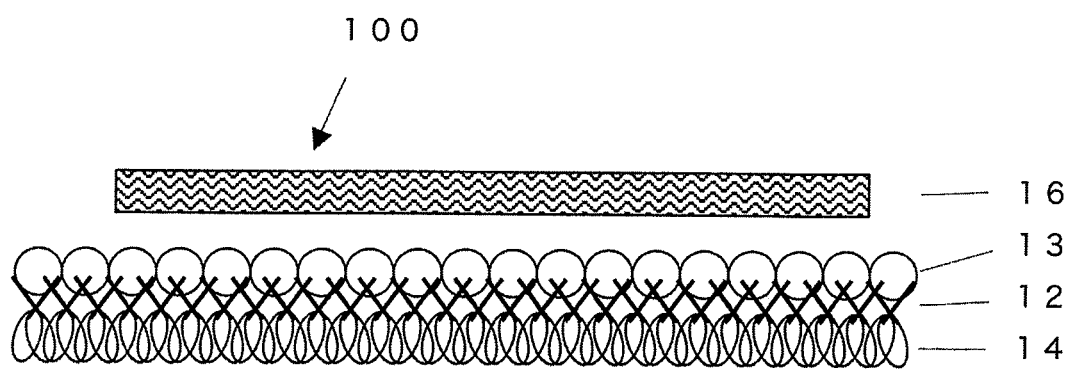
FIG. 7 is a partial schematic cross section view of the absorbent article according to one aspect of the present invention.
Figure 8:
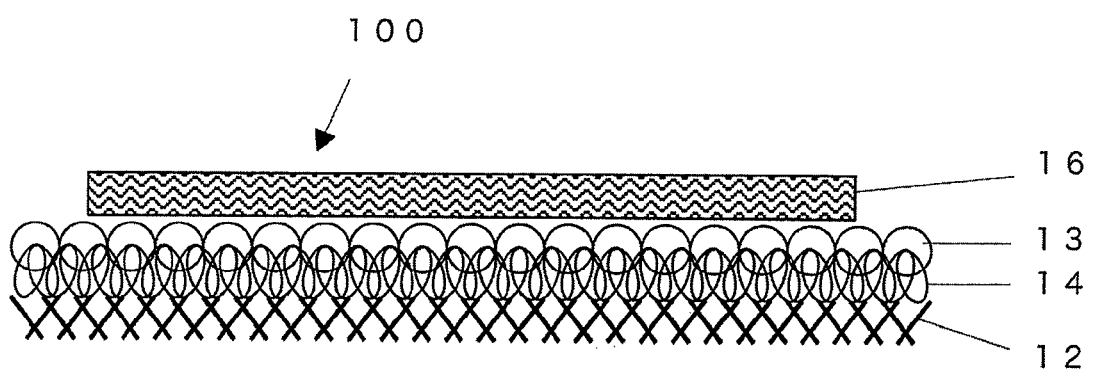
FIG. 8 is a partial schematic cross section view of the absorbent article according to another aspect of the present invention.

Next, the absorbent article according to the present invention will be explained with reference to Figures. FIG. 7 is a partial schematic cross section view of the absorbent article according to one aspect of the present invention, and FIG. 8 is a partial schematic cross section view of the absorbent article according to another aspect of the present invention. Both of the absorbent article comprises an absorbent body 16 on either surface of the above-mentioned highly air-permeable and water-resistance sheet. In addition, absorbent article according to the present invention may comprise the absorbent body 16 on either surface of the above-mentioned highly air-permeable and water-resistance sheet composite.

(The Absorbent Body)

In the absorbent article according to the present invention, materials, aspect, constitution and the other of the absorbent body 16 is not limited so far as it can absorb any fluids such as body fluid. The absorbent body includes highly water absorptive polymer such as SAP (superabsorbent polymer) in the powder form, wood pulp having fluid retention, fluff pulp milled the wood pulp and mixture thereof. In particular, it is preferable an aspect that thermoplastic resin, fluff pulp and highly water absorptive polymer are mixed and the mixture is processed into the matted form. The highly water absorptive polymer may be used as mixture with fluff pulp, and may be added to the fluff pulp to be partially incorporated into the pulp. It is preferable the highly water absorptive polymer which has a retention property that 20 times or more of liquid relative to its weight can be absorbed and retained, and which is in the particle form having a property capable of forming gel. Such a highly water absorptive polymer includes starches, celluloses and synthetic polymers. In particular, it preferably includes starch-acrylate graft copolymer, saponified product of starch-acrylonitrile copolymer, cross-linked product of sodium carboxymethyl cellulose, and acrylate polymer. Among them, in consideration of morphological stability, and possible drop off, it is preferable the absorbent body in the sheet form in which SAP is processed into the sheet form. An absorbent body in the sheet form comprising SAP as a main component will be explained.

Figure 10:
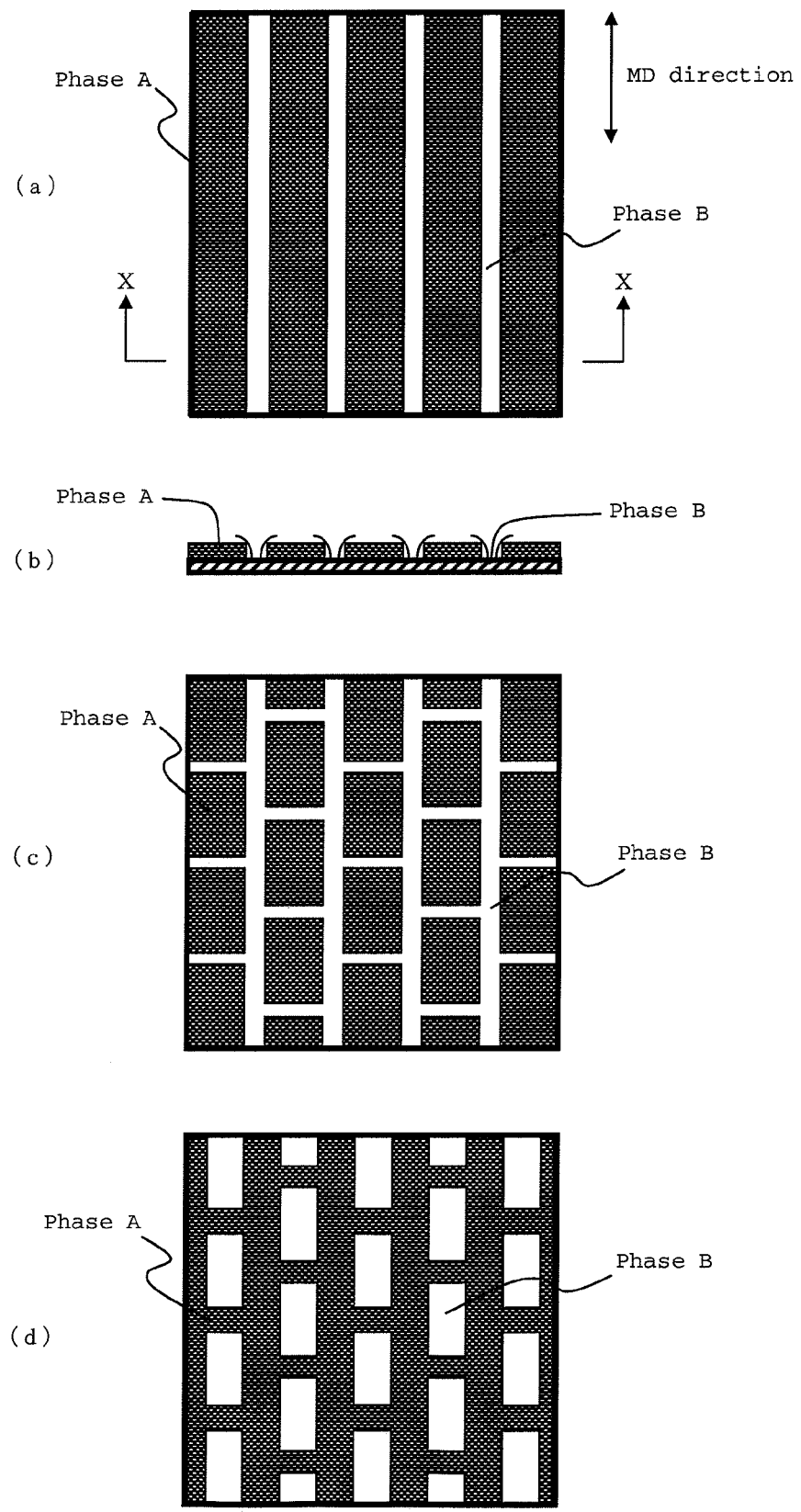
FIG. 10 is views showing one aspects of absorbent body in the sheet form used for the absorbent article according to the present invention, wherein (a), (c) and (d) indicate plan views thereof and (b) indicates the cross-sectional view of (a)

FIG. 10 is views showing one aspects of absorbent body in the sheet form used for the absorbent article according to the present invention, wherein (a), (c) and (d) indicate plan views thereof and (b) indicates the cross-sectional view of (a). In FIG. 10, "phase A" indicates a region having water absorbent materials such as SAP, "phase B" indicates a region not having the water absorbent material. In the absorbent article according to the present invention, the absorbent body may comprise the phase A which is positioned to extend to the longitudinal direction of the absorbent body, and the phase B which is positioned in the parallel direction of the phase A, as shown in FIGS. 10 (a) and (b). The phase A plays a function which absorbs the liquid such as body fluid. In addition, the phase B plays a function of penetration, dispersion and acquisition of the liquid. In case of such as aspect of the absorbent body, the excreted body fluid is dispersed and penetrated though the phase B, and is in contact with and sequentially absorbed in SAP of the phase A which has a wide area, thereby retaining in the phase A.

In the present invention, the absorbent body in the sheet form is not limited to the aspect as exemplified in FIGS. 10 (a) and (b), and may include an aspect that the phase A is discontinuously arranged in the phase B which is continuously arranged as shown in FIG. 10 (c). In addition, the absorbent body may include an aspect that the phase B is discontinuously arranged in the phase A which is continuously arranged, as shown in FIG. 10 (d). The aspect of the phase A and/or phase B which are discontinuously arranged may include any shapes such as rectangular, circular and triangular shapes.

Generally, the air permeability of the absorbent article is greatly affected to the air permeability of the backsheet prior to absorbing the body fluid, and is also greatly affected to the structure of the absorbent body after absorbing the body fluid. This is based on that the absorbent body is swelled to block the passage of air. Therefore, in the present invention, the following constitution will be selected in order to adjust the air permeability of the absorbent body before and after absorbing the body fluid. Thereby, the absorbent article according to the present invention can secure enough air permeability even after it has absorbed the body fluid.

The absorbent body in the sheet form is preferably that the highly water absorptive sheet has 50 weight % or more of SAP, preferably 60 to 95 weight % of SAP. In addition, the thickness of the absorbent body is preferably in the range of 1.5 mm or lower, more preferably in the range of 1 mm or lower. In case of less than 50 weight %, the thickness of the absorbent body hard to decrease.

Structure of the absorbent body used in the absorbent article according to the present invention, and a method for manufacturing the absorbent body are not limited. The method for manufacturing the absorbent body includes the Air Laid method; the Coating method using a slurry comprising components for the absorbent body; a method for immobilizing SAP in which a large amount of SAP is supported in a raised non-woven fabric, and SAP is immobilized with hotmelt binder, emulsion binder or aqueous fiber and the others; a method for forming a fibrous SAP into the web form by mixing with PET (polyethylene terephthalate) fiber; and a method for forming in which both surfaces of SAP layer are sandwiched with a tissue.

(Other Members)

Figure 9:
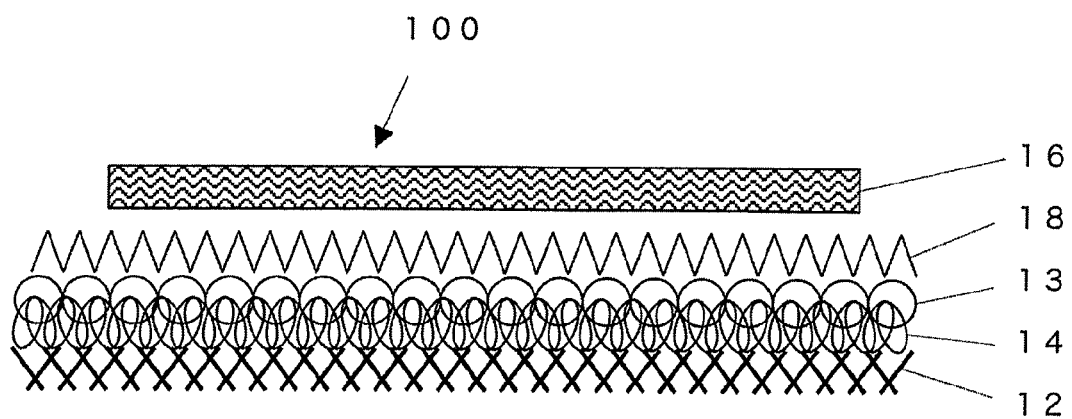
FIG. 9 is a partial schematic cross section view of the absorbent article according to the present invention further comprising an apertured film.

In the absorbent article according to the present invention, several types of members such as so-called buffer sheet are provided in accordance with use of the absorbent article. The use of the absorbent article includes, for example, a case that the body fluid is efficiently processed even though a large amount of the body fluid is loaded to the absorbent article under pressure. As such a case, when the infant is used after he sleeps all night, and when the diaper for adult is used in the bedridden state or sat state, the body fluid is sometimes adequately absorbed and a load is locally applied for a long time in the absorbent body in the saturated state. When the highly air-permeable and water-resistance sheet according to the present invention is used in such a case, the body fluid is gradually permeated into the highly air-permeable and water-resistance sheet and the body fluid will be sometimes leaked. In order to deal with such a situation, means for prevent the effect of the load is effective by means of partially positioning non-porous PE film and air permeable film at the loaded portion. However, the combination of such films will lead to loss of air permeability of the absorbent article even in the case of combining the air permeable film. Accordingly, it is necessary to confine the application of non-porous PE film to ⅓ area of the whole area of the highly air-permeable and water-resistance sheet. As an effective means which will not affect the air permeability and prevent such a leakage, it is preferable that porous buffer sheet is provided between the absorbent body and the highly air-permeable and water-resistance sheet according to the present invention. Thereby, it is possible to disperse the weight load and prevent the leakage even though the load is applied as mentioned above. As an example of such a buffer sheet, FIG. 9 is a partial schematic cross section view of the absorbent article according to the present invention further comprising an apertured film. In the Figure, an absorbent article 100 further comprises an apertured film 18 between the highly air-permeable and water-resistance sheet constituting the above-mentioned absorbent article and the absorbent body. Although the Figure shows that the apertured film 18 is provided between the hydrophobic non-woven fabric layer 14 and the absorbent body 16 of the highly air-permeable and water-resistance sheet, the apertured film 18 may be provided on the fine cellulose fiber layer 12, and there may be absorbent body 16 on the apertured film 18, by inverting the relative position of the fine cellulose fiber layer 12 and the hydrophobic non-woven fabric layer 14 of the highly air-permeable and water-resistance sheet.

[The Apertured Film]

Figure 11:
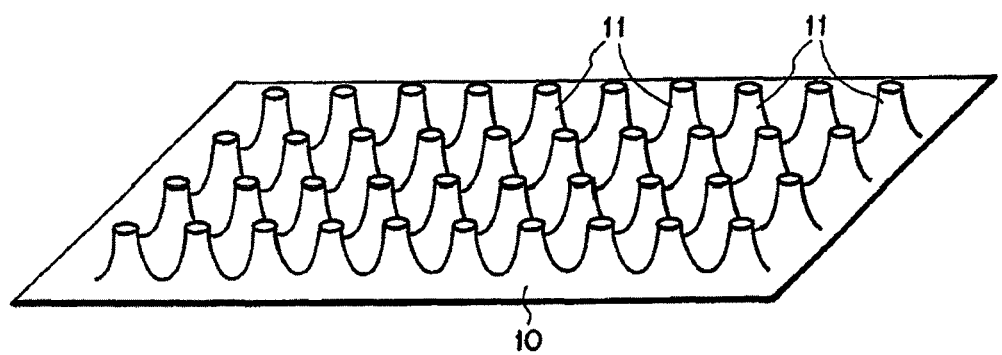
FIG. 11 is a schematic view showing one of examples of the apertured film in the present invention.
Figure 11:
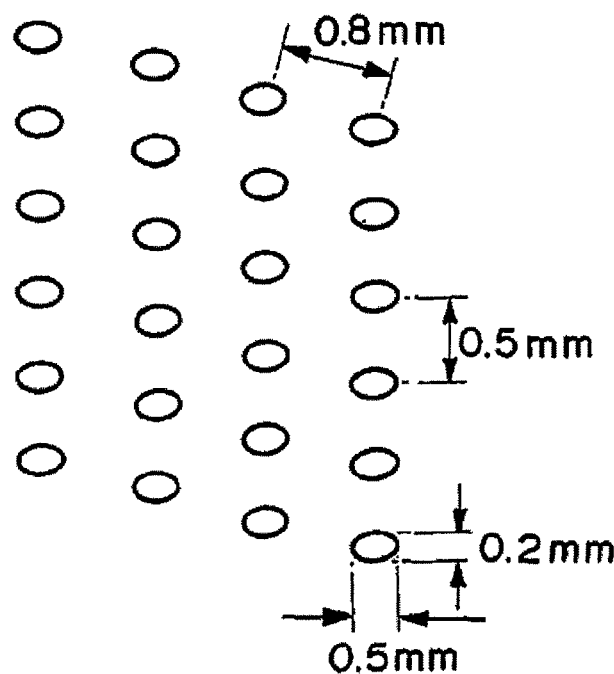

The apertured film used as the buffer sheet in the absorbent article according to the present invention is not limited so far as it is a porous member having enough air permeability without affecting the air permeability of the highly air-permeable and water-resistance sheet. In addition, it is preferable that the apertured film has a function which temporarily traps the liquid such as body fluid not absorbed in the absorbent body. Further, the apertured film is preferably of having a property which fractionates and segmentalizes the liquid not absorbed in the absorbent body and passed from the absorbent body. The material for the apertured film having such a function includes homopolymer such as polyethylene, polypropylene, polyethyleneterephthalate, synthetic rubber, urethane and EVA, copolymer thereof, or heteropolymer or of surface treated the forming body with these materials using water repellant such as silicone and Teflon (trademark) for enhancing the hydrophobicity. FIG. 11 is a schematic view showing one of examples of the apertured film in the present invention.

The pore size of the apertured film is preferably in the range of 1 mm or lower, more preferably in the range of 0.5 mm or lower. The thickness of the apertured film may be appropriately changed in accordance with the thickness of the absorbent article. In case of 1 mm or lower of the thickness of the absorbent body, the thickness of the apertured film is preferably in the range of 3 mm or lower, more preferably in the range of 1 mm or lower. It should be noted that, in order to stably provide the above-mentioned cushioning characteristics, the apertured film may be used of having high rigidity such that it does not greatly change its shape under the load. In addition, the apertured film may be of having a property which restores the bulk by absorbing the moisture and water, along with maintaining the thin state at 1 mm or lower of thickness by compression deformation prior to the use in the dry state.

In addition, the apertured film may be plastic film which is formed to have a plurality of convex and concave portions, and of a structure having a plurality of continuous cells like foam, in view of fractionation and segmentalization of the passage of the liquid. Typical example thereof includes urethane foam sheet having continuous cell and plastic apertured film having convex and concave structure.

The buffer sheet may be positioned in the almost whole surface of the highly air-permeable and water-resistance sheet as the backsheet, or in consideration of the cost, may be partially positioned in a portion exposed a large amount of body fluid. For example, the buffer sheet may be partially positioned in a portion loaded the weight such as gluteal portion. When the surface area of the buffer sheet is assigned as P, and the surface area of the highly air-permeable and water-resistance sheet is assigned as Q, the buffer sheet is preferably positioned such that P/Q×100 is in the range of 10 to 50%, more preferably in the range of 10 to 30%. In case of less than 10%, the passage of the liquid such as body fluid is sometimes adequately enough fractionated and segmentalized. In addition, in case of more than 50%, the cost is disadvantage.

The absorbent article according to the present invention is an absorbent article in which the above-mentioned highly air-permeable and water-resistance sheet is used in the leakage preventing material such as the backsheet. The absorbent article according to the present invention includes disposable diaper and women's sanitary product. The leakage preventing material collectively refers to a member which is positioned at the non-contact surface of the body of wearer as shown in FIG. 13.

The absorbent article according to the present invention will be explained as one of examples for disposable diaper.

Figure 12:
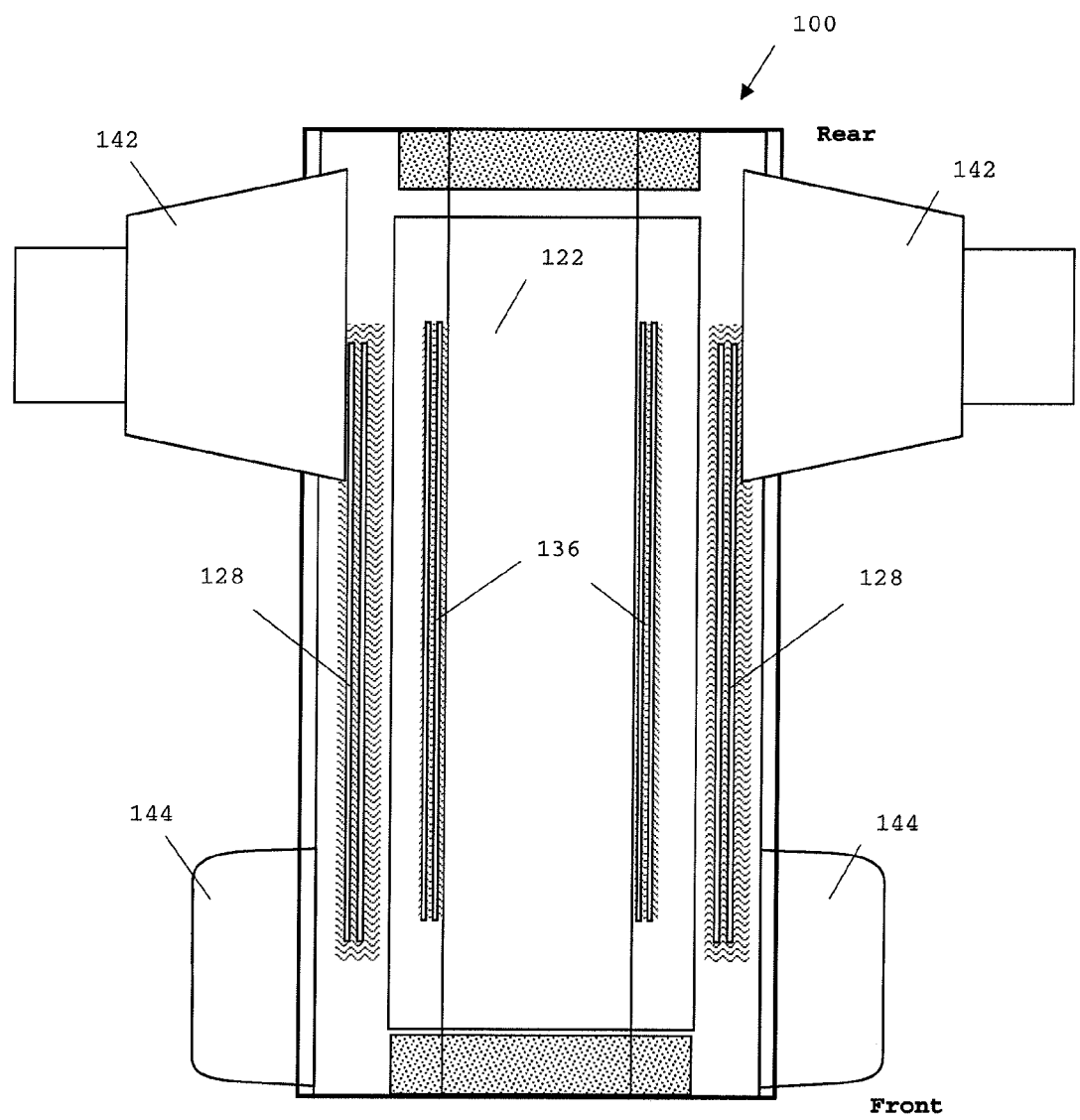
FIG. 12 is a deployed plan view of a disposable diaper, one of examples of the absorbent article according to the present invention.

FIG. 12 is a deployed plan view of a disposable diaper, one of examples of the absorbent article according to the present invention. In addition, FIG. 13 is a cross-sectional view of FIG. 12 taken in line A-B.

Figure 13:
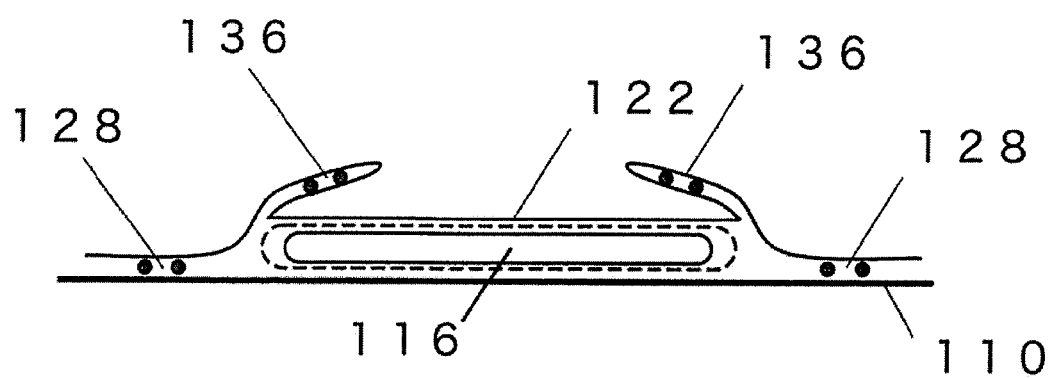
FIG. 13 is a cross-sectional view of FIG. 12 taken in line A-B.

As shown in FIGS. 12 and 13, an absorbent article 100 such as disposable diaper comprises an connecting part 142 for wearing the absorbent article 100 on the body, and an connected part 144 for locking the connecting part 142.

The absorbent article 100 mainly comprises a top sheet 122 consisting of liquid permeable non-woven fabric provided in the contact surface of the body; a leakage preventing material 110 provided in the outer side at wearing; an absorbent body 116 interposed between the top sheet 122 and the leakage preventing material 110; a leg gather 128 provided at both sides of the absorbent body 116 on the top sheet 122 in the longitudinal direction of the absorbent article 100; and a projecting part 136 provided in the inner side of the width direction of the absorbent article 100 than the leg gather 128 along with the longitudinal direction of the absorbent article 100.

The highly air-permeable and water-resistance sheet according to the present invention is used as the leakage preventing material 110 which is disposed in the outer side at wearing without contacting with the body in the absorbent article (disposable diaper) as mentioned above.

By using the highly air-permeable and water-resistance sheet according to the present invention as the leakage preventing material of the absorbent article, the absorbent article can be obtained wherein the absorbent article does scarcely not occurred to be stuffy of the skin and rash, since it has enough air permeability, and the moisture such as urine is hardly leaked from the absorbent article, since it has enough water resistance.

Figure 14A:
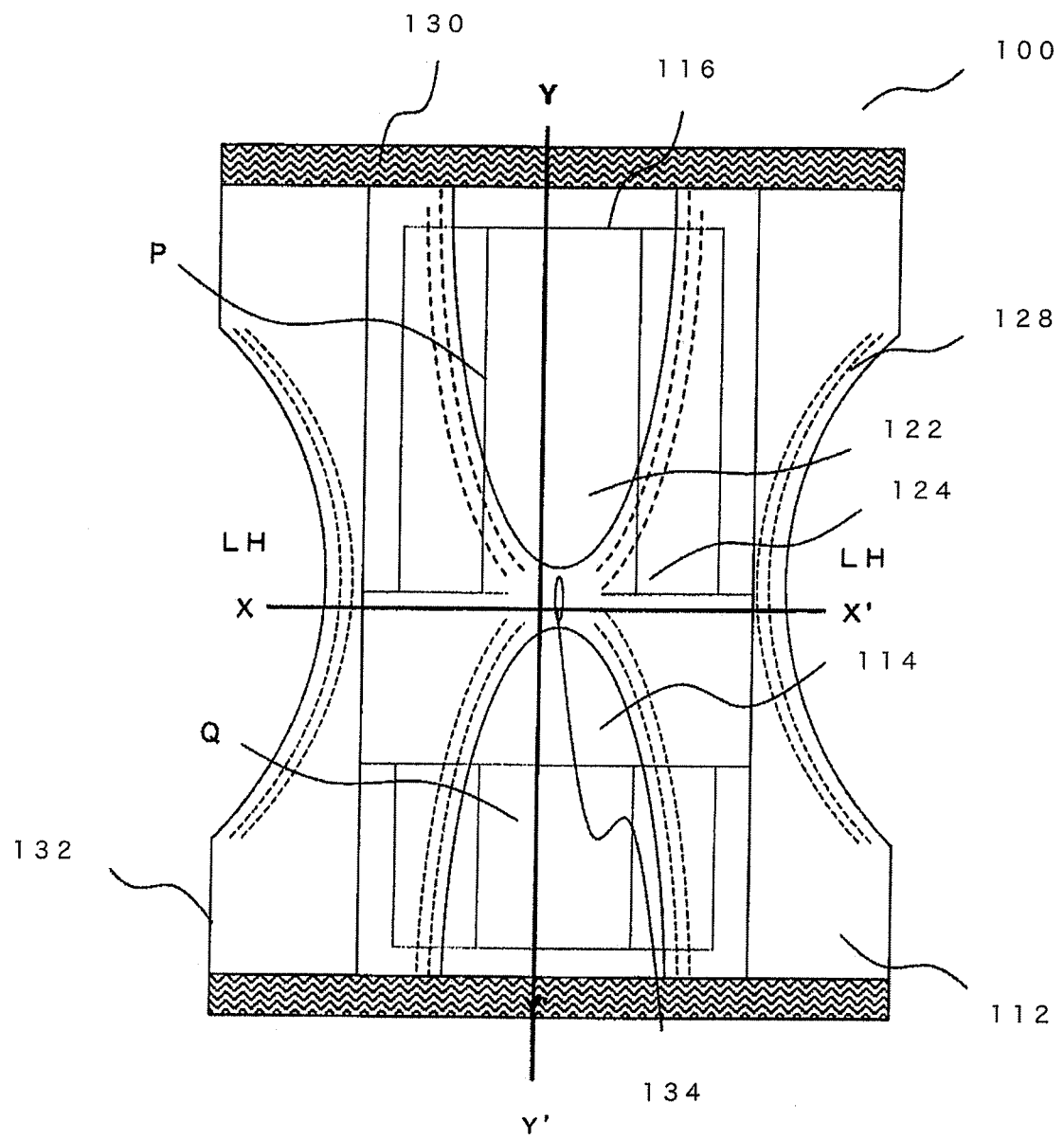
FIG. 14A shows a development view of the absorbent article according to one of aspects of the present invention.
Figure 14B:
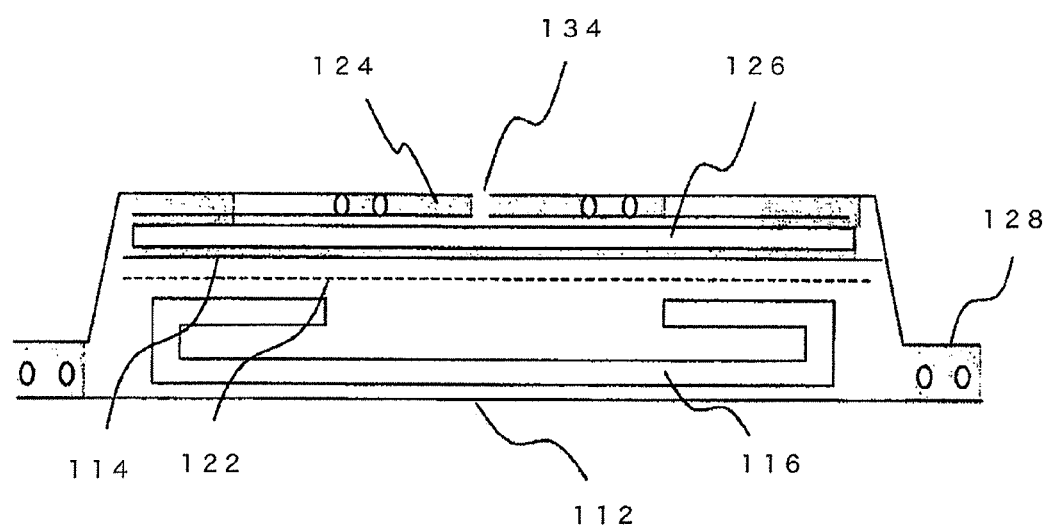
FIG. 14B is a cross-sectional view of FIG. 14A along with line X-X'.
Figure 14C:
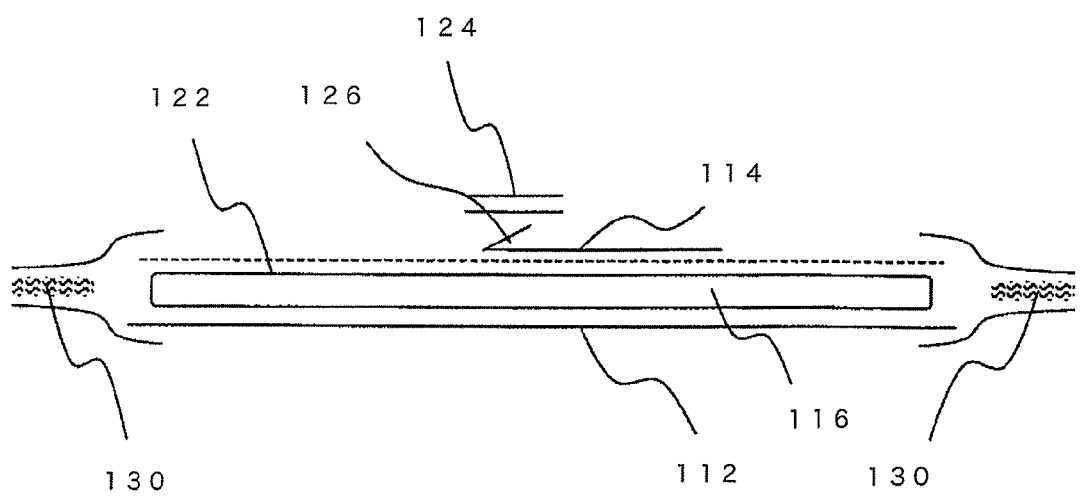
FIG. 14C is a cross-sectional view of FIG. 14A along with line Y-Y'.
Figure 14D:
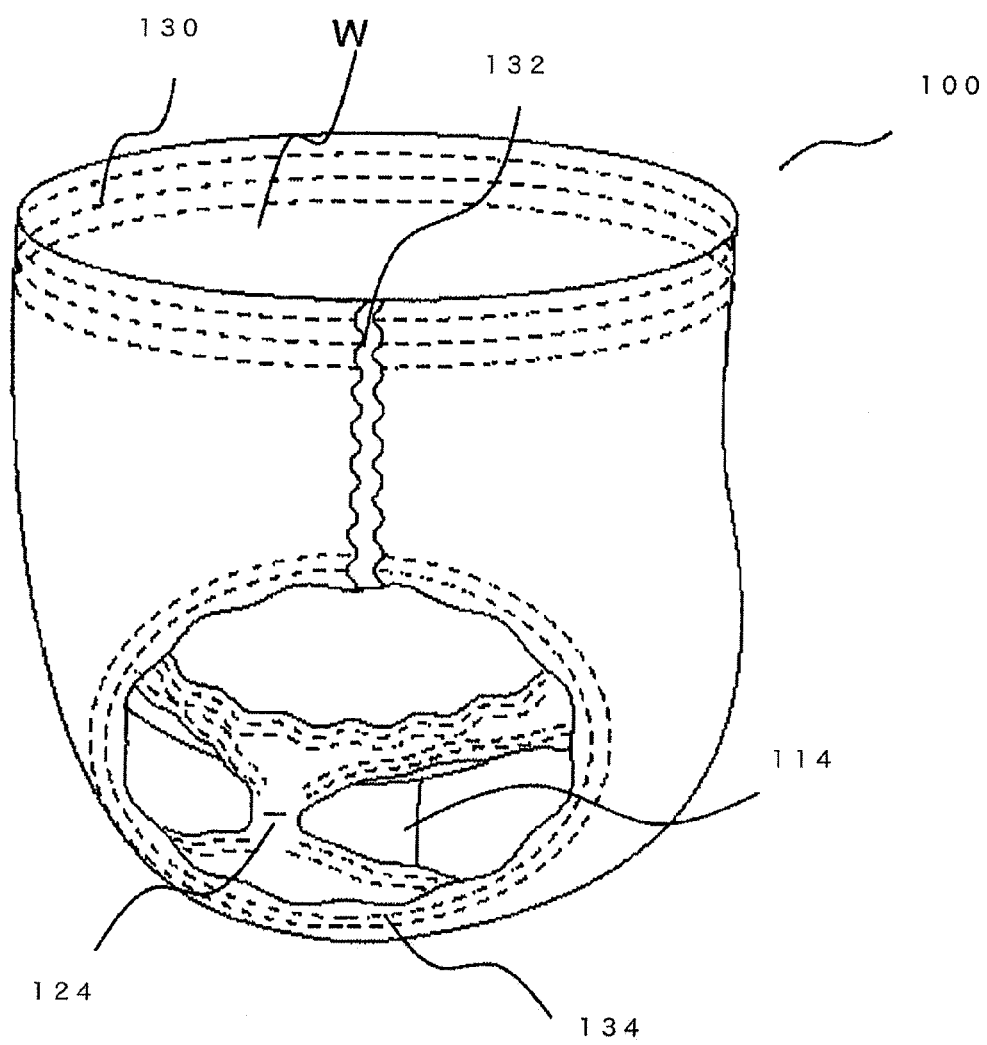
FIG. 14D is a schematic diagram of the absorbent article according to one aspect of the present invention.

In addition, the absorbent article according to the present invention may be the aspect as shown in FIGS. 14A to 14D. FIG. 14A shows a development view of the absorbent article according to one of aspects of the present invention, FIG. 14B is a cross-sectional view of FIG. 14A along with line X-X', FIG. 14C is a cross-sectional view of FIG. 14A along with line Y-Y', and FIG. 14D is a schematic diagram of the absorbent article according to one aspect of the present invention.

The absorbent article according to the present invention comprises a first leakage preventing body 112 which is the above-mentioned highly air-permeable and water-resistance sheet according to the present invention at the outer surface of the absorbent article, as shown in FIG. 14A. In the absorbent article, a second leakage preventing body 114 which is the highly air-permeable and water-resistance sheet according to the present invention may be provided in the non-contact portion with the wearer. In addition, the absorbent article according to the present invention comprises a absorbent body 116 between the wearer and the first leakage preventing body 112. Any members may be provided in the absorbent article according to the present invention, the members including a top sheet 122 having a liquid permeability, and a leg gather 128, a bridge member 124 and a leg gather 130 for holding the relative positional relationship between the wearer and the absorbent article. It should be noted that notation 134 indicates a slit for positionally adjusting it to the excretion organ of the wearer; notation 132 indicates a connecting part for wearing the absorbent article to the wearer; notation P indicates a urine receiving part which is one of portions of the absorbent body 116 and in which the liquid such as urine is contact with the surface of the absorbent body; notation Q indicates which is one of portions of the absorbent body 116 and in which the excretions such as feces is received in the surface of the absorbent body; notation LH indicates a leg hole for positioning it on the thigh of the wearer; and notation W indicates a waist hole for positioning it around the torso of the wearer.

EMBODIMENTS

Reference Example 1

The degassing step of the hydrophobic non-woven fabric layer and the fine cellulose fiber layer layering step in which the fine cellulose fiber layer is layered on the degassed hydrophobic non-woven fabric layer has been examined with the following materials and conditions.

[Materials and Conditions]
The hydrophobic non-woven fabric layer:
  SMS (Weight: 13 g/m$^2$)
The degassing medium used in the degassing step:
  Ethanol/Water=40/60
The clearance performing the degassing step:
  0.125 mm
The fine cellulose fiber:
  MFC which is prepared from LDKP (wood pulp as prepared from a smaller amount of broad leaf tree
The solvent used in the slurry of the fine cellulose fiber:
  Ethanol/Water=50/50
The concentration of the fine cellulose fiber in the slurry:
  0.6 weight %

First degassing step was performed to the above-mentioned hydrophobic non-woven fabric layer using 50 mL of the degassing medium, and then second degassing step was performed using 40 mL of the degassing medium. The fine cellulose fiber layer layering step was performed in which 130 mL of the slurry of the fine cellulose fiber is coated on the degassed hydrophobic non-woven fabric layer by hand coating method at 1.20 mm, 1.00 mm and 0.75 mm of the clearance of the coating. As the result, the obtained fine cellulose fiber layers were uniform. It should be noted that the weight per unit areas of the fine cellulose fiber layer (g/m$^2$) were 8.4, 7.8 and 6.5.

Reference Example 2

The Reference example 2 was performed in accordance with the Reference example 1, except that the degassing medium used in the degassing step was changed to 100% of Ethanol, the volumes of the degassing medium used in the first and second degassing steps were changed to 50 mL, respectively, the solvent used in the slurry of the fine cellulose fiber was changed to water, and the fine cellulose fiber layer layering step is performed along with the full length of the hydrophobic non-woven fabric layer. As the result, the agglomerate of MFC was disposed on SMS in the island form, and it was of non-uniform.

Reference Example 3

The Reference example 3 was performed in accordance with the Reference example 1, except that the degassing medium used in the degassing step was changed to an aqueous solution containing LAS, and the solvent used in the slurry of the fine cellulose fiber was changed to water. As the result, the obtained fine cellulose fiber layers were uniform. It should be noted that the weight per unit area of the fine cellulose fiber layer (g/m$^2$) was about 7.4, respectively.

Reference Example 4

The Reference example 4 was performed in accordance with the Reference example 1, except that the degassing medium used in the degassing step was changed to 200 ppm and 400 ppm of an aqueous solution of polyoxyethylene (10)/nonylphenyl ether (NPEO), and the volumes of the degassing medium used in the first and second degassing steps were changed to 50 mL, respectively. As the result, the obtained fine cellulose fiber layers were uniform. It should be noted that the weights per unit area of the fine cellulose fiber layers (g/m$^2$) were 5.7 and 7.9, respectively. In addition, the speeds of permeating the degassing medium into the hydrophobic non-woven fabric layer in the degassing step were rapid and slow, respectively.

Reference Example 5

The Reference example 5 was performed in accordance with the Reference example 4, except that the degassing medium used in the first degassing step was changed in 400 ppm of an aqueous solution of polyoxyethylene (10)/nonylphenyl ether (NPEO) and that in the second degassing step was changed in 50 mL of water. As the result, the obtained fine cellulose fiber layers were uniform. It should be noted that the weights per unit area of the fine cellulose fiber layers (g/m$^2$) were about 7.9, respectively.

Embodiment 1

Preparation of MFC to be Tested 267 kg of wood pulp originated from broad leaf tree (St. Croix, Bonster) and 5 m$^3$ of demineralized water were introduced in 8.6 ton pulper to prepare 5% of pulp diluted solution.

This solution was processed in accordance with the following process disclosed in Patent-related Document 4 using an apparatus connected with 2 of DDRs (Double Disk Refiner, AIKAWA Iron Works Co. Ltd.) at 1 m³/minute for 60 cycles to prepare 3.5% of MFC to be tested.

The hydration capacity: 30 mL/g
The average length of the fiber: 0.15 mm
The viscosity of 0.5% water dispersion liquid:
320 mPa·s The above-mentioned process is as follows. That is, the above-mentioned 5% of the diluted pulp solution was passed though the apparatus connected in line-straight with 2 of DDRs by AIKAWA Iron Works Co. Ltd. at 1 m³/minute to prepare MFC.

Type of DDR:AWR-14
Disk plate as used
   Teeth width: 2.0 mm
   Groove width: 3.0 mm
Clearance between the Disks as used
   0.15 to 0.25 mm The MFC to be tested having the above-mentioned property was obtained by means of passing through the DDR for 50 times with checking its property every ten times. It should be noted that the pulp concentration before the treatment was 5%, and the final concentration was 3.5%, since it has diluted with the sealed water.

<Preparation of MFC Slurry>

90% of Ethanol was added to the MFC to be tested to prepare the MFC slurry containing Ethanol/Water=50/50 (weigh ratio) having 0.7% of MFC concentration. The slurry was stored in the tank for single purpose (not shown in the Drawing) until usage.

<The Substrate>

SMS made from polypropylene (Avgol) having the following property was used.

Weight of SMS: 18 g/m²
Compositions of SMS:
spun bond (1) (6.5/m², apparent denier::2.2)
melt blown (5.0/m², apparent denier:0.5 or less)
spun bond (2) (6.5/m², apparent denier::2.2)
Water resistance: 150 mmH$_2$O The substrate (Width: 1,500 mm, length: 10,000 m) was disposed in the unreeler 232 as shown in FIG. 4A. It should be noted that the substrate is supplied on the net conveyer 210 to be set through the roller 222, and transferred to the reeler (not shown in the Figure), in accordance with the Flowchart as shown in FIG. 3A.

<The Saturation Medium>

A mixture of ethanol and water (mixing ratio=50/50 (volume) was used as the saturation medium.

<Preparation of Layered Product of Hydrophobic Non-Woven Fabric Layer/Fine Cellulose Fiber Layer>

The preparation was performed with the apparatus for manufacturing as shown in FIG. 4A. First, the saturation medium was supplied from the saturation medium supplier 214 at 1 ton/hour on the moving substrate (sheet) at 40 m/minutes of the moving speed on the net conveyer 210 to pretreat the substrate. The so supplied saturation medium is supplied a narrow portion of the coater head along with the movement of the substrate. It should be noted that the gap (clearance) between the coating roller 220 and the net conveyer 210 was set to 750 μm by the height adjusting apparatus (not shown in the Figure).

On the other hand, the coating slurry 202 is supplied from the stored tank (not shown in the Figure) through the pipe and the pump (not shown in the Figure) to the head box 212 such that the liquid level of the slurry at the head box 212 is 60 mm. After the pretreatment was finished, the supplied coating slurry 202 was supplied on the above-mentioned substrate (sheet) at 2.5 ton/minutes of the ratio to form the fine cellulose fiber layer (coating layer) on the substrate (sheet).

Next, this was supplied on the upper portion of an vacuum unit 234, and removed the liquid at −30 kPa gauge, dried with the drum type hot air drier (not shown in the Figure, set at about 100°), and reeled to obtain the layered product of the hydrophobic non-woven fabric layer/fine cellulose fiber layer. It should be noted that the efficiency of the layered product of the hydrophobic non-woven fabric layer/fine cellulose fiber layer is as follows.

Weight: 26.0 g/m²
The hydrophobic non-woven fabric: 18.0 g/m²
MFC coating: 8.0 g/m²
Water pressure resistance:
400 mmH$_2$O As the result, it was found that the water pressure resistance of the layered product of the hydrophobic non-woven fabric layer/fine cellulose fiber layer (400 mmH$_2$O) is greatly improved in comparison with the water pressure resistance of the hydrophobic non-woven fabric layer (150 mmH$_2$O).

The so obtained layered product of the hydrophobic non-woven fabric layer/fine cellulose fiber layer (A4 size) was immersed in the 10 w/v % methylhydrogen silicone oil of solvent diluted solution in which methylhydrogen silicone oil (TSF484, Toshiba silicone) is diluted with N-hexane for 1 minute. This was air dried in the state which is sandwiched with filter paper to dry. It should be noted that the adsorbed amount of the methylhydrogen silicone oil to the layered product was 2 g/m². Then this was heat treated for 60 minutes at 150 to obtain a highly air-permeable and water-resistance sheet 1 according to the present invention. The following examination was performed with regard to the highly air-permeable and water-resistance sheet. The result was shown as follows.

The weigh of the composite sheet (average):
26.0 g/m²
The weigh of the highly air-permeable and water-resistance sheet (average):
28.3 g/m²
The adsorbed amount of the water repellant layer:
2.3 g
Water pressure resistance:
565 mmH$_2$O
Air permeability in accordance with Gurley method:
6 seconds Embodiment 2

The Embodiment 2 was performed in accordance with the Embodiment 1, except that the apparatus as shown in 4A was changed to an apparatus having precoat bath as shown in FIG. 6, water is used as the saturation medium, the substrate (sheet)

was transferred in a state that the saturation medium is dropped on the hydrophobic non-woven fabric layer of the sheet 200 from the porous plate of the head box 212 to accumulate the water liquid, so as to form the fine cellulose fiber layer (coating layer) on the substrate (sheet).

Next, this was supplied to the upper portion of the vacuum unit (as the same as shown in FIG. 4A) to remove the liquid at −30 kPa gauge.

Further, the water repellant treatment was treated as follows, then dewatered by vacuum. After that, it was dried under heat at 120°, and surface treated with the cylinder roll having 150° of surface temperature to obtain a highly air-permeable and water-resistance sheet 2.

That is, 30 g (solid content)/L of a treatment solution (100 L) comprising the following water repellant PA-1 and water was used in the water repellant treatment.

<Water Repellant PA-1 (AOKI OIL INDUSTRIAL CO., LTD.)>
Composition:
A product in which the paraffin wax water repellant was combined with melamine resin
Appearance:
o/w Yellow emulsion with light yellow
Ionic character:
Anionic
pH: 9.0
Concentration of the solid content:
30%

The treatment solution was dropped on the cellulose fiber layer at 15 mL/minute from the batch equipped in zigzag form with a porous plate having 0.7 mm diameter of pore on the rectangular bottom of the bath such that the water repellant is mainly remained on the cellulose fiber layer, and removed the liquid at −20 MPa gauge. It should be noted that the removed solution was recycled to be used.

With regard to the highly air-permeable and water-resistance sheet 2, the following examinations were performed. The result is shown as follows.

The weight of the hydrophobic non-woven fabric layer:
18.0 g/m$^2$
The weight of the MFC coating:
8.0 g/m$^2$
The adsorbed amount of PA-1:
5.0 g/m$^2$
Water pressure resistance:
488 mmH$_2$O
The contact angle of the water liquid:
99°
Water absorbent ratio in water:
1.4% (for 2 hours)

(It should be noted that the "water absorbent ratio in water" means a percentage which corresponds to the increase in weight of the highly air permeability water resistance sheet before and after the immersion wherein the increase is calculated such that the highly are permeability water resistance sheet to be weighted is sandwiched with the stainless net, and it is immersed in the ion exchanged water for 2 hours.)

The air permeability in accordance with Gurley method:
8 seconds

It should be noted that the highly air permeability and water resistance sheet is subjected to the delamination test in which the sheet after the calendering process is twisted for 10 times by hand. As the result, the delamination of the sheet was not occurred and stabled. It was considered that MFC of the fine cellulose fiber layer is incorporated into the hydrophobic non-woven fabric layer and the sheet is in the state as shown in FIG. 1b.

Embodiment 3

Figure 15A:
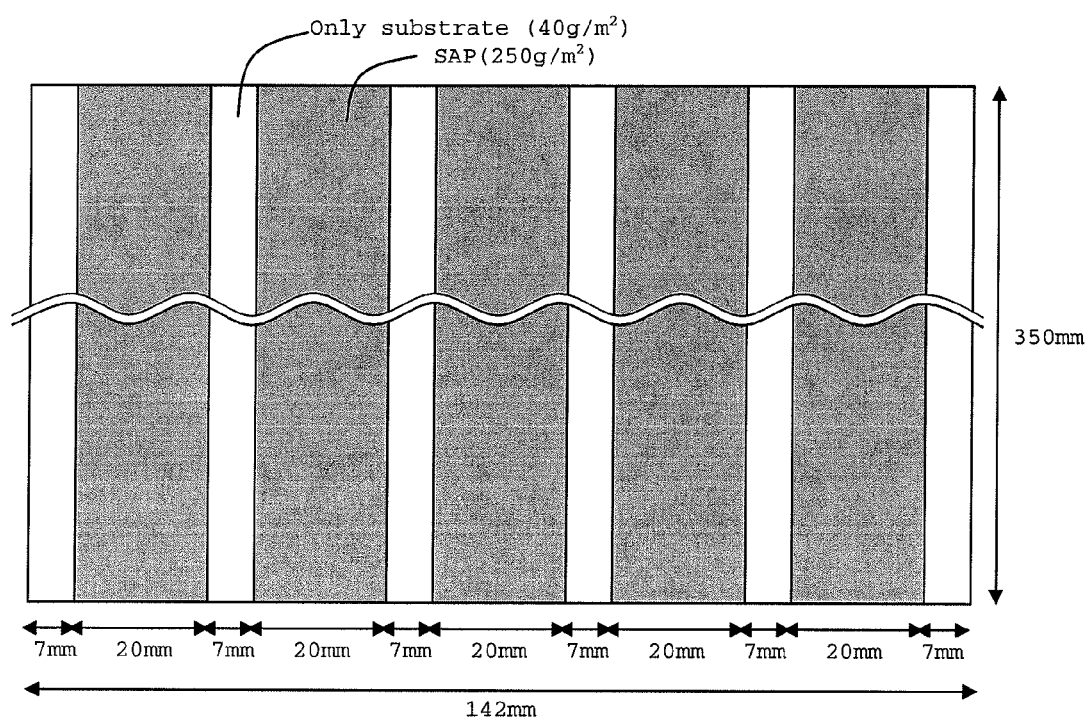
FIG. 15A is a schematic plan view showing one aspect of the absorbent body in the present invention.
Figure 15B:
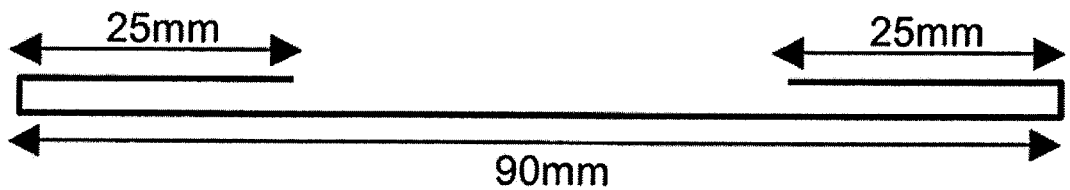
FIG. 15B is a schematic cross-sectional view showing one aspect of the absorbent body in the present invention.

It was manufactured to use the highly air-permeable and water-resistance sheet 2 of the Embodiment 2 as a first leakage preventing body 112 and a second leakage preventing body 114 as shown in FIGS. 14A to 14D of the diaper for child. In addition, in the absorbent article 100, the coating patter and structure of the absorbent body (Shanghai DSG Megathin, an absorbent body in the sheet form) as shown in FIGS. 15A to 15B having the following efficiency were used in the absorbent body 116.

The weight of SAP:
200 g/m$^2$
The weight of the substrate:
40 g/m$^2$
The weight of the absorbent body:
240 g/m$^2$
The content of SAP in the absorbent body:
86%
The air permeability of the absorbent body:
4 seconds (Gurley method)

The content, designed free absorbing amount and designed dewatered absorbing amount of SAP of the absorbent body used in the absorbent article 100 are shown in Table 1.

TABLE 1

| | Volume to be designed | | |
|---|---|---|---|
| Weight of absorbent body (g) | Amount of absorbing water (mL) | Amount of desorbing and retaining water (mL) |
| 10.0 (as SAP) | 500 | 300 |

<The Air Permeability of the Absorbent Article 100>

The air permeability according to the Gurley method of the absorbent article 100 in the extended state was examined in the As the result, it was found that the permeability was in the range of 6 to 10 second, and the article has a large air permeability as the diaper product.

<Result of the Wearing Test>

4 of the absorbent article per a baby were worn on 6 wearers of 3 male babies and 3 girl babies having normal excretion mechanism. The parent of the wearer was asked to recode dairy report indicating its use, and all of the diapers after use were retrieved and analyzed. With regard to the main posture of the wearer, the average wearing time, stuffy and rash and the absorbent article after use, the average amounts of urine and feces and number of the diaper as leaked is shown in Table 2. It should be noted that the normal wearing time of the diaper is around 3 hours.

TABLE 2

| Wearing posture | Wearing time | Stuffy and rush | Amount of absorption (average g) | Numbre of use (use/total) | Number of excreting feces (number/use) | Number of leakage | |
|---|---|---|---|---|---|---|---|
| | | | | | | Urine | Feces |
| Upright, Sitting, Walk, Clawling, and Face-down | 5.5 | no | 205 | 13/24 | 10/13 | 0/13 | 1/10 |
| Dorsal and recumbent position | 7.5 | no | 220 | 11/24 | 5/11 | 1/11 | 0/5 |
| Average | 6.4 | | 221 | Number of usage for urine 24 | Number of usage for feces 15 | Total number of urine leakage 1/24 | Total number of feces leakage 1/15 |

Although it was used for a long time, and almost of the wearers excreted both of urine and feces, it was not stuffy, the rash was not occurred, and the leakage was extremely less, and the good result was obtained.

Embodiment 4

The highly air-permeable and water-resistance sheet as obtained in the Embodiment 2 were used as the highly air-permeable and water-resistance sheet according to the present invention. The highly air-permeable and water-resistance sheet was disposed in the backsheet of the child diaper commercially available (Product Name: "Muni Nobi-ru fit" (Unicharm)) in accordance with the following procedure. The application effect of the child diaper was examined.

<Method for Disposing the Highly Air-Permeable and Water-Resistance Sheet According to the Present Invention>

Figure 16:
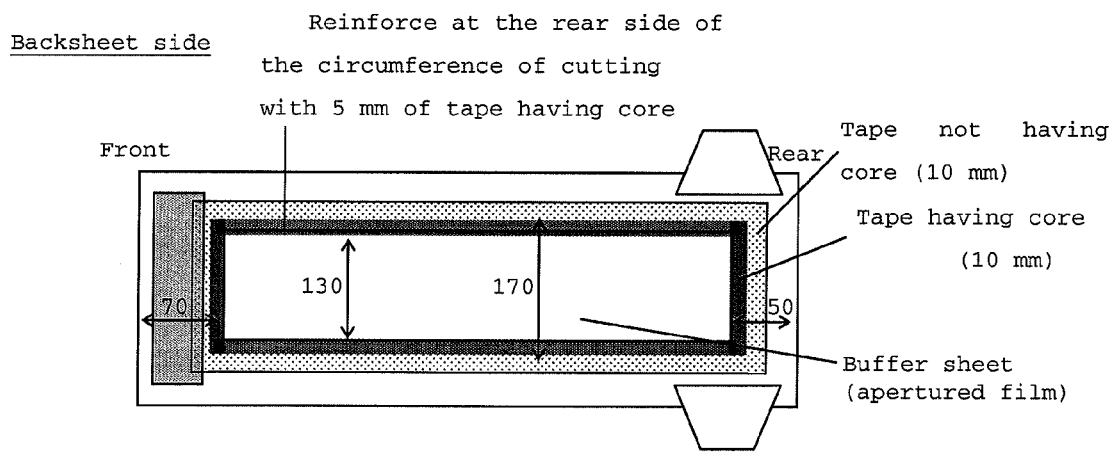
FIG. 16 is a schematic view showing one aspect of the absorbent article according to the present invention.
Figure 17:
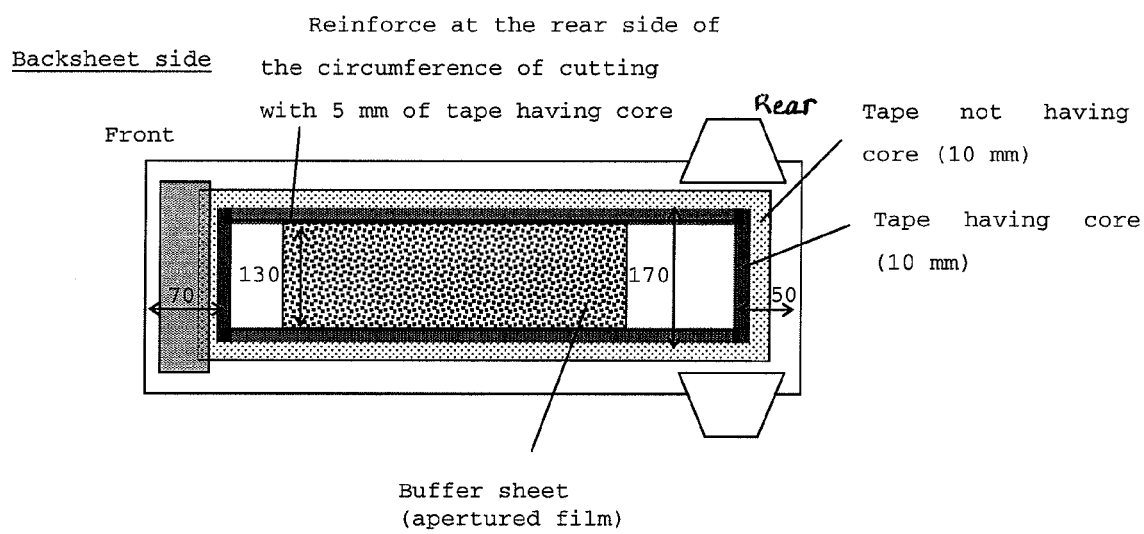
FIG. 17 is a schematic view showing one aspect of the absorbent article according to the present invention.

The backsheet (the laminate of the air permeable film and the non-woven fabric) of the above-mentioned child diaper were cut with the sized of 130 mm width and 355 mm length from the backsheet side as shown in FIG. 16 to form an window. The highly air-permeable and water-resistance sheet 2 (170 mm width, 390 mm length) according to the present invention as obtained in the Embodiment 2 was connected to the window with two types of double-faced tape (one of tape having core and the other having no-core) so as not to occur any leakage, thereby manufacturing a diaper 1 to be examined.

<Use Test by Babies>

The above-mentioned diaper to be examined was worn on 8 babies (4 male babies and 4 girl babies). The leakage stability from the diaper and the backsheet was examined in accordance with the above-mentioned <Result of the wearing test>. It should be noted that the wearing time was set for 3 hours at average. The result is shown in Table 3.

TABLE 3

| Number of use | Number of leakage | Leakage from backsheet |
|---|---|---|
| 40 | 3 (Feces: 1, Urine: 2) | 35: There is no leakage from backsheet<br>3: Bleeding in the circular form at the rear portion<br>2: Bleeding in the pinhole form<br>(1: no leakage) |

Embodiment 5

A diaper to be examined was manufactured with the same method for disposing in accordance with the same type of the diaper as shown in the Embodiment 4. That is, the highly air-permeable and water-resistance sheet 2 as obtained in the Embodiment 2 as the highly air-permeable and water-resistance sheet according to the present invention was disposed and an apertured film as the buffer sheet as the buffer sheet was disposed at the water resistance hydrophobic non-woven fabric layer side of the highly air-permeable and water-resistance sheet 2 to manufacture a diaper 2 to be examined.

With regard to the diaper to be examined (as used for 5 diapers per a baby), the leakage stability was examined in accordance with the above-mentioned <Result of the wearing test>. It should be noted that the wearing time are set as 6 hours (night) at average. The result is shown in Table 4.

TABLE 4

| Number of use | Number of leakage | Leakage from backsheet |
|---|---|---|
| 40 | 7 (Feces: 1, Urine: 6) | 39: There is no leakage from backsheet<br>1: Bleeding in the pinhole form as observed |

Although the same highly air-permeable and water-resistance sheet as that of the Embodiment 4 was used, it was confirmed that the leakage stability from the backsheet is improved in comparison with the Embodiment 4.

Embodiment 6

MFC was prepared as follows.

First, the craft pulp originated from broad leaf tree (Daishowa/Marubeni international Co. Ltd., Product name: piece liver LBKP) was defiberized in the pulper at 5 weight % of the concentration, transferred to the recycle tank, and prepared 3.5 weight % of the concentration. 3.5 weight % of the pulp slurry was beated with double disk refiner (hereinafter, referred to as DDR) in accordance with the following condition to prepare MFC. The condition was as follows. That is, the load was applied as possible such that the metal thereof is not contact with each other (Contact of the fixed blade with the rotating blade).

DDR machine:
AW14 made by AIKAWA Iron Works Co. Ltd.
Disk plate:
blade width 2.0 mm, groove width 3.0 mm
Flow rate of the pulp to DDR:
1 m$^2$/minute
Number of times passed though DDR:
100

Clearance of the blade:
0.23 to 0.13 mm
The property of MFC as prepared was as follows.
The hydration capacity:
27 mL/g
The average fiber length:
0.15 mm
The viscosity of 0.5 weight % of the slurry
320 mPa·s
The final concentration:
3.0 weight % (diluted with the seal water)
<Preparation of MFC Slurry>
Ethanol was added to MFC as mentioned above to prepare the MFC slurry containing Ethanol/Water=65/35 (weigh ratio) having 0.7% of MFC concentration.
<The Non-Woven Fabric>
SMS non-woven fabric made from polypropylene (AVGOL) having the following property was used
The weight: 15 g/m²
Constitution of SMS:
spun bond (1) (5.0 g/m²)
melt blown (5.0 g/m²)
spun bond (2) (5.0 g/m²)
The water pressure resistance: 150 mmH$_2$O
<Coating of the MFC Slurry to the Non-Woven Fabric>
The above-mentioned non-woven fabric (width 1,500 mm, length 10,000 mm) was disposed on the unreeler 232 as shown in FIG. 4A. The non-woven fabric was supplied on the net conveyer 210 through the roller 222. Water was supplied from the saturation medium supplier 214 at 17 kg/hour on the moving non-woven fabric at 40 m/minutes of the moving speed on the net conveyer 210 to be subjected to pretreatment of saturating the non-woven fabric with water. The so supplied saturation medium comprising water was coated at the narrow portion of the coater head along with the movement of the non-woven fabric. It should be noted that the clearance between the coating roller 220 and the net conveyer 210 was set to 750 μm by the height adjusting apparatus. On the other hand, the coating slurry 202 is supplied from the storage tank such that the liquid level in the head box 212 is 60 mm. After the above-mentioned pretreatment is finished, the supplied coating slurry 202 was supplied to the above-mentioned non-woven fabric at 42 kg/minute to form the fine cellulose fiber layer on the non-woven fabric.

Next, this was supplied to the upper portion of the vacuum unit 234, was removed the liquid with vacuum at −30 kPa, dried at 100° C. with the cylinder drier, and reeled to obtain the composite sheet. In this apparatus, ethanol in the drainages of the removed part and of drier part was recovered with a solvent recovering apparatus (not shown in the Figure), and recycled. So, the drier part is completely sealed and is filled up with nitrogen gas to prevent the flash and combustion of ethanol. It should be noted that the property of the composite sheet is as follows. As the result, it was confirmed that the water pressure resistance of the composite sheet (400 mmH$_2$O) is greatly improved in comparison with the water pressure resistance of the non-woven fabric (150 mmH$_2$O).
Weight: 20 g/m² (SMS: 15 g/m², MFC: 5 g/m²)
Water pressure resistance: 400 mmH$_2$O
<Preparation of Coating Composition for the Water Repellant Layer>
50 weight parts of the olefinic water repellent (Meisei Chemical Works Ltd., Product name: Petrox P300) and 48 weight parts of stylene butadiene resin (Nippon A&L Inc., Product name: Smartex PA3802) were mixed under stirring to prepare a main agent. Then, prior to performing the coating, 2 weight parts of zirconium carbonate cross linker (Nippon Light Metal Co. Ltd., Product name: Bay coat 20) was added to the main agent, and water was added to prepare the coating composition having 40 weight % of the solid content. At that time, the viscosity of the coating composition was 95 mPa·s, and was 17 seconds in accordance with Zahn cup method.

The nature of the olefinic water repellent, stylene butadiene resin and the zirconium carbonate cross linker are as follows.
(The Olefinic Water Repellent)
Composition: wax type emulsion (Meisei Chemical Works Ltd., Product name: Petrox P300)
Appearance: white liquid
pH: 8.5
Ionic character: Nonion
Concentration of the solid content:
34 weight %
(The Stylene Butadiene Resin)
Composition:
stylene/butadiene ratex
(Nippon A&L Inc., Product name: Smartex PA3802)
Monomer composition:
butadiene 30, stylene 59, MMA 3, CAN 5, acid 3
Tg: 21° C.
Average particle diameter:
200 nm
Appearance:
white liquid
pH: 6.1
Ionic character:
Anionic
Concentration of the solid content:
48 weight %
(The Zirconium Carbonate Cross Linker)
Composition:
ammonia zirconium carbonate
(Nippon Light Metal Co. Ltd., Product name: Bay coat 20)
Chemical formula:

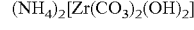

$(NH_4)_2[Zr(CO_3)_2(OH)_2]$

Appearance:
white liquid
pH: 9.0-9.5
Ionic character:
Anionic
Concentration of the solid content:
20 weight %
<Preparation of the Highly Air-Permeable and Water-Resistance Sheet with the Coating of the Water Repellant Layer>
The coating composition for the water repellant layer was coated on the side of the fine cellulose fiber layer of the composite sheet as obtained with flexographic coater in accordance with the following condition. The amount of the coating was 2.1 g/m².
Aniolox roll:
130 lines
Coating speed:
100 g/minute
Dry temperature of the air drier:
100° C.
After the coating, the heat press treatment was performed (linear pressure: 100 kg/cm). Then, it was processed at 120° C. for 30 minutes in the drier to prepare the highly air-permeable and water-resistance sheet according to the present invention.
[Effect of the Heat Press Treatment]
The properties before and after the heat press treatment are shown in Table 5. The thickness is reduced to ⅔ or lower by pressing in comparison with the prior to the treatment, and the treatment has an effect that products using the highly air-permeable and water-resistance sheet does not become bulky. In addition, the smoothness was improved from 1 second to 5 seconds. Accordingly, it is possible to print finer picture. It should be noted that "smoothness [coating side]" means a smoothness of the surface of the water repellant layer as layered on the non-woven fabric by the coating, and "smoothness [non-coating side]" means a smoothness of the opposite surface.

TABLE 5

|  | Before heat press treatment | After heat press treatment |
|---|---|---|
| Thickness (μm) | 88 | 56 |
| Air permeability by Gurley method (S/100 mL) | 1 | 2 |
| Smoothness[coating side] (s) | 1 | 5 |
| Smoothness [Non-coating side] (s) | 1 | 2 |

The result of the property for this highly air-permeable and water-resistance sheet as measured is shown as follows.
The weight of the SMS non-woven fabric:
15 g/m²
The weight of MFC:
5 g/m²
The coating amount of the water repellant layer:
2.1 g/m²
The water repellency (JIS P8137):
R10
The water pressure resistance:
488 mmH₂O
The air permeability by Gurley method:
2 seconds/100 mL Embodiment 7

The highly air-permeable and water-resistance sheet was obtained in accordance with the Embodiment 6, except that the water repellant layer is changed as follows, and the coating amount of the water repellant layer to the composite sheet is changed to 2.0 g/m².
<Preparation of the Coating Composition for the Water Repellant Layer>
50 weight parts of the olefinic water repellent (Meisei Chemical Works Ltd., Product name: Petrox P300) and 48 weight parts of stylene butadiene resin (Nippon A&L Inc., Product name: Smartex PA3802) was mixed under stirring to prepare a main agent. Then, prior to performing the coating, 2 weight parts of polyamide epichlorohydrin cross linker (Sumitomo Chemical Co. Ltd., Product name: Sumirez resin SPI-203) was added to the main agent, and water was added to prepare 40 weight % of the coating composition. At that time, the viscosity of the coating composition was 95 mPa·s, and was 17 seconds in accordance with Zahn cup method.
The property of the polyamide epichlorohydrin cross linker (Sumitomo Chemical Co. Ltd., Product name: Sumirez resin SPI-203) is as follows.
Composition:
polyamide epichlorohydrin
Appearance:
clear liquid, Colorless-light yellow
pH: 6.0 to 8.0
Ionic character:
Cation
Concentration of the solid content:
50 weight %

Comparative Example 1

The composite sheet as obtained in the Embodiment 6 was subjected to the heat press treatment (linear pressure: 100 kg/cm) to obtain a sheet for comparison not coated with the water repellant layer.

Comparative Example 2

The silicone water repellant layer (Shin-Etsu Chemical Co. Ltd., Product name: POLON NWS) was only coated to the composite sheet as obtained in the Embodiment 6 as follows to obtain a sheet for comparison. It should be noted that the property of the silicone water repellant layer (Shin-Etsu Chemical Co. Ltd., Product name: POLON NWS) is as follows.
Composition:
silicone emulsion
Appearance:
White liquid
Ionic character:
Anion
Concentration of the solid content:
30 weight %
Coating of the Silicone Water Repellant Layer>
A coating composition in which the silicone water repellant layer is diluted with water to the composition having 10 weight % of the solid content was hand coated with the bar on the surface of the fine cellulose fiber layer of the composite sheet to prepare a sheet having 2.1 g/m² of the coating amount. After the coating, it was heated at 120° C. for 30 minutes in the drier, then subjected to the heat press treatment at 100 kg/cm of the linear pressure.

Comparative Example 3

The fluorinated water and oil repellant (Solvay Solexis K.K., Product name: Solvera PT5045) was only coated to the composite sheet as obtained in the Embodiment 6 as follows to obtain a sheet for comparison. It should be noted that the property of the fluorinated water and oil repellant (Solvay Solexis K.K., Product name: Solvera PT5045) is as follows.
Composition:
fluorinated dispersion
Appearance:
clear solution with amber color
pH:
7 to 9
Concentration of the solid content:
20 weight %
Coating of the Fluorinated Water and Oil Repellant>
The coating composition in which the above-mentioned fluorinated water and oil repellant is diluted with water to prepare the composition having 10 weight % of the solid content was hand coated to the side of the fine cellulose fiber layer of the composite sheet with the bar to prepare a sheet having 2.2 g/m² of the coating amount. After the coating, it was heated at 120° C. for 30 minutes, then subjected to the heat press treatment at 100 kg/cm of the linear pressure.

Comparative Example 4

The olefinic water repellent (Meisei Chemical Works Ltd., Product name: Petrox P300) as used in the Embodiment 6 was only coated to the composite sheet as obtained in the Embodiment 6 as follows to obtain a sheet for comparison.

<Coating of the Olefinic Water Repellent>

A coating composition in which the above-mentioned olefinic water repellent is diluted with water to the composition having 10 weight % of the solid content was hand coated with the bar on the surface of the fine cellulose fiber layer of the composite sheet to prepare a sheet having 2.0 g/m² of the coating amount. After the coating, it was heated at 120° C. for 30 minutes the drier, then subjected to the heat press treatment at 100 kg/cm of the linear pressure.

Comparative Example 5

The water repellant layer was coated to the composite sheet as obtained in the Embodiment 6 using the acrylate water repellant to obtain a sheet for comparison.

<Preparation of the Coating Composition>

50 weight parts of the acrylate water repellant (Saiden Chemical Industry Co. Ltd., Product name: Saibinol EK-752) and 48 weight parts of the stylene butadiene resin (Nippon A&L Inc., Product name: Smartex PA3802) was mixed under stirring to prepare a main agent. Then, prior to performing the coating, 2 weight parts of polyamide epichlorohydrin cross linker (Sumitomo Chemical Co. Ltd., Product name: Sumirez resin SPI-203) was added to the main agent, and water was added to prepare 40 weight % of the coating composition. At that time, the viscosity of the coating composition was 95 mPa·s, and was 17 seconds in accordance with Zahn cup method. It should be noted that the property of the acrylate water repellant (Saiden Chemical Industry Co. Ltd., Product name: Saibinol EK-752) is as follows.

Composition:
acrylate polymer emulsion
Appearance:
white liquid
pH: 8.0 to 9.0
Ionic character:
Anion
Concentration of the solid content:
46 weight %
(Coating of the Coating Composition for the Water Repellant Layer)

The coating composition for the water repellant layer was coated to the side of the fine cellulose fiber layer of the composite sheet with flexographic coater in accordance with the following condition. At that time, the coating amount was 2.3 g/m².

Aniolox roll:
130 lines
Coating speed:
100 g/minute
Dry temperature of the air drier:
100° C.

After the coating, the heat press treatment was performed (linear pressure: 100 kg/cm). Then, it was processed at 120° C. for 30 minutes in the drier to prepare a sheet for comparison.

Next, with regard to the sheets as obtained in the Embodiments 6 and 7 and Comparative examples 1 to 5, the following air permeability was examined. The result is shown in Table 6.

As clearly shown Table 6, with regard the Embodiment 6, it has low air permeability value after the heat press treatment, and it is good air permeability. With regard to the Embodiment 7, the air permeability is maintained in the good level, although the air permeability after the heat press treatment is slightly bad due to the difference of the cross linker. On the other hand, the air permeability after the heat press treatment is almost the same of the current backsheet (porous film), since the water repellant layer of the Comparative example 5 is easy to form the film. Accordingly, it has a practical problem.

TABLE 6

|  | Air permeability before heat press treatment (S/100 mL) | Air permeability after heat press treatment (S/100 mL) |
| --- | --- | --- |
| Embodiment 6 | 1 | 2 |
| Embodiment 7 | 5 | 20 |
| Comparative example 1 | 1 | 1 |
| Comparative example 2 | 1 | 1 |
| Comparative example 3 | 1 | 1 |
| Comparative example 4 | 1 | 1 |
| Comparative example 5 | 70 | 151 |

[The Water Resistance]

The water resistance test of the sheets as obtained in the Embodiments 6 and 7 and the Comparative examples 1 to 5 was performed as follows. That is, the sheet was disposed on the paper filter, 10 wiper papers (Crecia Co. Ltd., Product name: Kim Towel) containing enough amounts of water were disposed on the sheet, and 5 kg of the weight was further disposed thereon, and the leaked water to the paper filter was observed.

The result of the water resistance test is shown in Table 7. As clearly shown in Table 7, in the Embodiment 6, the leakage to the paper filter was not observed until 5 hours, and the water resistance is extremely good. In the Embodiment 7, the leakage was not observed until 2 hours, the water resistance is relatively good, although it is slightly bad. On the other hand, in the Comparative example 1, the water was leaked after 1 minutes, and in the Comparative examples 2 to 5, the water was leaked after 10 to 15 minutes. These sheets as obtained in the Comparative examples 1 to 5 have not enough water resistance. The condition of the water resistance test is harder than the use condition of the backsheet for the commercially available child diaper. So, even though the highly air-permeable and water-resistance sheet according to the present invention (Embodiments 6 and 7) is used for the backsheet of the commercially available child diaper, there is no risk of the leakage for long time, and it can stand the practical use.

TABLE 7

|  | Leakage state to the paper filter |
| --- | --- |
| Embodiment 6 | No leakage after 5 hours |
| Embodiment 7 | Leakage after 2 hours in the pinhole form |
| Comparative example 1 | Leakage after 1 minute |
| Comparative example 2 | Leakage after 10 minutes |
| Comparative example 3 | Leakage after 10 minutes |
| Comparative example 4 | Leakage after 10 minutes |
| Comparative example 5 | Leakage after 15 minutes |

Embodiment 8

An example will be described to confirm that the highly air-permeable and water-resistance sheet as obtained in the Embodiment 6 can be applied to the backsheet of the child diaper. The backsheet of the commercially available child diaper was replaced with the highly air-permeable and water-resistance sheet according to the present invention to manufacture a diaper for test. The wearing test was performed using the diaper for test to the baby. As the test, the urine leakage, the skin to be stuffy and the rush were observed after the predetermined period was passed from the beginning of wearing.

<Preparation of the Diaper for Test>

The backsheet (laminate of the air permeable film and the non-woven fabric) was removed from the child diaper as shown in FIGS. 12 and 13 (Unicham Co. Ltd., Product name: Muni Nobi-ru fit) by cold spraying the connecting part. The highly air-permeable and water-resistance sheet according to the present invention was disposed in the removed part of the diaper to prepare 40 of the child diapers for test.

<The Wearing Test by Baby>

40 of the child diapers for test were prepared, and it was worn to 8 babies (4 male babies, and 4 girl babies) having normal excretion mechanism (5 diapers per baby used). The parent of the wearer was asked to recode dairy report indicating its use, all of the diapers after use were retrieved, and the leakage from the disposed highly air-permeable and water-resistance sheet according to the present invention was confirmed. The wearing time was set for 3 hours in average. As the result, any leakages from the disposed highly air-permeable and water-resistance sheet according to the present invention were not observed in 35 diapers among 40 diapers. In addition, the bleeding in the circular form was observed at the rear part of the diaper was observed in 3 diapers, and the bleeding in the pinhole form was observed in 2 diapers. However, its degree of the bleeding is not problematic. In addition, with regard to all of babies, there is no stuffy and rush. It was confirmed from these results that the child diaper in which the highly air-permeable and water-resistance sheet according to the present invention is used for the backsheet can be practically applicable.

Embodiment 9

0.5 weight part of the dispersant (San Nopco Limited, Product name: SN Dispersant) and water was added to 100 weight part of zeolite originated from the natural origin (Nitto Funka Co. Ltd., Product name: SP#2300), and dispersed with dispersing apparatus for 20 minutes to prepare a homogeneous slurry of deodorizer having 50 weight % of the solid content.

<Preparation of Mixed Coating Composition of the Water Repellant Layer and Deodorizer>

50 weight parts of the olefinic water repellent (Meisei Chemical Works Ltd., Product name: Petrox P300) and 48 weight parts of stylene butadiene resin (Nippon A&L Inc., Product name: Smartex PA3802) were mixed with the slurry of the deodorizer under stirring to prepare a main agent. Then, prior to performing the coating, 2 weight parts of zirconium carbonate cross linker (Nippon Light Metal Co. Ltd., Product name: Bay coat 20) was added to the main agent, and water was added to prepare 40 weight % of the coating composition having 40 weight % of the all solid contents. At that time, the viscosity of the coating composition was 95 mPa·s.

The property of zeolite originated from the natural resources as used in the Embodiment is as follows. It should be noted that the nature of the olefinic water repellent, stylene butadiene resin and zirconium carbonate cross linker are as follows.

(The Zeolite Originated from Natural Resources)
Composition:
zeolite originated from natural resources

(Nitto Funka Co. Ltd., Product name: SP#2300)
Crystal structure:
mordenite
pH: 6.4
Base exchange capacity:
160 to 190 meq/100 g
Moisture:
7.4%
Whiteness:
60%

Preparation of the Highly Air-Permeable and Water-Resistance Sheet by Coating the Mixed Coating Composition of the Water Repellant Layer and the Deodorizer The mixed coating composition of the water repellant layer and the deodorizer was coated on the side of the fine cellulose fiber layer of the composite sheet as obtained using the bar in accordance with the mayerbar method.

The bar as used: 0.15 mm
Dry temperature: 110° C. for 2 minutes

After the coating, the heat press treatment was performed, then it was heated at 120° C. for 30 minutes to prepare the highly air-permeable and water-resistance sheet according to the present invention.

Linear pressure for the heat press treatment:
100 kg/cm
Speed of the heat press treatment:
10 m/minutes
Roll temperature:
30° C.

The result of the property of the highly air-permeable and water-resistance sheet as measured is shown as follows.

The weight of SMS non-woven fabric:
15 g/m$^2$
The weight of MFC:
5 g/m$^2$
The coating amount of the deodorizer
2.05 g/m$^2$
The water repellency (JIS P8137):
R10
The air permeability by Gurley method:
2 seconds/100 mL Embodiment 10

The Embodiment 10 was performed in accordance with the Embodiment 9, except that the deodorizer of zeolite originated from the natural resources is changed to the deodorizer of the following ultra fine white clay to obtain the highly air-permeable and water-resistance sheet according to the present invention.

(The Deodorizer of Ultra Fine White Clay)
Component:
Alumino silicate glass
(Shirax Co. Ltd., Product name: Shirax fine balloon SFB-101)
Composition:
$SiO_2$(69~73%), $Al_2O_3$(12~13%)
Particle size:
20 μm
Outer structure:
Spherical
Inner structure:
Honeycomb (a plurality of barriers)
Particle density:
0.6 to 0.8
Bulk density:
0.23 to 0.32

Hunter whiteness:
80%
The result for the property of the manufactured highly air-permeable and water-resistance sheet is shown as follows.
The weight of SMS non-woven fabric:
15 g/m²
The weight of MFC:
5 g/m²
The coating amount of the deodorizer
2.05 g/m²
The coating amount of the water repellant layer
2.05 g/m²
The water repellency (JIS P8137):
R10
The air permeability by Gurley method:
6 seconds/100 mL Embodiment 11

The Embodiment 11 was performed in accordance with the Embodiment 9, except that the deodorizer of zeolite originated from the natural resources is changed to the deodorizer of the following synthetic zeolite to obtain the highly air-permeable and water-resistance sheet according to the present invention.
(The Deodorizer of Ultra Fine White Clay)
Chemical name:
Calcium A type zeolite
(Nippon chemical industrial Co. Ltd., Product name: Zeostar CA-110P)
Composition:
CaO(13%), $Al_2O_3$(30%)
Particle size:
20 μm
Outer structure:
Horn shape
ignition loss:
4.1% (800° C.)
pH:
11.5 (5% slurry, 20° C.)
The result for the property of the highly air-permeable and water-resistance sheet is shown as follows.
The weight of SMS non-woven fabric:
15 g/m²
The weight of MFC:
5 g/m²
The coating amount of the deodorizer
2.0 g/m²
The coating amount of the water repellant layer
2.0 g/m²
The water repellency (JIS P8137):
R10
The air permeability by Gurley method:
3 seconds/100 mL Embodiment 12

The Embodiment 12 was performed in accordance with the Embodiment 9, except that the deodorizer of zeolite originated from the natural resources is changed to the deodorizer of the following synthetic sepiolite to obtain the highly air-permeable and water-resistance sheet according to the present invention.
(The Deodorizer of Ultra Fine White Clay)
Chemical name:
Sepiolite
(Kusumoto Chemical Ltd., Product Name: Pansil)
Composition:
$SiO_2$ (60.5%), MgO (23.8%), $Al_2O_3$ (2.4%)
Particle size:
5 μm or lower of 88.3% of the Sepiolite
Outer structure:
Fine fiber bundle
Ignition loss:
11.3% (1000° C.)
BET surface area:
270 m²/g
The result for the property of the highly air-permeable and water-resistance sheet is shown as follows.
The weight of SMS non-woven fabric:
15 g/m²
The weight of MFC:
5 g/m²
The coating amount of the deodorizer
2.0 g/m²
The coating amount of the water repellant layer
2.0 g/m²
The water repellency (JIS P8137):
R10
The air permeability by Gurley method:
8 seconds/100 mL Embodiment 13

The Embodiment 13 was performed in accordance with the Embodiment 9, except that the deodorizer of zeolite originated from the natural resources is changed to the deodorizer of the following synthetic clay to obtain the highly air-permeable and water-resistance sheet according to the present invention.
(The Deodorizer of Synthetic Clay)
Chemical name:
Clay synthesized from silica, alumina and metal oxides
Apparent density:
0.2 to 0.4
Particle size:
10% or lower
BET surface area:
250 m²/g or higher
pH: 8.5 to 10.0 (JIS-K-1474)
The result for the property of the highly air-permeable and water-resistance sheet is shown as follows.
The weight of SMS non-woven fabric:
15 g/m²
The weight of MFC:
5 g/m²
The coating amount of the deodorizer
2.05 g/m²
The coating amount of the water repellant layer
2.05 g/m²
The water repellency (JIS P8137):
R10
The air permeability by Gurley method:
3 seconds/100 mL Embodiment 14

The Embodiment 14 was performed in accordance with the Embodiment 9, except that the deodorizer of zeolite originated from the natural resources is changed to the deodorizer of the following zeolite supporting silver to obtain the highly air-permeable and water-resistance sheet according to the present invention.

(The Deodorizer of Zeolite Supporting Silver)
Substance name:
zeolite supporting silver
(Sinanen Zeomic Co. Ltd., Product name: Zeomic HW10N)
Structural formula:

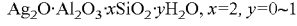
$Ag_2O \cdot Al_2O_3 \cdot xSiO_2 \cdot yH_2O, x=2, y=0~1$

Particle size:
0.6 to 2.5 μm
Apparent density:
0.4
Absolute specific gravity:
2.1
Pore size:
3 to 10°
BET surface area:
600 m²/g
Specific heat:
0.26 Cal/g
pH: 7 to 9 (JIS-K-1474)
The result for the property of the highly air-permeable and water-resistance sheet is shown as follow.
The weight of SMS non-woven fabric:
15 g/m²
The weight of MFC:
5 g/m²
The coating amount of the deodorizer
2.0 g/m²
The coating amount of the water repellant layer
2.0 g/m²
The water repellency (JIS P8137):
R10
The air permeability by Gurley method:
2 seconds/100 mL Embodiment 15

The Embodiment 15 was performed in accordance with the Embodiment 9, except that the deodorizer of zeolite originated from the natural resources is changed to the deodorizer of the following synthetic zeolite to obtain the highly air-permeable and water-resistance sheet according to the present invention.
(The Deodorizer of Synthetic Zeolite)
Substance name:
zeolite
(Asahi Glass Co. Ltd., Product Name: Zeolite)
Structural formula:

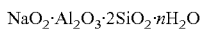
$NaO_2 \cdot Al_2O_3 \cdot 2SiO_2 \cdot nH_2O$

Particle size:
3.0 μm
Apparent density:
0.36
Ignition loss:
18.5% (800° C.)
pH: 11.8 (JIS-K-1474)
The result for the property of the highly air-permeable and water-resistance sheet is shown as follow.
The weight of SMS non-woven fabric:
15 g/m²
The weight of MFC:
5 g/m²
The coating amount of the deodorizer
2.1 g/m²
The coating amount of the water repellant layer
2.1 g/m²
The water repellency (JIS P8137):
R10
The air permeability by Gurley method:
2 seconds/100 mL Embodiment 16

The Embodiment 16 was performed in accordance with the Embodiment 9, except that the deodorizer of zeolite originated from the natural resources is changed to the deodorizer of the following metal oxide, and the condition thereof is changed to the following condition for manufacturing it to obtain the highly air-permeable and water-resistance sheet according to the present invention. In the Embodiment, since low concentration of the suspended liquid is used for the deodorizer, the concentration of the solid content in the mixed coating composition of the deodorizer and the water repellant layer is changed from 40 weight % in the Embodiment 9 to 35 weight %, and the line diameter of the bar is changed from 0.15 mm to 0.20 mm so as to adjust the coating amount.
(The Deodorizer of Metal Oxide)
Substance name:
metal oxide deodorizer
(Daiwa chemical industry Co. Ltd., Product name: Zaobatac PSG)
Appearance
suspended liquid having milk white color
Concentration of the solid content
3.0 weight %
Ionic character:
Anion
Safety:
Acute oral toxicity LD50 20,000 mg/kg or more
Dermal irritancy:
Japanese Society for Cutaneous Health: Pass
The result for the property of the highly air-permeable and water-resistance sheet is shown as follow.
The weight of SMS non-woven fabric:
15 g/m²
The weight of MFC:
5 g/m²
The coating amount of the deodorizer
2.05 g/m²
The coating amount of the water repellant layer
2.05 g/m²
The water repellency (JIS P8137):
R10
The air permeability by Gurley method:
3 seconds/100 mL Embodiment 17

The Embodiment 17 was performed in accordance with the Embodiment 9, except that the deodorizer and water repellant layer of the Embodiment 9, a mixing ratio of the deodorizer and water repellant layer, line diameter of the bar are changed as Table 8, and the coating amount of the water repellant layer is constantly 2 g, and the coating amount of the deodorizer is changed to double volume as used in the Embodiment 9 to obtain the highly air-permeable and water-resistance sheet according to the present invention.

Embodiment 18

The Embodiment 18 was performed in accordance with the Embodiment 9, except that a mixing ratio of the deodorizer and water repellant layer, line diameter of the bar are changed as Table 8, and the coating amount of the water repellant layer is constantly 2 g, and the coating amount of the deodorizer is changed to double volume as used in the Embodiment 9 to obtain the highly air-permeable and water-resistance sheet according to the present invention.

Coating date and the property of the Coating data of the property of the highly air-permeable and water-resistance sheet as manufactured in the Embodiments 17 and 18 are shown in Table 8. It should be noted that the property of the coating data and the physicality are collectively described in Table 8.

TABLE 8

|  | Embodiment 9 | Embodiment 17 | Embodiment 18 |
|---|---|---|---|
| Ratio of deodorant | 1 | 2 | 3 |
| Ratio of water repellant | 1 | 1 | 1 |
| Linear diameter of the bar (mm) | 0.15 | 0.20 | 0.25 |
| Coating amount of deodorant (g/m$^2$) | 2.05 | 4.13 | 6.22 |
| Coating amount of water repellant (g/m$^2$) | 2.05 | 2.07 | 2.08 |
| Total coating amount (g/m$^2$) | 4.1 | 6.2 | 8.3 |
| Water repellency (JIS P 8137) | 10 | 10 | 10 |
| Air permeability (s/100 mL) (JIS P8117) | 2 | 6 | 5 |

Comparative Example 6

The composite sheet as obtained in the Embodiment 9 was used as a sheet for comparison. The sheet for comparison was not subjected to the heat press treatment, and was not coated with the water repellant layer and the deodorizer.

Comparative Example 7

The comparative example 7 was performed in accordance with the Embodiment 9, except that the deodorizer is not used, and it was coated to the composite sheet using the coating composition only containing the following water repellant layer to obtain a sheet for comparison.

<Preparation of the Coating Composition for the Water Repellant Layer>

50 weight parts of the olefinic water repellent (Meisei Chemical Works Ltd., Product name: Petrox P300) and 48 weight parts of stylene butadiene resin (Nippon A&L Inc., Product name: Smartex PA3802) were mixed under stirring to prepare a main agent. Then, prior to performing the coating, 2 weight parts of zirconium carbonate cross linker (Nippon Light Metal Co. Ltd., Product name: Bay coat 20) was added to the main agent, and water was added to prepare the coating composition having 40 weight % of the solid content. At that time, the viscosity of the coating composition was 95 mPa·s, and was 17 seconds in accordance with Zahn cup method.

<Preparation of the Sheet by the Coating of the Coating Composition of the Water Repellant Layer>

The above-mentioned coating composition for the water repellant layer was coated to the side of the fine fibrous-form cellulose of the composite sheet as obtained in the Embodiment 9 with the flexographic coater in accordance with the following condition. The coating amount was 2.3 g/m$^2$.

Aniolox roll:
130 lines
Coating speed:
100 g/minute
Dry temperature of the air drier:
100° C.

After the coating, the heat press treatment was performed (linear pressure: 100 kg/cm). Then, it was processed at 120° C. for 30 minutes in the drier to prepare the sheet.

Comparative Example 8

The backsheet which is used in the commercially available diaper (Unicharm Co. Ltd., Product name: Muni Oshiri Pure), comprising the air permeable film in which $CaCO_3$ is added was used as a sheet for comparison.

Next, the following examination was performed with regard to the sheets as prepared in the Embodiments 9 to 18 and the Comparative examples 6 to 8.

[Air Permeability and Smoothness Before and after the Heat Press Treatment]

With regard to the sheets of the Embodiments 9 to 18 and the Comparative example 7 during the manufacturing process performing the heat press treatment, the air permeability and smoothness before and after the heat press treatment were measured using Gurley densometer (JIS P8117) and Bekk smoothness tester (JIS P8119), respectively. The result is shown in Table 9. It should be noted that with regard to the Comparative examples 6 and 8, the air permeability and smoothness as measured above was shown in Table 9 as the values before the heat press treatment.

As clearly shown in Table 9, with regard to the highly air-permeable and water-resistance sheet according to the present invention (the Embodiments 9 to 18), it was confirmed that the printing capacity was improved due to the increase of the smoothness by the heat press treatment and the air permeability value which relates to the air permeability was increased. It should be noted that the sheets can be practically applicable even though the air permeability is increased such as.

TABLE 9

|  | Before heat press treatment | | After heat press treatment | |
|---|---|---|---|---|
|  | Air permeability (s/100 mL) | Smoothness (s) | Air permeability (s/100 mL) | Smoothness (s) |
| Embodiment 9 | 2 | 6 | 10 | 41 |
| Embodiment 10 | 6 | 6 | 10 | 21 |
| Embodiment 11 | 3 | 6 | 5 | 20 |
| Embodiment 12 | 8 | 6 | 73 | 84 |
| Embodiment 13 | 3 | 8 | 29 | 51 |
| Embodiment 14 | 2 | 6 | 11 | 30 |
| Embodiment 15 | 2 | 8 | 10 | 45 |
| Embodiment 16 | 3 | 4 | 33 | 70 |
| Embodiment 17 | 6 | 6 | 30 | 67 |
| Embodiment 18 | 5 | 4 | 36 | 106 |
| Comparative example 6 | 1 | 2 | — | — |
| Comparative example 7 | 2 | 5 | 6 | 31 |
| Comparative example 8 | 150 | 24 | — | — |

[Water Resistance]

The water resistance of the sheets as obtained in the Embodiments 9 to 18 and the Comparative examples 6 and 8 was confirmed with the following method. That is, the sheet was disposed on the paper filter, 10 wiper papers (Crecia Co. Ltd., Product name: Kim Towel) containing enough amounts of water were disposed on the sheet, and 5 kg of the weight was further disposed thereon, and the leaked water to the paper filter was observed.

As the result, in the Embodiments 9 to 18 and the Comparative example 7 and 8, any leakages to the filter paper were not observed after 5 hours, and the water resistance was extremely good. On the other hand, in the Comparative example 6, the water leakage was occurred after 1 minute, and it has less water resistance. The condition of the water resistance test is harder than the use condition of the backsheet for the commercially available child diaper. So, even though the highly air-permeable and water-resistance sheet according to the present invention (Embodiments 9 and 18) is used for the backsheet of the commercially available child diaper, there is no risk of the leakage for long time, and it can stand the practical use.

In addition, with regard to the sheet of the Embodiments 9 to 18 and the Comparative examples 6 to 8, the following deodorant property 1 using ammonium was examined. The result is shown in Table 10.

TABLE 10

| | Ammonium concentration (ppm) | | | | | | |
|---|---|---|---|---|---|---|---|
| | 10 min | 20 min | 40 min | 60 min | 80 min | 100 min | 120 min |
| Embodiment 9 | 86 | 40 | 36 | 30 | 21 | 17 | 16 |
| Embodiment 10 | 90 | 43 | 35 | 28 | 25 | 18 | 18 |
| Embodiment 11 | 88 | 45 | 32 | 27 | 23 | 21 | 21 |
| Embodiment 12 | 90 | 57 | 48 | 41 | 33 | 29 | 28 |
| Embodiment 13 | 82 | 40 | 31 | 25 | 21 | 18 | 18 |
| Embodiment 14 | 82 | 36 | 30 | 22 | 21 | 20 | 18 |
| Embodiment 15 | 91 | 62 | 47 | 39 | 32 | 27 | 26 |
| Embodiment 16 | 63 | 40 | 28 | 25 | 21 | 18 | 16 |
| Embodiment 17 | 78 | 38 | 32 | 25 | 20 | 16 | 15 |
| Embodiment 18 | 70 | 35 | 28 | 21 | 16 | 12 | 10 |
| Comparative example 6 | 95 | 90 | 88 | 86 | 86 | 85 | 85 |
| Comparative example 7 | 94 | 90 | 87 | 87 | 85 | 85 | 83 |
| Comparative example 8 | 92 | 78 | 58 | 50 | 43 | 40 | 38 |

As clearly shown in Table 10, in the highly air-permeable and water-resistance sheet according to the present invention using the deodorizer (the Embodiments 9 to 18), the ammonium concentration was gradually decreased in progress of the time, in comparison with the Comparative examples 6 and 7 not using the deodorizer. The effect of the deodorization was observed. With regard to the Comparative example 8, calcium carbonate which is added to the porous film has some deodorization effect. Accordingly, the ammonium concentration was gradually decreased among the Comparative examples.

In addition, with regard to the sheets of the Embodiments 9 to 11 and the Comparative example 8, the following deodorant property 2 using ammonium was examined. The result is shown in Table 11.

TABLE 11

| | Ammonium concentration (ppm) | | | | | |
|---|---|---|---|---|---|---|
| | 10 min | 20 min | 30 min | 40 min | 60 min | 80 min |
| Embodiment 9 | 40 | 60 | 76 | 89 | 108 | 118 |
| Embodiment 10 | 29 | 49 | 66 | 74 | 96 | 105 |
| Embodiment 11 | 25 | 45 | 61 | 70 | 90 | 103 |
| Comparative example 8 | 41 | 65 | 91 | 110 | 127 | 134 |

As clearly shown in Table 11, it was confirmed that the increase of the amount of the deodorizer in the sheet will lead to the less amount of ammonium to be leaked. It was found that the leaked ammonium amount is greatly low in comparison with the film of the Comparative example 8 having low air permeability.

Embodiment 19

An example will be described to confirm that the highly air-permeable and water-resistance sheet as obtained in the Embodiment 9 can be applied to the backsheet of the child diaper. The backsheet of the commercially available child diaper was replaced with the highly air-permeable and water-resistance sheet according to the present invention to manufacture a diaper for test. The wearing test was performed using the diaper for test to the baby. As the test, the urine leakage, the skin to be stuffy and the rush were observed after the predetermined period was passed from the beginning of wearing.

<Preparation of the Diaper for Test>

The backsheet (laminate of the air permeable film and the non-woven fabric) was removed from the child diaper as shown in FIGS. 12 and 13 (Unicham Co. Ltd., Product name: Muni Nobi-ru fit) by cold spraying the connecting part. The highly air-permeable and water-resistance sheet according to the present invention was disposed in the removed part of the diaper to prepare 40 of the child diapers for test.

<The Wearing Test by Baby>

40 of the child diapers for test were prepared, and it was worn to 8 babies (4 male babies, and 4 girl babies) having normal excretion mechanism (5 diapers per baby used). The parent of the wearer was asked to recode dairy report indicating its use, all of the diapers after use were retrieved, and the leakage from the disposed highly air-permeable and water-resistance sheet according to the present invention was confirmed. The wearing time was set for 3 hours in average. As the result, any leakages from the disposed highly air-permeable and water-resistance sheet according to the present invention were not observed in 37 diapers among 40 diapers. In addition, the bleeding in the circular form was observed at the rear part of the diaper was observed in 3 diapers, and the bleeding in the pinhole form was observed in 2 diapers. With regard to 3 diapers among 40 diapers, the leakage of feces and urine was observed in 1 diaper, respectively. In addition, with regard to all of babies, there is no stuffy and rush. In addition, it was not reported from the parent that any smells from the excretions such as urine and feces during wearing is occurred. It was confirmed from these results that the child diaper in which the highly air-permeable and water-resistance sheet according to the present invention is used for the backsheet can be practically applicable.

[Absorptive and Desorptive Amount to be Defined]

The absorptive amount to be defined was measured in accordance with "Method for examining absorptive amount of high absorptive resin" as stated in JIS K7223-1996. In addition, the desorptive amount to be defined was estimated in which after the absorptive amount to be designed was measured, water was desorbed by centrifugation at 1000×g for 10 minutes.

[Water Pressure Resistance]

The water pressure resistance was examined in accordance with the following method.

Figure 18:
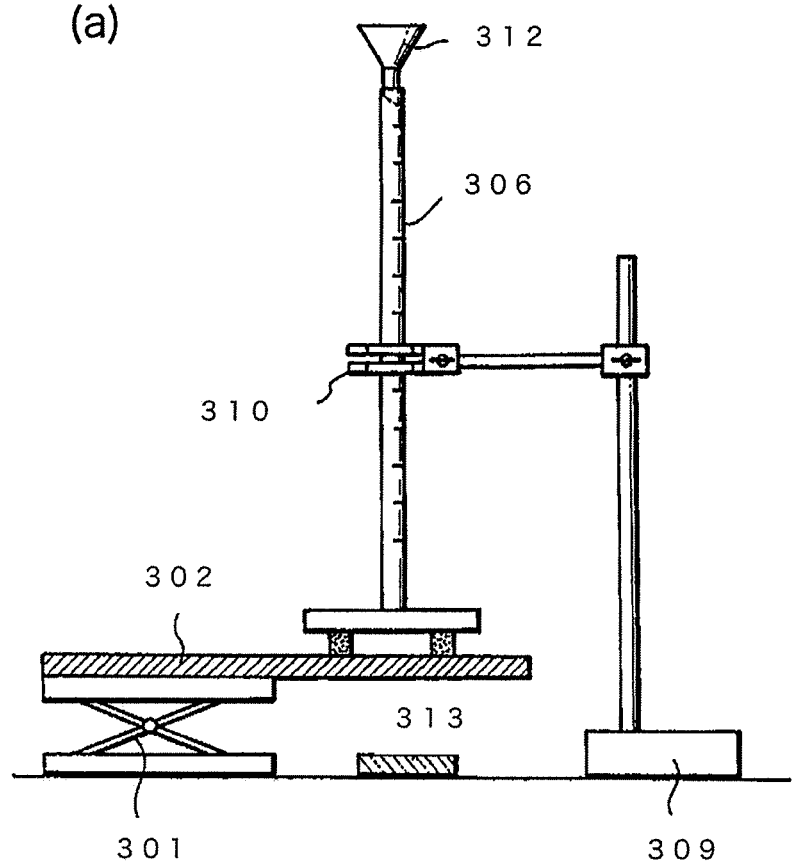
FIG. 18 shows a schematic view of an apparatus for examining water resistance, wherein (a) indicates an overall view thereof, and (b) indicates an enlarged view of the sample applied portion in the apparatus.
Figure 18:
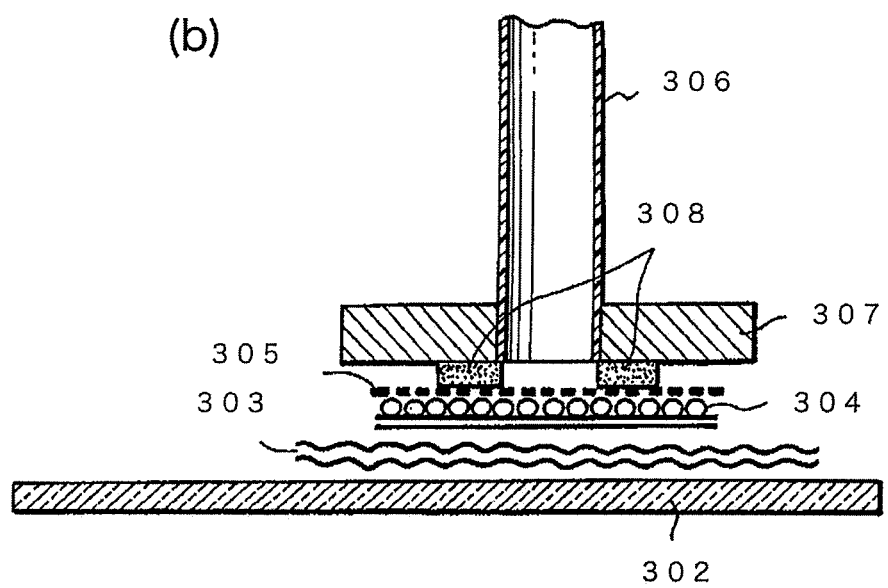

FIG. 18 shows a schematic view of an apparatus for examining water resistance, wherein (a) indicates an overall view thereof, and (b) indicates an enlarged view of the sample applied portion in the apparatus.

The sample size is set at 5 cm×5 cm, and the sample is disposed as follows.

1) Layer 2 filter papers 303 (Type: No. 2, Size: 15 cm×15 cm, hereinafter, the same applied) to a glass plate 302 on a jack 301.

2) Place a sample 304 to be measure such that the coat surface of SAP faces in the perpendicular direction on the center of a filter paper 303.

3) Place a tissue paper 305 on the sample 304, wherein the tissue paper 305 has a size smaller than the sample 304.

4) Next, place an acrylic pipe 306 as follows.

5) Attach a packing 308 for cushioning at adjusting the hole on the bottom surface of an acrylic mounter 307 integrating with the acrylic pipe 306.

6) Dispose the acrylic pipe 306 such that the hole of the bottom side of the acrylic pipe 306 is matched to the center of the sample 304 by means of holding the acrylic pipe 306 with a clamp 310 of a stand 309. At this time, the acrylic pipe 306 is held such that it is in the vertical direction of the sample 304.

7) After the acrylic pipe 306 is positioned, fix the position of the acrylic pipe 306 by closing the clamp 310.

8) Raise a jack 301, and Close not so as to leak the liquid through the packing 308 for cushioning between the glass plate 302 and the acrylic mounter 307 of the under side of the acrylic pipe 306.

Next, the water pressure resistance was measured to examine the water resistance.

First, small amount (e.g. 2 to 3 mL) of a measuring liquid (0.9% NaCl aqueous solution, colored with Food Blue No. 1) contained in washing bottle is gently introduced from the upper end of the acrylic pipe 306. In this case, it is confirmed that the sample surface absorbs enough liquid.

After the state is maintained for 1 minute, the SAP particle of the sample surface is swelled. Also in this case, it is confirmed that the measuring liquid is not leaked.

Next, a funnel 312 is mounted on the upper end of the acrylic pipe 306, and the wearing liquid is introduced from the funnel 312. The scale of the acrylic pipe is read at occurring the liquid leakage to the filter paper on the glass plate, the scale is assigned as water pressure resistance (P). The read was every 10 mmH$_2$O.

It should be noted that this examination is performed while it was appropriately monitored with a mirror 313 disposed under the glass plate 302.

[The Hydration Capacity]

The hydration capacity is aimed to compare the dispersive stability, and the method for measuring the same is preferably easy and stable. Therefore, in the present invention, the hydrating capacity means a volume of precipitated MFC by centrifugation. Hereinafter, the method for measuring will be indicated.

The cellulose fiber (0.5 g) to be subjected in 50 mL of water dispersion liquid was taken in the centrifuging tube (inner diameter 30 mm×length 100 mm, volume 50 mL), and the tube was centrifuged at 2000×g (3300 rpm) for 10 minutes to read the precipitated volume (mL), thereby calculating the hydration capacity in accordance with the following formula.

The hydration capacity (mL/g)=Precipitated volume (mL)/Weigh of Cellulose fiber (g)

[Air Permeability]

1. Measurement of Air Permeability by Gurley Method

The measurement was performed in accordance with the method of JIS-P8117. That is, the highly air-permeable and water-resistance sheet according to the present invention is cut into it having 645 cm2 of the area. The air permeability was measured using No. 323 Gurley Type Densometer made by Yasuda Seiki Seisakusho Ltd., in that a time (second) which 100 mL of air is passed is measure by timer.

2. Measurement of Water Vapor Transmission Rate (WVT) by the Cup Method

The measurement was performed in accordance with JIS Z0208 (ASTM E-96).

Sample to be tested

The highly air-permeable and water-resistance sheet according to the present invention is cut in the circular form having 75 mm of diameter.

Condition

40° C., relative humidity 90±2%

The sample to be tested was mounted to the cup, the circumference thereof was sealed, and the moisture is adsorbed under high temperature and humidity for a predetermined time. The wetted weight corresponding to 24 hours was estimated by means of the average increased amount at the steady state of the weight increase and by means of the weight increasing curve against time at the linear portion of the curve.

It was estimated in accordance with the following formula.

$WVT=(G/t)/A(g/m^2, 24\ hours)$

G: Change in weight t: time (time)

A: Area of test (area of the cup portion) (m)

[Method for Measuring of Table 5]

Thickness: JIS P8118

Air permeability with Gurley method: JIS P8117

Smoothness: JIS P8119

[Deodorant Property 1 Using Ammonium]

Figure 19:
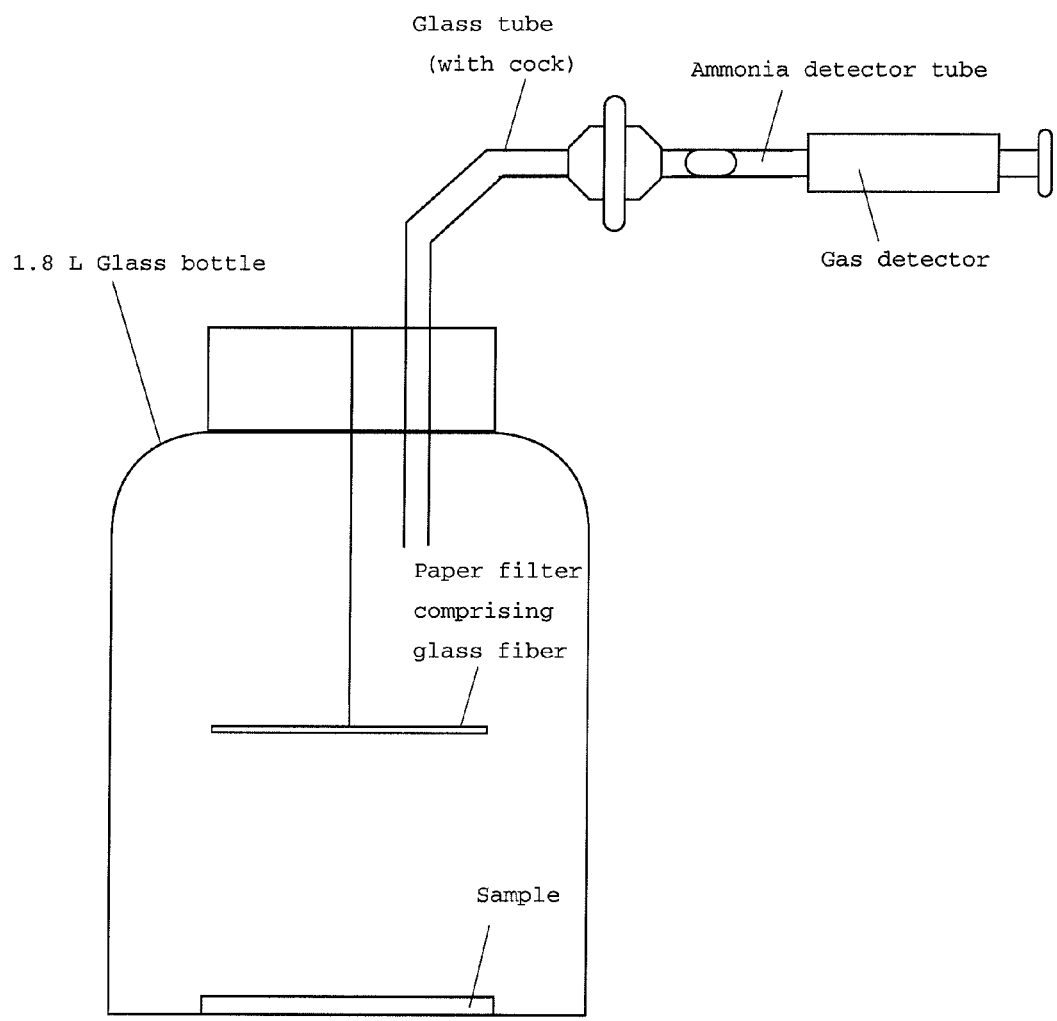
FIG. 19 is a pattern diagram of an apparatus for confirming the deodorizing efficiency using ammonium.

The deodorant property 1 using ammonium was examined using apparatus of FIG. 19 in accordance with the following method. The sheets in the Embodiment 9 to 18 and the sheets of the Comparative examples 7 and 8 were used as the following were used as a sample for (1).

(1) Set the sample (50×50 mm) to the bottom of 1.80 of sealed Glass bottle (2) Introduce the sample into glass fiber filter paper such that the concentration of the ammonium in the sealed bottle is 100 ppm.

(3) After ammonium was introduced, quantify the concentrations of the ammonium gas remained in the bottle at 10, 20, 40, 60, 80, 100 and 120 minutes by means of opening the cock, introducing the ammonium from the entrance of the glass pipe to the gas detector connected with ammonium detector tube.

[Deodorant Property 2 Using Ammonium]

Figure 20:
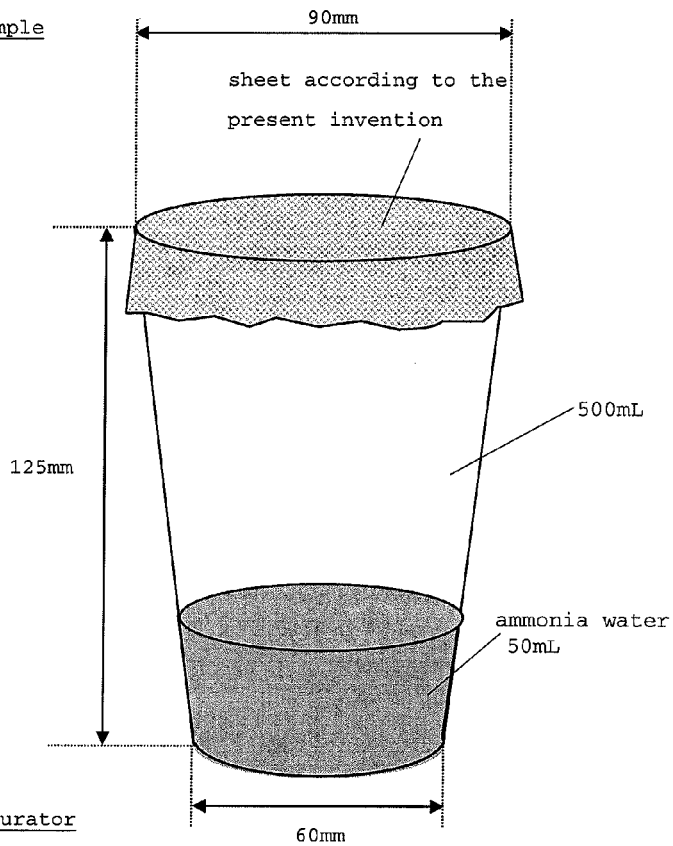
FIG. 20 is a pattern diagram of an apparatus for confirming the deodorizing efficiency using ammonium.
Figure 20:
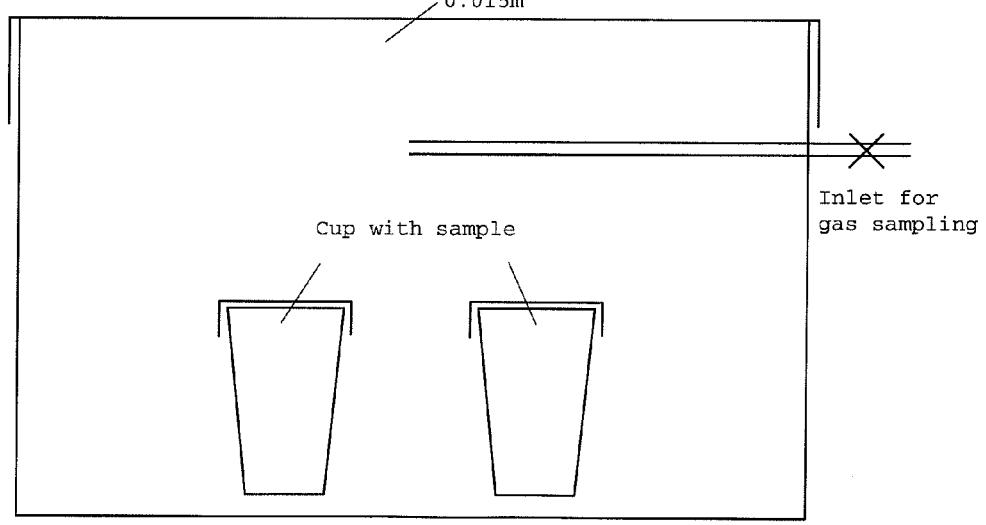

The Deodorant property 2 using ammonium was measured using the apparatus of FIG. 20 in accordance with the following method. As the following (2), the sheets of the Embodiments 9 to 11 and the Comparative example 8 were used.

(1) Prepare 2 cups made with polypropylene having 60 mm of diameter at the bottom, 90 mm of diameter at the upper surface, and 125 mm of the height (volume 500 mL).

(2) Next, introduce 250 ppm of ammonium into the 2 cups, and cover the inlet (upper surface) of the cup with the sample (sheet), as shown in FIG. 20.

(3) Dispose the 2 cups equipped with the sample and introduced the ammonium water into cubic ammonium gas saturation room having acrylate resin box having 0.015 m$^3$, and then qualify and recode the ammonium concentration to be leaked and/or created from the cup.

As mentioned above, the present invention has been described with reference to the preferred embodiment. Here, although the present invention has been explained by indicating particular examples, it is obvious that any modification and change to these examples can be made without departing from the spirit and scope of the present invention defined in the Claims. That is, it should not be interpreted that the present invention is limited to the detailed example and drawing as attached.

INDUSTRIALLY APPLICABILITY

The highly air-permeable and water-resistance sheet according to the present invention has a superior in dust resistance and bacteria barrier. The present invention is advantageously applicable to a use in which such a nature is taken into confidence, such as hygiene product, medical product, surgical product, distilled packaging product, battery separator, and fine printing material.

What is claimed is:

1. A highly air-permeable and water-resistance sheet comprising a hydrophobic non-woven fabric layer having 100 mm H$_2$O or more of water pressure resistance; and a fine cellulose fiber layer layered on said hydrophobic non-woven fabric layer,
    wherein a water repellant layer is layered on either surface of said highly air-permeable and water-resistance sheet, and said fine cellulose fiber constituting said fine cellulose fiber layer has 0.3 mm or less of average fiber length and has 15 mL/g or more of hydration capacity.

2. The highly air-permeable and water-resistance sheet according to claim 1, wherein said non-woven fabric is spun melt non-woven fabric made of polyolefins.

3. The highly air-permeable and water-resistance sheet according to claim 1, wherein said non-woven fabric is melt blown non-woven fabric.

4. The highly air-permeable and water-resistance sheet according to claim 1, wherein said non-woven fabric is composite non-woven fabric of spun bond and melt blown non-woven fabric.

5. The highly air-permeable and water-resistance sheet according to claim 1, wherein the weight of said fine cellulose fiber layer is in the range of 2 to 20 g/m$^2$.

6. The highly air-permeable and water-resistance sheet according to claim 1, wherein said water repellant layer is layered on both surfaces of said highly air-permeable and water-resistance sheet.

7. The highly air-permeable and water-resistance sheet according to claim 1, wherein said water repellant layer comprises an olefinic water repellent, a synthetic resin binder and a cross linker.

8. The highly air-permeable and water-resistance sheet according to claim 7, wherein said synthetic resin binder is styrene butadiene resin.

9. The highly air-permeable and water-resistance sheet according to claim 7, wherein said cross linker is ammonia zirconium carbonate.

10. The highly air-permeable and water-resistance sheet according to claim 1, wherein said water repellant layer further comprises a deodorizer.

11. The highly air-permeable and water-resistance sheet according to claim 10, wherein said deodorizer is zeolite originated from natural resources.

12. The highly air-permeable and water-resistance sheet according to claim 1, wherein said highly air-permeable and water-resistance sheet is subjected to heat press treatment.

13. The highly air-permeable and water-resistance sheet according to claim 1, wherein said highly air-permeable and water-resistance sheet is heat treated so as to melt at least part of compositions of said hydrophobic non-woven fabric layer.

14. A highly air-permeable and water-resistance sheet composite comprising a hydrophobic non-woven fabric layer and having 100 mm H$_2$O or more of water pressure resistance; a fine cellulose fiber layer layered on said hydrophobic non-woven fabric layer; and a water repellant layer layered on said fine cellulose fiber layer,
    wherein said highly air-permeable and water-resistance sheet composite comprises another non-woven fabric layered onto said water repellant layer.

15. The highly air-permeable and water-resistance sheet composite according to claim 14, comprising another fine cellulose fiber layer between said water repellant layer and said another non-woven fabric.

16. An absorbent article comprising a highly air-permeable and water-resistance sheet as claimed in claim 1, and an absorbent body layered on said highly air-permeable and water-resistance sheet.

17. An absorbent article comprising a highly air-permeable and water-resistance sheet composite as claimed in claim 14, and an absorbent body layered on said highly air-permeable and water-resistance sheet composite.

18. The absorbent article as claimed in claim 16, wherein said absorbent body has regions containing SAP and not containing SAP.

19. The absorbent article as claimed in claim 16, wherein said absorbent body contains 50% or more of said SAP relative to the weight of said absorbent body.

20. The absorbent article as claimed in claim 16, further comprising a buffer sheet between said highly air-permeable and water-resistance sheet and said absorbent body.

21. The absorbent article as claimed in claim 20, wherein said buffer sheet is an apertured film.

22. The absorbent article as claimed in claim 20, wherein a ratio of the surface area of said buffer sheet is assigned as "P" and the surface area of said is highly air-permeable and water-resistance sheet is assigned as "Q", a ratio of P/Q×100 is in the range of 10% to 50%.

* * * * *